US007233933B2

(12) United States Patent
Horvitz et al.

(10) Patent No.: US 7,233,933 B2
(45) Date of Patent: Jun. 19, 2007

(54) METHODS AND ARCHITECTURE FOR CROSS-DEVICE ACTIVITY MONITORING, REASONING, AND VISUALIZATION FOR PROVIDING STATUS AND FORECASTS OF A USERS' PRESENCE AND AVAILABILITY

(75) Inventors: Eric J. Horvitz, Kirkland, WA (US); Paul Koch, Toronto (CA); Johnson T. Apacible, Redmond, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 10/609,972

(22) Filed: Jun. 30, 2003

(65) Prior Publication Data

US 2004/0003042 A1    Jan. 1, 2004

Related U.S. Application Data

(63) Continuation-in-part of application No. 09/894,087, filed on Jun. 28, 2001.

(51) Int. Cl.
*G06E 1/00* (2006.01)
*G06E 3/00* (2006.01)
*G06F 15/18* (2006.01)
*G06G 7/00* (2006.01)

(52) U.S. Cl. ........................................................ 706/21
(58) Field of Classification Search .................. 706/21, 706/1–11; 705/10, 28, 7; 379/9–20
See application file for complete search history.

(56) References Cited

U.S. PATENT DOCUMENTS 5,493,692 A    2/1996   Theimer et al.

(Continued)

FOREIGN PATENT DOCUMENTS

WO    9800787    1/1998

OTHER PUBLICATIONS

Eric Horvitz, et al., Coordinate: Probabilistic Forecasting of Presence and Availability, Proceedings of the 18th Conference on Uncertainty and Artificial Intelligence, Jul. 2002, pp. 224-233, Morgan Kaufman Publishers, Edmonton, Alberta.

(Continued)

*Primary Examiner*—Anthony Knight
*Assistant Examiner*—Michael B. Holmes
(74) *Attorney, Agent, or Firm*—Amin & Turocy, LLP

(57) ABSTRACT

The present invention relates to a system and methodology to facilitate collaboration and communications between entities such as between automated applications, parties to a communication and/or combinations thereof. The systems and methods of the present invention include a service that supports collaboration and communication by learning predictive models that provide forecasts of one or more aspects of a users' presence and availability. Presence forecasts include a user's current or future locations at different levels of location precision and usage of different devices or applications. Availability assessments include inferences about the cost of interrupting a user in different ways and a user's current or future access to one or more communication channels. The predictive models are constructed from data collected by considering user activity and proximity from multiple devices, in addition to analysis of the content of users' calendars, the time of day, and day of week, for example. Various applications are provided that employ the presence and availability information supplied by the models in order to facilitate collaboration and communications between entities.

98 Claims, 37 Drawing Sheets

U.S. PATENT DOCUMENTS

| | | | |
|---|---|---|---|
| 5,544,321 | A | 8/1996 | Theimer et al. |
| 5,555,376 | A | 9/1996 | Theimer et al. |
| 5,603,054 | A | 2/1997 | Theimer et al. |
| 5,611,050 | A | 3/1997 | Theimer et al. |
| 5,659,593 | A * | 8/1997 | Tzvieli .................. 379/13 |
| 5,812,865 | A | 9/1998 | Theimer et al. |
| 5,930,828 | A | 7/1999 | Jensen et al. |
| 6,021,403 | A | 2/2000 | Horvitz et al. |
| 6,246,376 | B1 | 6/2001 | Bork et al. |
| 6,262,730 | B1 | 7/2001 | Horvitz et al. |
| 6,466,232 | B1 | 10/2002 | Newell et al. |
| 6,499,021 | B1 | 12/2002 | Abu-Hakima |
| 6,513,046 | B1 | 1/2003 | Abbott, III et al. |
| 6,549,915 | B2 | 4/2003 | Abbott, III et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,978,258 | B2 * | 12/2005 | Chithambaram ............... 706/8 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2001/0045949 | A1 | 11/2001 | Chithambaram et al. |
| 2002/0032689 | A1 | 3/2002 | Abbott, III, et al. |
| 2002/0044152 | A1 | 4/2002 | Abbott, III, et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III, et al. |
| 2002/0054174 | A1 | 5/2002 | Abbott et al. |
| 2002/0076025 | A1 | 6/2002 | Liversidge et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0159750 | A1 | 10/2002 | Jasinschi et al. |
| 2003/0046401 | A1 | 3/2003 | Abbott et al. |
| 2003/0154476 | A1 | 8/2003 | Abbott, III, et al. |
| 2005/0034078 | A1 | 2/2005 | Abbott et al. |

OTHER PUBLICATIONS

Metcalfe, Bob. "After 35 Years of Technology Crusades, Bob Metcalfe Rides Off Into the Sunset." (Sep. 2000) Infoworld, web pages 1-4, at http://www.infoworld.com/AppDev/1161/IWD000925opmetcalfe_cto.

Horvitz, et al. "Attention sensitive Alerting" (Jul. 1999) Proceedings of UAl '99 Conference on Uncertainty and Al, Morgan Kaufman: San Francisco, pp. 305-313.

Horvitz, "Principles of Mixed Initative User Interfaces" Artificial Intelligence Journal, 126: 159-196, Elsevier Science (Feb. 2001).

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp.270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38 - No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium Mobile and Location Independent Computing, Aug. 1993, 9 pages.

Mike Spreitzer, et al., Architectural Considerations for Scalable, Secure, Mobile Computing with Location Information, In The 14th International Conference on Distributed Computed Systems, Jun. 1994, pp. 29-38.

Mike Spreitzer et al., Scalable, Secure, Mobile Computing with Location Information, Communications of the ACM, Jul. 1993, 1 page, vol. 36 - No. 7.

Roy Want, et al., The Active Badge Location System, ACM Transactions on Information Systems, Jan. 1992, pp. 91-102, vol. 10 - No. 1.

Mark Weiser, Some Computer Science Issues in Ubiquitous Computing, Communications of the ACM, Jul. 1993, pp. 75-84, vol. 36 - No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vil. 8 - No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

D.W. Albrecht, et al., Towards a Bayesian Model for Keyhole Plan Recognition in Large Domains, Proceedings of User Modeling '97, Springer-Verlag, New York, 1997, pp. 365-376.

David Beard, et al., A Visual Calender for Scheduling Group Meetings, Proceedings of CSCW '90, ACM Press Oct. 1990, pp. 279-290.

David M. Chickering, et al., A Bayesian Approach to Learning Bayesian Networks with Local Structure, Proceedings of UAI '97, Morgan Kaufmann Publishers, Providence, Rhode Island, Aug. 1997, pp. 80-89.

Cristina Conati, et al., On-Line Student Modeling for Coached Problem Solving Using Bayesian Networks, User Modeling: Proceedings of the Sixth International Conference UM '97, Vienna, New York, 1997, pp. 231-242.

Eric Horvitz, et al., The Lumiere Project: Bayesian User Modeling for Inferring the Goals and Needs of Software Users, Proceedings of UAI '98, Morgan Kaufmann Publishers, Madison, Wisconsin, Jul. 1998, pp. 256-265.

Eric Horvitz, Principles of Mixed-Initiative User Interfaces, Proceedings of the ACM SIGCHI '99, ACM Press, Pittsburgh, Pennsylvania, May 1999, pp. 159-166.

Pattie Maes, Agents that Reduce Work and Information Overload, Communications of the ACM, vol. 37, No. 7, 1994, pp. 31-40.

Elizabeth Mynatt and Joe Tullio, Inferring Calendar Event Attendance, Proceedings of Intelligent User Interfaces (IUI) '01, Santa Fe, New Mexico, Jan. 14-17, 2001, pp. 121-128.

Leysia Palen, Social, Individual, and Technologies Issues for Groupware Calendar Systems, Proceedings of the ACM CHI '99, Pittsburgh, Pennsylvania, May 15-20, 1999, pp. 17-24.

John C. Platt, Probabilistic Outputs for Support Vector Machines and Comparisons to Regularized Likelihood Methods, in Smola et al. (Eds.), Advances in Large Margin Classifiers, MIT Press, Mar. 26, 1999, 11 pages.

Edward Cutrell, et al., Notification, Disruption, and Memory: Effects of Messaging Interruptions on Memory and Performance, Proceedings of Interact 2001: IFIP Conference on Human-Computer Interaction, Tokyo, Japan, Jul. 2001, 7 pages.

Mary Czerwinski, et al., Instant Messaging: Effects of Relevance and Timing, in Turner et al. (Eds.), People and Computers XIV: Proceedings of HCI 2000, vol. 2, British Computer Society, 2000, pp. 71-76.

Tony Gillie and Donald Broadbent, What Makes Interruptions Disruptive? A Study of Length, Similarity, and Complexity, Psychological Research, Springer-Verlag, 1989, vol. 50, pp. 243-250.

Ken Hinckley, et al., Sensing Techniques for Mobile Interaction, Proceedings of the ACM UIST 2000 Symposium on User Interface Software and Technology, San Diego, California, Nov. 2000, CHI Letters 2, (2), pp. 91-100.

Ken Hinckley and Eric Horvitz, Toward More Sensitive Mobile Phones, Proceedings of the ACM UIST 2001 Symposium on User Interface Software and Technology, Orlando, Florida, Nov. 2001, CHI Letters 3 (2), pp. 191-192.

James M. Hudson, et al., "I'd Be Overwhelmed, But It's Just One More Thing To Do:" Availability and Interruption in Research Management, Proceedings of CHI 2002, Minneapolis, Minnesota, Apr. 2002, CHI Letters 4 (1), pp. 97-104.

D. Scott McCrickard, et al., Establishing Tradeoffs that Leverage Attention for Utility: Empirically Evaluating Information Display in Notification Systems, International Journal of Human-Computer Studies, 2003, vol. 58, pp. 547-582.

Daniel C. McFarlane, Coordinating the Interruption of People in Human-Computer Interaction, Human-Computer Interaction-INTERACT '99, IOS Press, Inc., The Netherlands, 1999, pp. 295-303.

* cited by examiner

FIG. 14

```
C:\Coordinate\Coordinate.exe
[10/30/2001 09:06:51] System Presence Event
[10/30/2001 09:06:52] System Presence Event
[10/30/2001 09:06:53] System Presence Event
[10/30/2001 09:06:54] System Presence Event
[10/30/2001 09:06:55] System Presence Event
[10/30/2001 09:06:56] System Presence Event
[10/30/2001 09:06:57] System Presence Event
[10/30/2001 09:06:58] System Presence Event
[10/30/2001 09:06:59] System Presence Event
[10/30/2001 09:07:00] System Presence Event
[10/30/2001 09:07:01] System Presence Event
[10/30/2001 09:07:02] System Presence Event
[10/30/2001 09:07:03] System Presence Event
[10/30/2001 09:07:04] Background Noise Audio Event
[10/30/2001 09:07:04] System Presence Event
[10/30/2001 09:07:05] Speech Audio Event
[10/30/2001 09:07:05] System Presence Event
[10/30/2001 09:07:06] Speech Audio Event
[10/30/2001 09:07:06] System Presence Event
[10/30/2001 09:07:07] System Presence Event
[10/30/2001 09:07:08] System Presence Event
[10/30/2001 09:07:09] System Presence Event
[10/30/2001 09:07:10] System Presence Event
[10/30/2001 09:07:12] System Presence Event
[10/30/2001 09:07:13] System Presence Event
[10/30/2001 09:07:14] Speech Audio Event
[10/30/2001 09:07:16] Speech Audio Event
[10/30/2001 09:07:17] Background Noise Audio Event
[10/30/2001 09:07:18] System Presence Event
[10/30/2001 09:07:19] System Presence Event
[10/30/2001 09:07:20] Background Noise Audio Event
[10/30/2001 09:07:21] System Presence Event
[10/30/2001 09:07:22] System Presence Event
[10/30/2001 09:07:23] System Presence Event
```

METHODS AND ARCHITECTURE FOR CROSS-DEVICE ACTIVITY MONITORING, REASONING, AND VISUALIZATION FOR PROVIDING STATUS AND FORECASTS OF A USERS' PRESENCE AND AVAILABILITY

REFERENCE TO RELATED APPLICATIONS

This application is a continuation in part of U.S. patent application Ser. No. 09/894,087 filed on Jun. 28, 2001, entitled METHODS FOR AND APPLICATIONS OF LEARNING AND INFERRING THE PERIODS OF TIME UNTIL PEOPLE ARE AVAILABLE OR UNAVAILABLE FOR DIFFERENT FORMS OF COMMUNICATION, COLLABORATION, AND INFORMATION ACCESS, the entirety of which is incorporated herein by reference.

TECHNICAL FIELD

The present invention relates generally to computer systems, and more particularly to a system and method that supports collaboration and communication by collecting data from one or more devices, and that learns predictive models that provide forecasts of users' presence and availability. More specifically, the methods and architecture provide information to people or communication agents about the current or future status of a user's presence and availability at multiple locations and/or the user's access to one or more devices or channels of communication.

BACKGROUND OF THE INVENTION

Although electronic calendar systems for storing reminders and creating contacts with others about meeting times and locations provide one type of opportunity for people to collaborate, a great deal of collaboration is based on opportunistic communication arranged under uncertainty. This informal coordination between people often depends on peoples' shared understandings about current and future locations and activities of friends and associates. Even with employment of online group calendar systems, for example, people are often challenged with trying to understand how available others are for a respective collaboration such as knowing what the current status of someone they are trying to contact. However, knowing a person's current status does not necessarily facilitate future or desired collaboration between communicating parties.

In just one example, conventional e-mail systems provide an example of communications and message coordination difficulties between parties. In one possible scenario, an employee may be situated in a foreign country or remote region, wherein voice communications via telephone or other medium is not always possible. The employee may have indicated beforehand to fellow workers, supervisors and loved ones that e-mail provides the most reliable manner in which the employee will actually receive and be able to subsequently respond to a message. Although, conventional e-mail systems can indicate that a transmitted message has been received and opened by the employee, and can include a predetermined/pre-configured reply such as "On vacation for one week", or "Out of the office this afternoon"—assuming the employee remembers to configure the e-mail system, there is currently no automatically generated indication provided to the message sender when and/or how long it will be before the employee may actually respond. Thus, if a home crisis situation were to occur or an important business message needed to get through, message senders can only guess when the employee will potentially receive the message and hope that the message is received and responded to in a timely manner. Similar difficulties arise when attempting to schedule meetings with parties that are difficult to determine whether or not they can attend a meeting set for some time in the future.

As is common in everyday situations, messages are transmitted with varying degrees of urgency, importance, and priority. Often, key meetings need to be arranged at a moments notice in order to address important business or personal issues. Consequently, one or more messages are directed to one or more parties to indicate the urgency of the meeting. Also, messages are often communicated over multiple communications modalities in order to attempt to reach potential parties. For example, a business manager may send e-mails to key parties and follow the e-mail with phone calls, pages or faxes to the parties, wherein voice mails are typically left for non-answering parties. Unfortunately, the manager is often unsure whether non-responding parties have received the messages and is often unable to determine with any degree of confidence when all parties may be available to meet. Therefore, even though modem communications systems have enabled messages to be rapidly transmitted anywhere in the world over a plurality of mediums, there is a need for a system and methodology to provide improved coordination, communication, and collaboration between parties and to mitigate uncertainty associated with when and/or how long it will be before a message recipient receives a particular message.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that support collaboration and communication by learning predictive models that provide forecasts of users' presence and availability. Data is collected by considering user activity and proximity from multiple devices, in addition to analysis of content of users' calendars, time of day, and day of week, for example, wherein the data is employed to construct one or more learning models to forecast users' presence and availability. The present invention facilitates real-time, peri-real time, and/or long-term planning for messaging and collaboration by providing probabilistic predictions about current and future states of users to authorized persons and/or automated applications (e.g., states such as time until someone will arrive or leave a location, will be at a location for at least time t, time will have access to a device, time will review e-mail, time will finish a conversation in progress, time will attend a meeting, and so forth). Predictions received by such persons or applications can then be employed to facilitate more efficient and timely communications between parties since parties or systems attempting to communicate can be given forecasts or clues to possible periods or devices in which to reach the user based upon trained observances of past user activities.

In one aspect of the present invention, a Bayesian inference system is provided that supports availability forecasting machinery and systems within the framework of various automated applications. To build general predictive models, data is collected or aggregated regarding a user's activity and location from multiple sources, including data about a user's activities on multiple devices in addition to data from a calendar, for example. Also, forecasts can be generalized with respect to presence and absence to other events of interest to support collaboration and communication. For example, it may be desirable for users or applications to understand if and when a user will access messages waiting in their inbox, or to identify a suitable future time to interrupt the user with a notification.

Other aspects include forecasting when a user will have easy access to computing systems of communication devices with particular capabilities. For example, automated systems or other users may desire to know when a user will likely have easy access to a computer with full video conferencing abilities. Furthermore, the present invention provides sophisticated models for handling multiple contextual clues such as details captured in calendar information, rather than simply conditioning on the existence of a meeting.

The forecasted presence and availability information described above can be utilized by many applications. For example, the present invention can be employed to facilitate meetings, coordination and communications between message senders and receivers, wherein general prediction models are constructed from past presence, actions, and calendar of a user to forecast the timing of a user's availability status for receiving messages, receiving communications and/or participating in meetings. Such inferences can be utilized to report or display the user's status to colleagues globally and/or selectively (depending on the colleague's relationship with the user), and can be employed in a variety of applications such as automated meeting or interactive communications schedulers or re-schedulers, smart caching systems and communication relay systems.

Other applications of the invention are feasible, including finer grained inferences other than the notion of availability. For example, the present invention can employ similar methods to reason about the amount of time until a user will be available for a particular kind of interaction or communications, based on patterns of availability and context. For example, the expected time until a user, who is currently traveling in automobile will be available for a voice and/or videoconference can be determined by learning statistics and building models which can infer this particular kind of availability. In another example, it can be determined when a user will be available to be interrupted with a particular class of alert or notification, based on patterns of availability, and inferences about the workload and associated cost of an interruption.

In another aspect of the present invention, the predictive component on availability is utilized to estimate when a user will likely be in a setting where he/she can or will review messages deemed as urgent and received by a user's system are answered with an adaptive out-of-office message, such as when the message will likely be unseen for some amount of time and/or the message is at least of some urgency, and/or is from one or more people of particular importance to the user. Such selective messages can be populated with dynamically computed availability status, centering for example, on a forecast of how long it will be until the user will likely review a message such as an e-mail, or be available to review the message, or be in a particular situation (e.g., "back in the office"). Other aspects can include determining the time until a user will review different kinds of information, based on review histories, and the time until the user will be in one or more types of settings, each associated with one or more types of feasible communications. Such information can be transmitted to a message sender regarding the user's ability or likelihood to engage in communications, or respond within a given timeframe.

The present invention can employ the information regarding the user's likelihood of return or current availability in other systems and processes. This may include voice mail systems, calendaring systems, scheduling systems, automated maintenance systems, automated agents, and user tracking systems in order to provide useful information feedback to message senders and/or systems regarding the likelihood of establishing contact and making informed decisions based upon the user's expected presence and availability.

In another aspect of the present invention, systems and methods are provided that build and use models of a user's attentional focus and workload as part of harnessing the role of interruptions on users. These methods can reason about a user's workload from observed events and, more specifically, infer the cost of interruption to users associated with different kinds of alerting and communications. Such models of interruption fuse together information from multiple sensory channels, including desktop events, analysis of calendar information, visual pose, and ambient acoustical analyses, for example.

Models can be constructed to infer a user's state of interruptability from multiple event sources, and, that can provide a well-characterized expected cost of interruption. This can include coupling of models of attention with event systems that provide streams of events, including desktop activity and sensory observations. Also, the present invention can infer an expected cost of interruption, given a probability distribution over attention and a utility assessment that encodes preferences about the costs of interruption in different situations in addition to the learning of models of attention and interruptablity from data. A learning paradigm is processed along with a set of tools (e.g., interruption workbench), wherein learned models are reviewed, and experiments provided that probe the classification accuracy of the models. A "model ablation" study is also considered, removing from consideration perceptual sensing, and including the discriminatory power of events representing interactions with a client computing system and calendar information, for example.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 14 is a diagram illustrating event logging in accordance with an aspect of the present invention.

FIG. 19 is a diagram illustrating alerting displays in accordance with an aspect of the present invention.

DETAILED DESCRIPTION OF THE INVENTION

Figure 1:
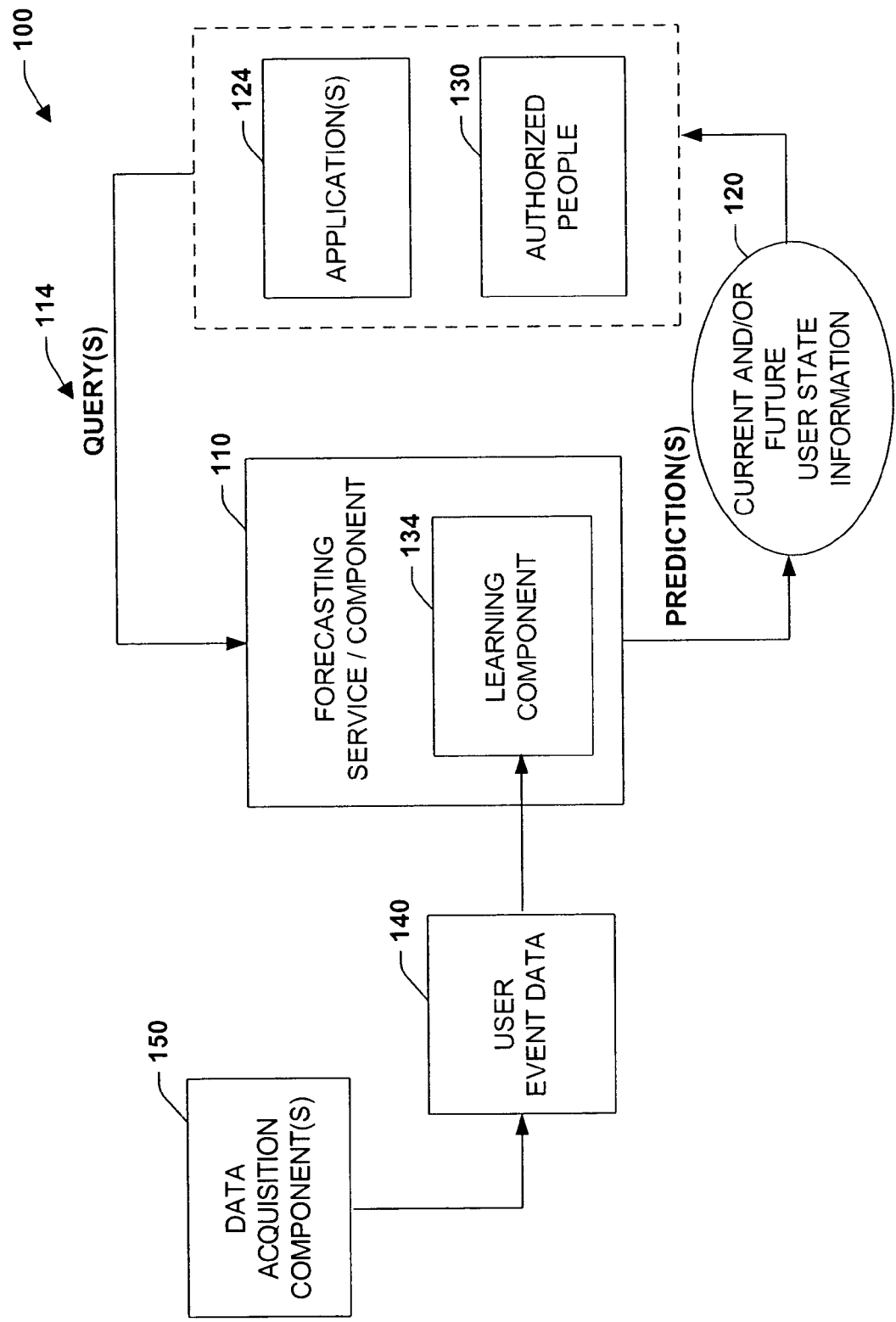
FIG. 1 is a schematic block diagram of a forecasting system in accordance with an aspect of the present invention.

The present invention relates to a system and methodology to facilitate collaboration and communications between entities such as between automated applications, parties to a communication and/or combinations thereof. The systems and methods of the present invention include a service (e.g., web service, automated application) that supports collaboration and communication by learning predictive models that provide forecasts of one or more users' presence and availability. The predictive models are constructed from data collected by considering user activity and proximity from multiple devices, in addition to analysis of the content of users' calendars, the time of day, and day of week, for example. Various applications are provided that employ the presence and availability information supplied by the models in order to facilitate collaboration and communications between entities.

Some example applications can include automated meeting or interactive communications schedulers or re-schedulers, smart caching systems, communication systems, audio systems, calendaring systems, scheduling systems, notification systems, messaging systems, automated maintenance systems, automated agents, video systems, digital assistants, and user tracking systems, for example, in order to provide useful information to message senders and/or systems regarding the likelihood of establishing contact and making informed decisions based upon the user's expected presence and availability.

As used in this application, the terms "component," "service," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 illustrates presence and availability forecasting in accordance with an aspect of the present invention. A forecasting service 110 (or forecasting component) receives one or more queries 114 regarding an identified user's (or users) presence or availability and generates one or more predictions relating to current and/or future states 120 of the identified user or users. The query 114 and returned states 120 are generated and received by one or more automated applications and/or authorized people 130, however, it is to be appreciated that the state information 120 can be generated without receiving the query 114 (e.g., a scheduling system that automatically sends manpower availability reports to managers at a predetermined interval). In general, the query 114 is originated by the applications, the authorized people 130, or other entities in order to obtain answers regarding the presence, availability, location, communications capability, device availability and so forth of the identified user or users. It is noted however, that complementary information may also be queried and answered respectively such as instead of presence information, the forecasting service 110 can provide how long a person is expected to be absent, or instead of availability information, how long a person may be unavailable, for example.

The query 114 may be directed to the forecasting service 110 to determine a plurality of different user states 120 such as for example:

The time until the user will arrive at or leave a location;
The time until the user will be at a location for at least time t;
The time until the user will have easy access to a device (e.g., full desktop system);
The time until the user will review e-mail or other message;
The time until the user will finish a conversation in progress;
Likelihood user will attend a meeting;
Expected cost of interruption over time; and including substantially any time, location, device, and/or communication-based prediction or answer.

In order to generate the state information 120, the forecasting service 110 employs a learning component 134 that can include one or more learning models for reasoning about the user states 120. Such models can include substantially any type of system such as statistical/mathematical models and processes that include the use of Bayesian learning, which can generate Bayesian dependency models, such as Bayesian networks, naïve Bayesian classifiers, and/or Support Vector Machines (SVMs), for example. Other type models or systems can include neural networks and Hidden Markov Models, for example. Although elaborate reasoning models can be employed in accordance with the present invention, it is to be appreciated that other approaches can also utilized. For example, rather than a more thorough probabilistic approach, deterministic assumptions can also be employed (e.g., no desktop activity for X amount of time may imply by rule that user is not at work). Thus, in addition to reasoning under uncertainty as is described in more detail below, logical decisions can also be made regarding the status, location, context, focus, and so forth of users and/or associated devices.

The learning component 134 can be trained from a user event data store 140 that collects or aggregates data from a plurality of different data sources associated with one or more users. Such sources can include various data acquisition components 150 that record or log user event data (e.g., cell phone, accelerometer, acoustical activity recorded by microphone, Global Positioning System (GPS), electronic calendar, vision monitoring equipment, desktop activity and so forth). Before proceeding with a more detailed discussion of the presence and availability forecasting of the present invention, it is noted that the forecasting service 110 can be implemented in substantially any manner that supports predictions and query processing. For example, the forecasting service 110 could be implemented as a server, a server farm, within client application(s), or more generalized to include a web service(s) or other automated application(s) that provide answers to automated systems 124 and/or authorized people 130.

It is noted that the present invention can determine and share specific types of sub-goals per a contacting user's interest in current status and inforecasts of presences and availabilities. These can include:

(1) locations, (e.g., user will return to their office within x minutes, user, currently sensed in office, will leave their office within x minutes, will be at location x within t minutes, etc.),
(2) interruptability (deterministic, e.g., low, med, high, or costs for different kinds of interruptions (e.g., expected cost of interruption with a phone call is $5.00, alert on desktop, $1.50, etc.),
(3) availability of communication channels (user will have cell phone available, office phone available, pager available, desktop system with large display that is networked, desktop system with MS NetMeeting software available),
(4) other situations (e.g., user's conversation in office will likely end in x minutes.)

Communications channels can be reasoned about directly or can be derived by linking channels with location. For example, links between channels and locations can be determined at set up time (or derived over time via monitoring) that the office contains the following channels: hardwired telephone, full-desktop systems with large display running with the following software applications: MS Office, MS NetMeeting, etc.). Such information about channels linked to locations can be stored in location and device schema, for example.

Relating to data models or schema, the present invention also provides methods (including easy-to-use user interfaces) for adding devices and locations to consideration of the system, making it easy for users to set up Coordinate services as described in more detail below with respect to FIG. 2. When a device is added, a user describes the device type, capturing channel information, etc., and location, e.g., this machine is at my office desk, versus this machine is a mobile laptop with a wireless access or this cell phone is always with me at these hours, etc. When a location is added, all devices that are available are associated with the location. Rich XML-based schema or data models can be provided for capturing device and location information. Device schema, location schema, and other schema provide rich templates for capturing properties of locations and devices. As can be appreciated, user interface and methods can be provided that interact with the schema and methods of the present invention for adding and removing devices and locations (and other monitored information, if desired).

It is further noted that the systems and methods of the present invention can also consider and process location information, gleaned from 802.11 signals and interfaces as one example. For example, a map of a corporate campus can be provided that maps current association points being seen (APs) with building location to indicate the user's location. At home, the system determines a home wireless is available and thus, the system determines when the user is home. Also, GPS signals can be processed for areas outside of wireless access.

Figure 2:
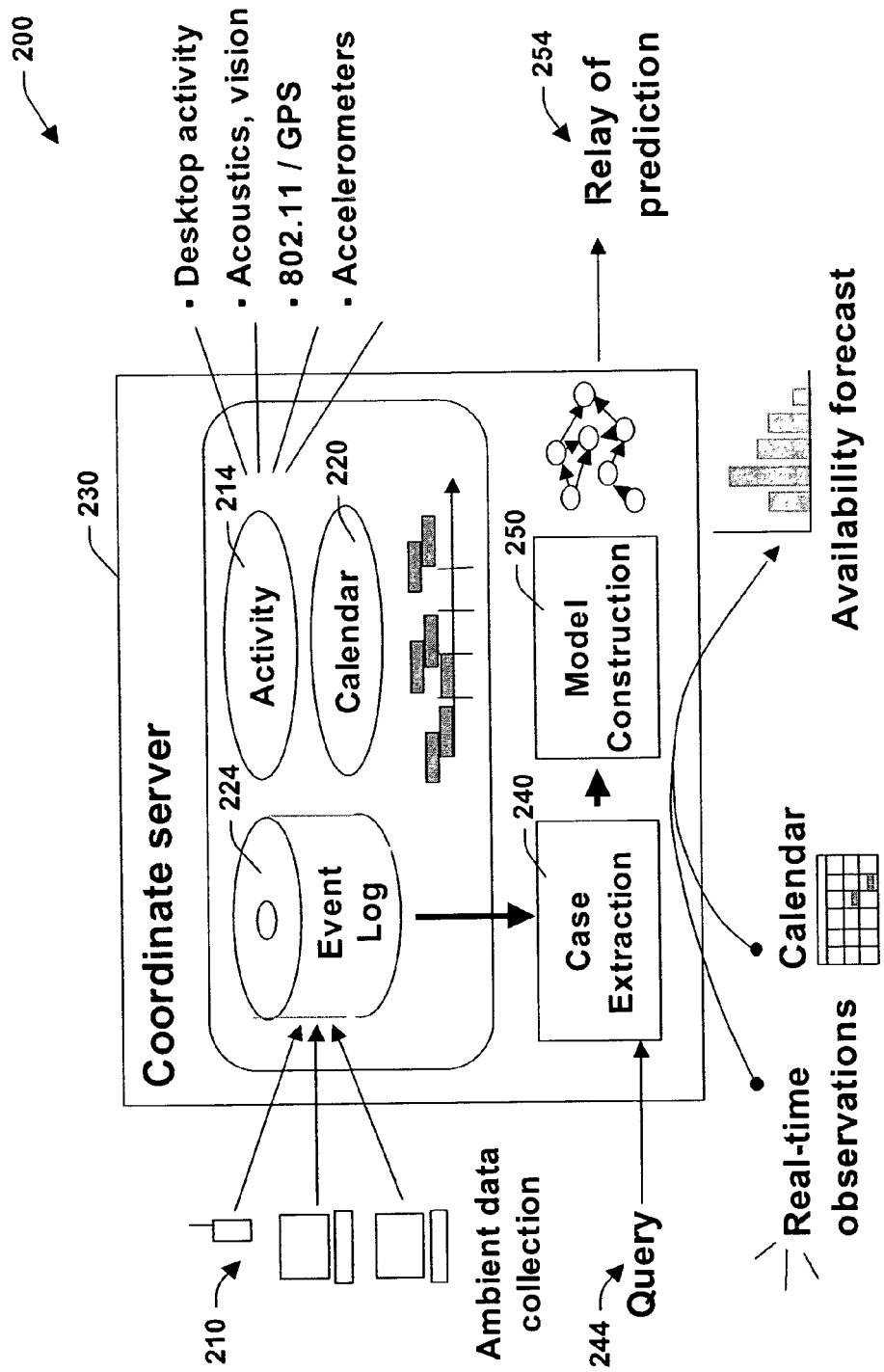
FIG. 2 is a schematic diagram of a Coordinate system in accordance with an aspect of the present invention.

Referring now to FIG. 2, a system 200 illustrates a Coordinate system 200 (also referred to as Coordinate 200) in accordance with an aspect of the present invention. In one aspect, the Coordinate system 200 can be built as a server-based service written in C# or other language and built on top of a NET development environment (or any commercially available development environment). The Coordinate system 200 includes a central database, networking facilities, device provisioning interfaces and controls, and Bayesian machine learning tools, for example. The system 200 can serve as a facility for use by automated proxies that provide information to collaboration and communication services for users rather than to be queried directly by users. However, a query interface as described below enables people or systems to directly query the forecasting or availability service provided by the Coordinate system 200.

The Coordinate system 200 is generally composed of four core components, however more or less than four components may be employed. A data-acquisition component 210 (or components) executes on multiple computers, components, or devices that a user is likely to employ. This component 210 detects computer usage activity 214, calendar information 220, time information, video, acoustical, position information from 802.11 wireless signal strength and/or GPS data when these channels are available (can also include input from substantially any electronic source). The data-acquisition component 210 includes a signal-processing layer that enables users to configure and define parameters of audio and video sources utilized to define user(s) presence. This information can be cached locally and sent to a Coordinate data-coalescence component 224 (also referred to as Event Log or Event database) running on a central Coordinate server 230. This component 224 is responsible for combining data from the user's multiple machines and storing it in an XML-encoded event database (can include other type encoding).

In general, multiple dimensions of a user's activities across multiple devices, and appointment status, as encoded in a calendar, are stored in a relational database. Start and stop times of interactions of different interactions and appointment status are encoded as distinct dimensions in a database. Static and dynamically constructed predictive models can be gleaned by making queries for information across these multiple dimensions of the database. Queries can be created dynamically, based on the current situation (e.g., the time of day and day of week and current transition status of a user for key transitions), and the predictive goal associated with a desired forecast (e.g., time until a communication channel will become available if it is not currently available).

Several procedures can be employed to build predictive models, including time series models such as those employing autoregression analysis, and other standard time series methods as commonly known, including such techniques as ARIMA models (e.g., See P. Dagum, P., A. Galper, E. Horvitz, A. Seiver, Uncertain reasoning and forecasting, International Journal of Forecasting 11(1):73–87, March 1995 (http://research.microsoft.com/~horvitz/FORECAST.HTM) for a review of alternate methods. Other methods include dynamic Bayesian networks and Continuous Time Bayesian Networks, two example forms of temporal Bayesian-network representation and reasoning methodology.

In one approach to reasoning with information from such a presence database, the present invention can learn Bayesian networks dynamically by acquiring a set of appropriate matching cases for a situation from the database, via appropriate querying of the database, and then employing a statistical analysis of the cases (e.g., employing a Bayesian-network learning procedure that employs model structure search to compose the best predictive model conditioned on the cases), and then using this model, in conjunction with a specific query at hand to make target inferences. In such a real-time learning approach, rather than attempting to build a large static predictive model for all possible queries, the method focuses analysis by constructing a set of cases 240 from the event database 224 that is consistent with a query 244 at hand. This approach allows custom-tailoring of the formulation and discretization of variables representing specific temporal relationships among such landmarks as transitions between periods of absence and presence and appointment start and end times, as defined by the query 244. These cases 240 are fed to a learning and inference subsystem 250, which constructs a Bayesian network that is tailored for a target prediction 254. The Bayesian network is used to build a cumulative distribution over events of interest. In one aspect, the present invention employs a learning tool to perform structure search over a space of dependency models, guided by a Bayesian model score to identify graphical models with the greatest ability to predict the data. As noted above, substantially any type of learning system or process may be employed in accordance with the present invention. For example, one learning process that can be employed was developed by Chickering et al. in a publicly available paper on the Internet or other sources entitled "A Bayesian Approach to Learning Bayesian Networks with Local Structure" (MSR-TR-97-07, August 1997).

The Coordinate system 200 logs periods of presence and absence in the event log 224. Events are typically annotated by the source devices 210, whereby devices are defined by respective capabilities and locations. For example, a user can specify that certain devices have full-video conferencing abilities. The tagging of events by specific devices, indexed by capabilities allows the system 200 to forecast a probability distribution over the time until the user will have access to different kinds of devices without making a special plan. When these devices are assigned to fixed locations, such forecasts can be used to forecast a user's location. Coordinate's event system can monitor histories of a user's interaction with computing systems, including applications that are running on a system, applications that are now in focus or that have just gone out of focus. As an example, the system can identify when a user is checking email or reviewing a notification. Thus, moving beyond presence and absence, Coordinate 200 supports such forecasts as the time until a user will likely review email (or other communication), given how much time has passed since he or she last reviewed email.

The system 200 also can consider the time until a user will engage an application or cease using the application. Thus, the system 200 can be queried when a user will likely access his or her email inbox given the time they last accessed their inbox. As the system 200 also detects conversations, other aspects include predicting when a current conversation is likely to end.

The system provides forecasts $p(t_e|E, \xi)$, where $t_e$ is the time until an event of interest occurs, and evidence E includes proximal activity context, the time of day, day of week, and multiple attributes representing the nature of active calendar items under consideration. The proximal activity context represents one or more salient recent transitions among landmark states, based on the query. Such conditioning captures a modeling assumption that times until future states are strongly dependent on the timing of the most recent key landmarks. For predictions about the time until a user who has been absent will return to their office, or return to their office and remain for at least some time t, the proximal activity context is the period of time since the user transitioned from present to absent. For the forecasts about how long it will be before a user who is present will leave their office, or, more specifically, will be away for at least some time t, the proximal activity context is taken as the time since the user transitioned from absent to present.

Figure 3:
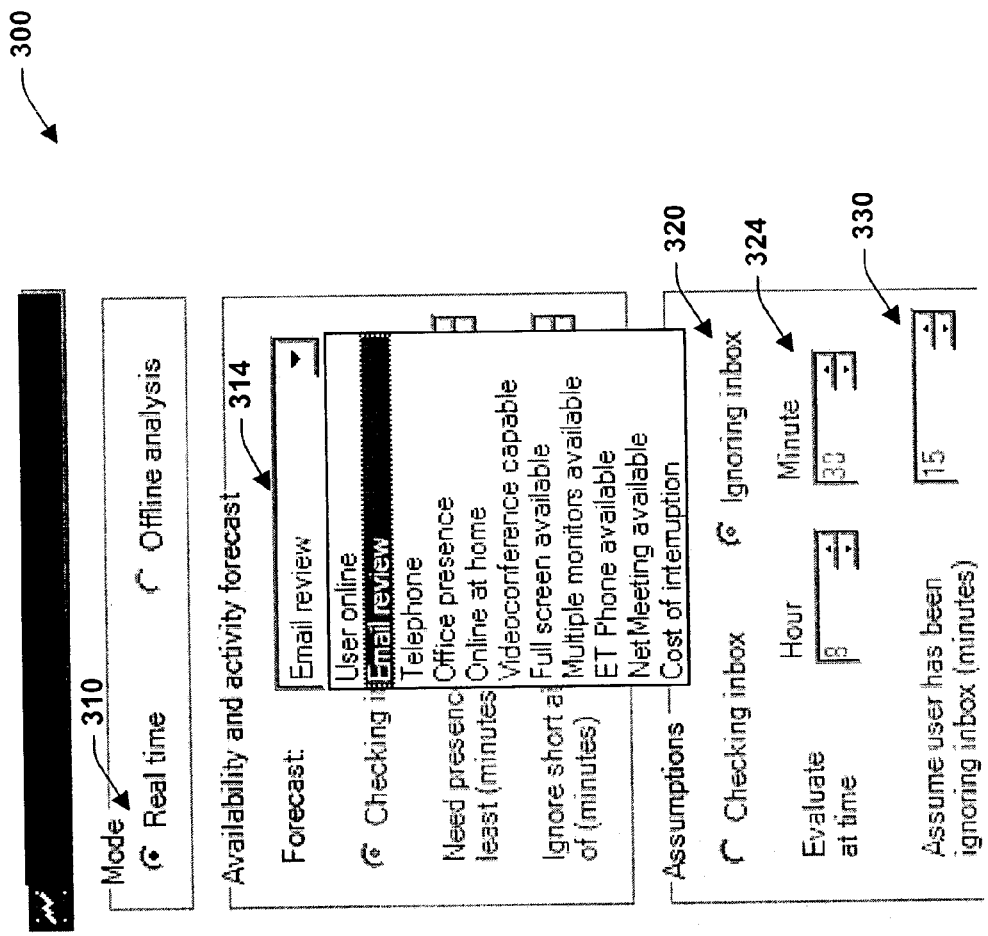
FIG. 3 is a diagram illustrating a Graphical User Interface for configuring a Coordinate system in accordance with an aspect of the present invention.

Before proceeding with a discussion of FIG. 3, it is noted that one or more graphical user interfaces can be provided in accordance with the present invention. It is further noted that the respective interfaces depicted can be provided in various other different settings and context. As an example, the applications and/or models discussed herein can be associated with a desktop development tool, mail application, calendar application, and/or web browser although other type applications can be utilized. These applications can be associated with a Graphical User Interface (GUI), wherein the GUI provides a display having one or more display objects (not shown) including such aspects as configurable icons, buttons, sliders, input boxes, selection options, menus, tabs and so forth having multiple configurable dimensions, shapes, colors, text, data and sounds to facilitate operations with the applications and/or models. In addition, the GUI can also include a plurality of other inputs or controls for adjusting and configuring one or more aspects of the present invention and as will be described in more detail below. This can include receiving user commands from a mouse, keyboard, speech input, web site, remote web service, pattern recognizer, face recognizer, and/or other device such as a camera or video input to affect or modify operations of the GUI.

Turning to FIG. 3, an interface 300 illustrates exemplary forecasting options in accordance with an aspect of the present invention. The interface 300 can be employed with the systems previously described with respect to FIGS. 1 and 2. In one aspect, a mode selection at 310 can be provided that enables real time analysis based upon current observations or an offline analysis based upon past data and observations. At 314, the type of availability and activity forecast to be retrieved can be selected. Such forecasts can include how long a user will remain online or when they will become online, forecasting time associated with an a e-mail review, time associated with a telephone call, office presence, online at home, video conference capable, full screen available, multiple monitors available, type of phone available, net meeting available, and cost of interruption selections, for example. Associated assumptions can be selected at 320 such as whether or not the user's inbox is checked or whether the inbox should be ignored. At 324 the time for evaluation can be set including hour and minute settings. At 330, another assumption can be set regarding the time the user has been checking or ignoring their respective message inbox. It is to be appreciated that the selections depicted in the interface 300 are exemplary in nature and that forecasting can be provided in substantially any communication and/or collaboration environment between systems and/or users.

Figure 4:
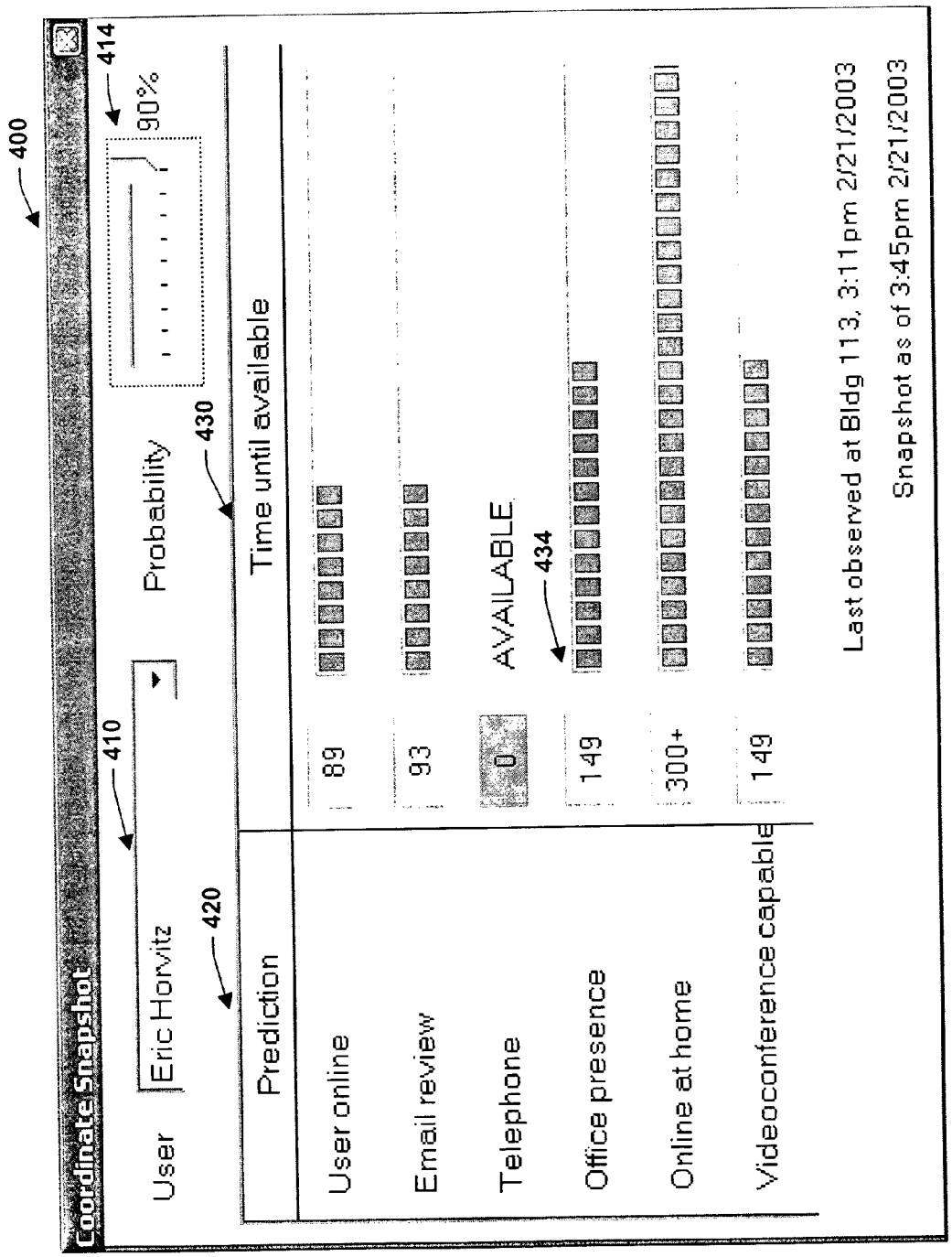
FIG. 4 is a diagram illustrating a Graphical User Interface for displaying forecasts in a Coordinate system in accordance with an aspect of the present invention.

Referring to FIG. 4, an interface 400 illustrates exemplary forecasting predictions in accordance with an aspect of the present invention. Similar to the interface 300 above, the interface 400 can be employed with the systems previously described with respect to FIGS. 1 and 2. In this aspect, a presence pallet is provided in the interface 400, wherein various predictions can be displayed relating to time until a user is available to communicate according to various forms of communications or capabilities. At 410, a user is selected for the respective predictions (e.g., Eric Horvitz). At 414, a probability threshold adjustment is provided to enable users to adjust the amount of certainty associated with the various predictions. At 420, one or more prediction categories can be provided such as user online, email review, telephone, office presence, online at home, videoconference capable, and so forth. At 430, associated prediction times are displayed for the prediction categories at 420. This can include graphical and/or numerical results depicting the predicted amount of time until a user is able to communicate via a given communications medium. For example, at 434, a graphical display and numeric display indicate the user selected at 410 will likely be in the office in about 149 minutes with a 90% probability. In addition, other information offering presence clues can be displayed in the interface 400 such as "Last observed at Bldg 113, 3:11 pm Feb. 21, 2003."

Figure 5:
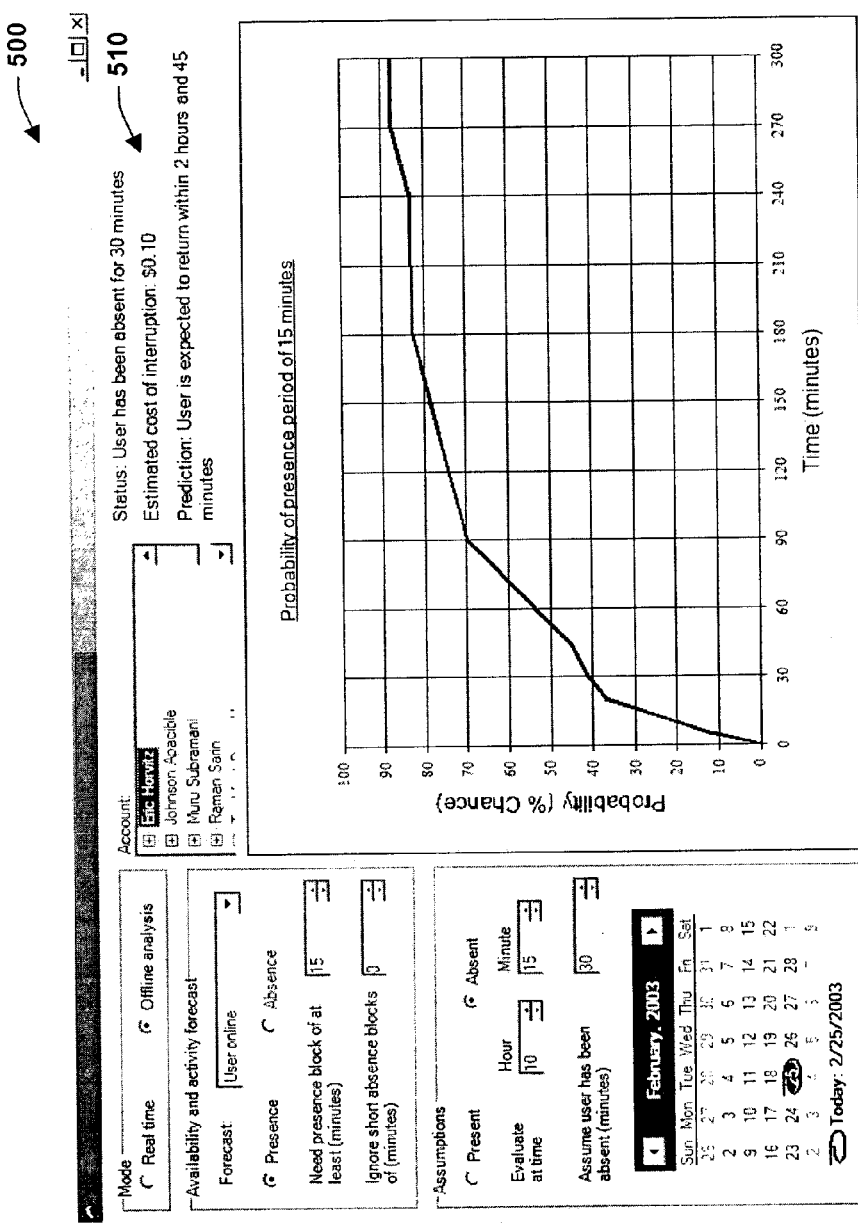
FIGS. 5–7 illustrate a Graphical User Interface for interacting with a Coordinate system in accordance with an aspect of the present invention.
Figure 6:
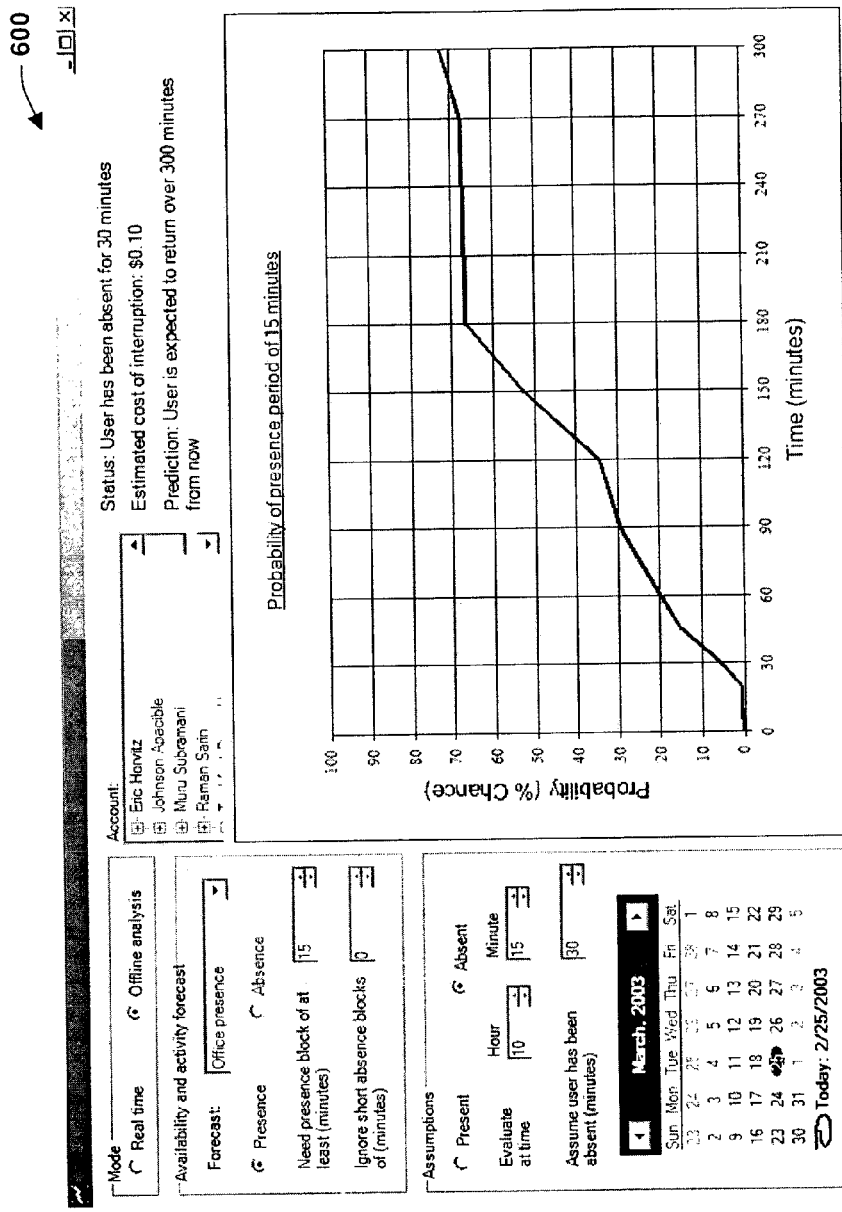
Figure 7:
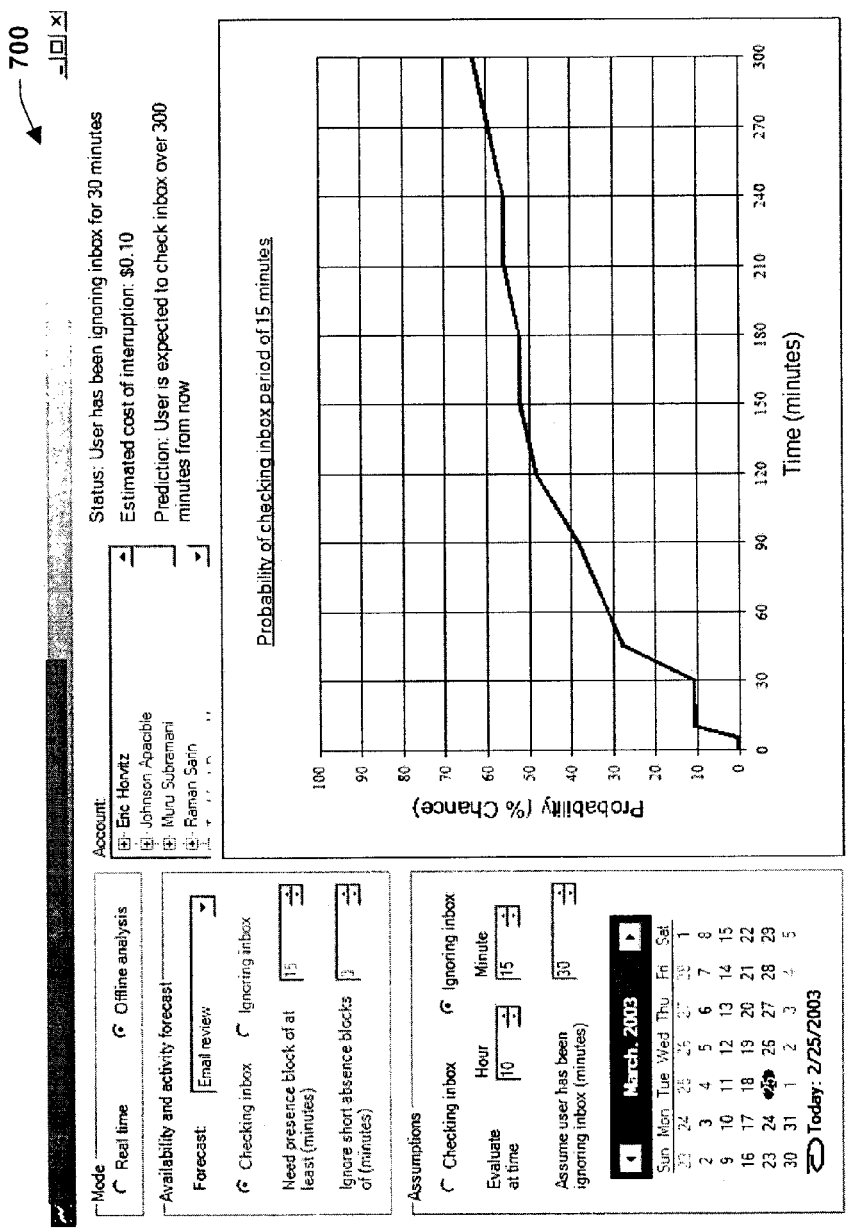

Referring to FIG. 5, an interface 500 for predicting presence is illustrated in accordance with an aspect of the present invention. The interface 500 displays a Coordinate interface that provides means for selecting query classes and formulating queries for real-time situations or in offline analyses. In the case illustrated, a query has been entered about the likelihood that a user will return to the office for a period of at least 15 minutes, given that he or she has been absent for 25 minutes at 10:15 am on a weekday. A set of relevant data is gleaned from an event database (described above) and a Bayesian network is constructed. The network is used to generate the displayed cumulative probability distribution about when the user will return. For these samples, the system also shares a text summary forecast illustrated at 510 based on a 0.80 confidence threshold (e.g., Status: User has been absent for 30 minutes, Estimated Cost of Interruption: $0.10, Prediction: User is expected to return). Similar analyses can be performed for other events of interest such as illustrated in FIGS. 6 and 7 for an office presence analysis and an email review analysis, respectively. As will be described in more detail below, methods are provided for folding in consideration of meetings and the construction of models that provide forecasts of a user's availability. The following describes the construction of models of meeting attendance, interruptability, and location.

Figure 8:
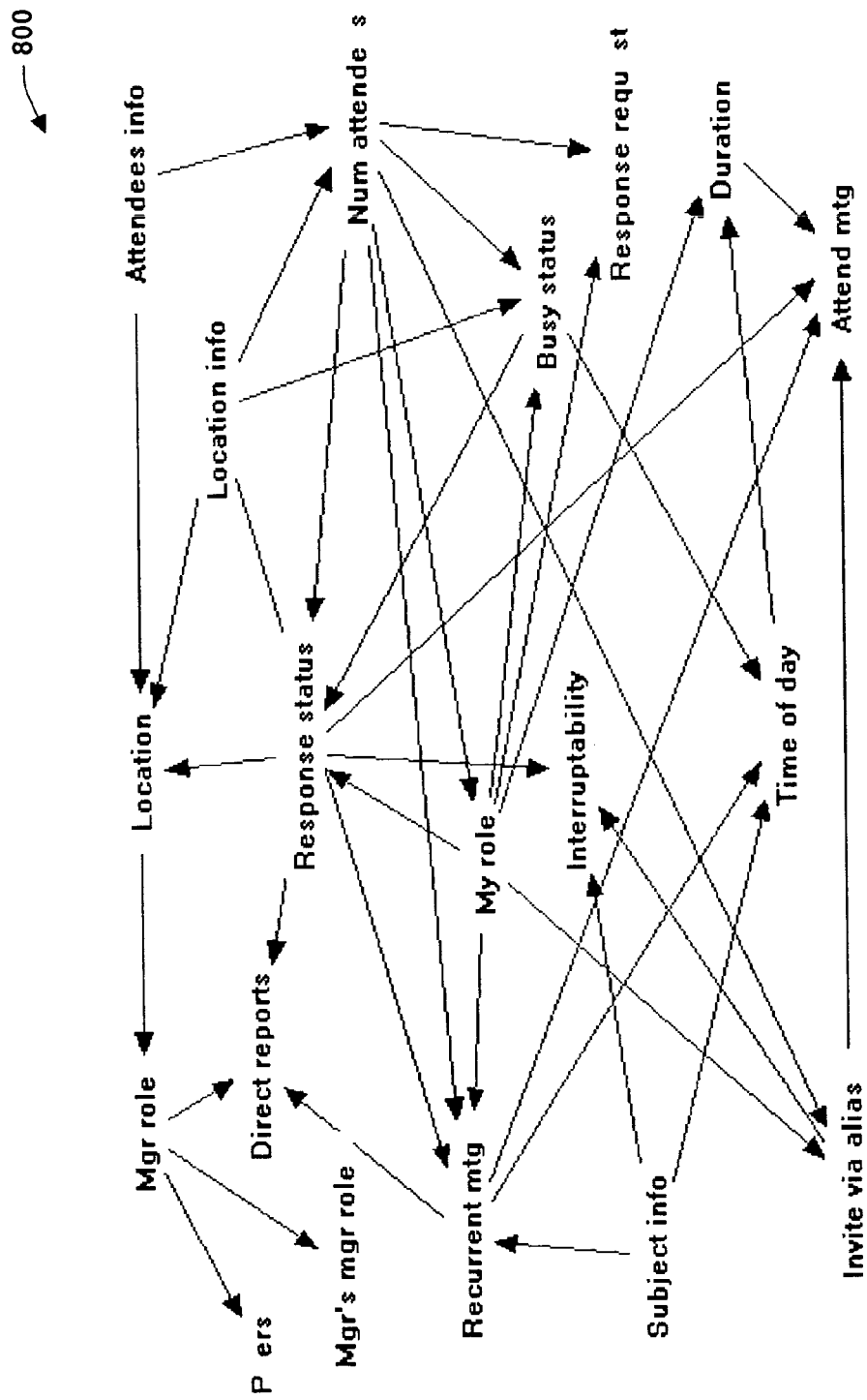
FIG. 8 is an influence diagram illustrating a Bayesian network that predicts the likelihood of attending meetings and probability distributions over the interruptability and location of meetings in accordance with an aspect of the present invention.
Figure 9:
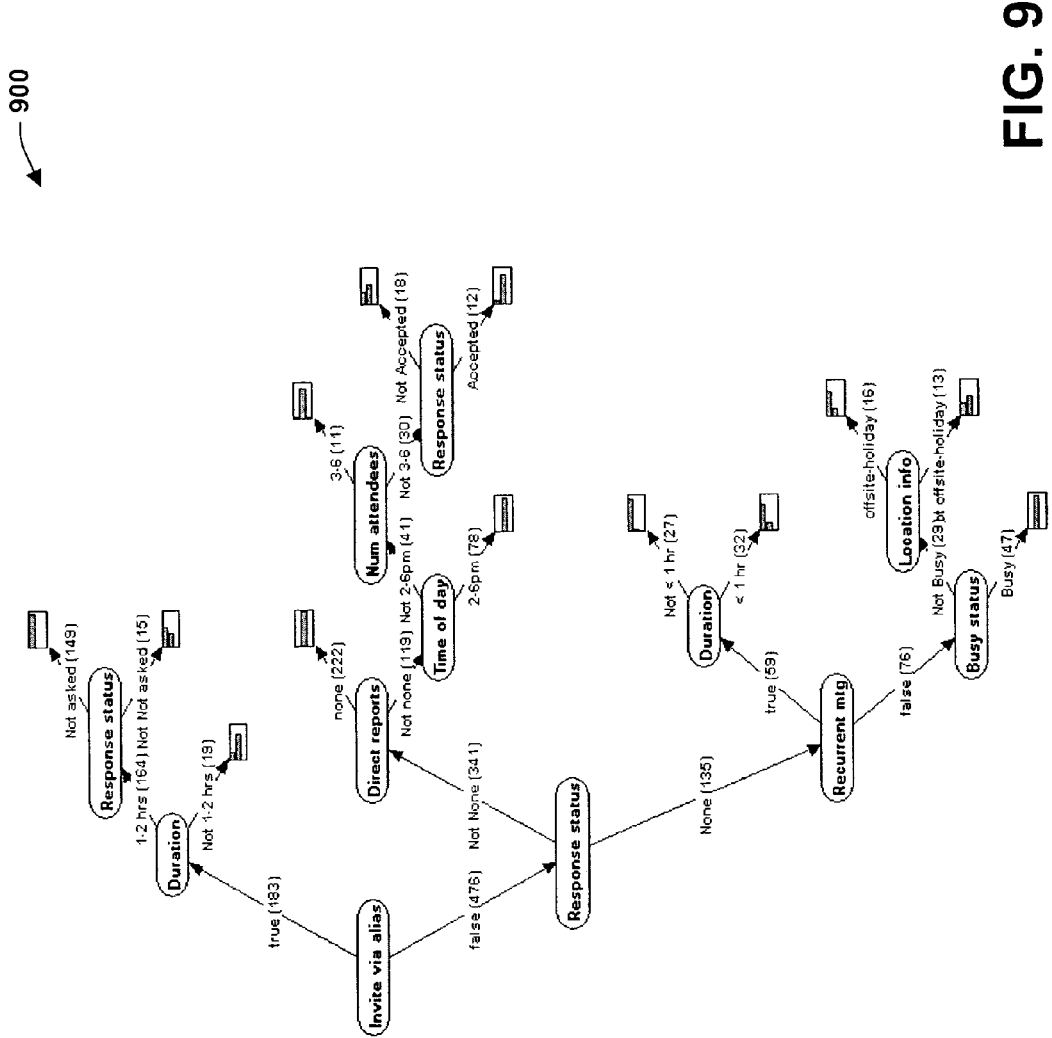
FIG. 9 is a decision tree for predicting the probability that a user will attend a meeting in accordance with an aspect of the present invention.
Figure 10:
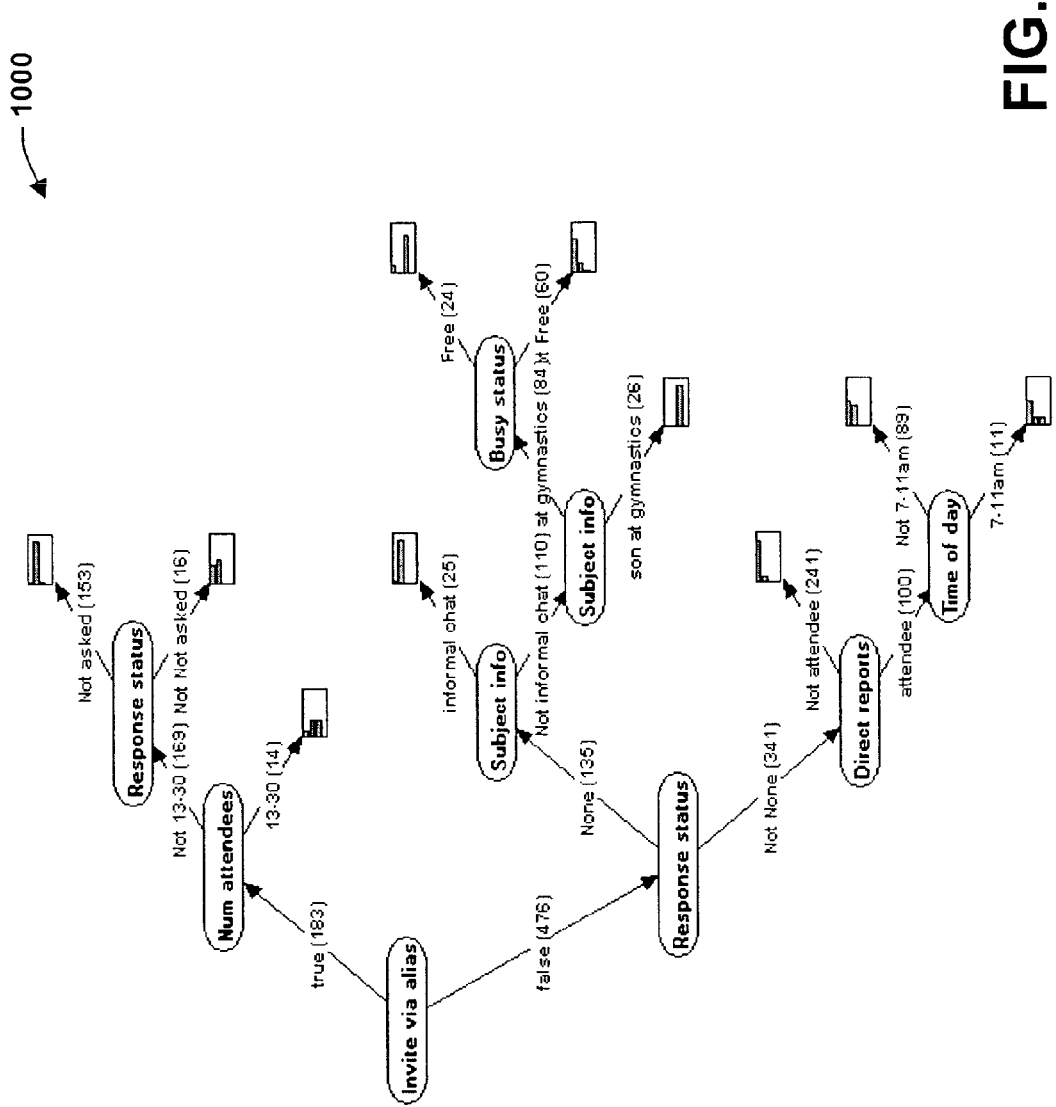
FIG. 10 is a decision tree for predicting the interruptability of meetings built from training data in accordance with an aspect of the present invention.

FIGS. 8–10 illustrate an influence diagram and decision trees for modeling various aspects of the present invention. The present invention provides systems and methods for analyzing multiple distinctions about meetings and integrating these observations into the overall Bayesian analysis of presence and availability. Beyond enhancing predictive models about absence and presence, models can be learned that relate multiple attributes of an appointment to the likelihood that a meeting will be attended, and to the interruptability of meetings. The present invention can also learn models to infer the location of meetings when locations are not clear from location strings listed with appointments. Such inferences can provide valuable inputs for interactive tools such as shared calendars as well as other tools and applications.

The Coordinate system logs meetings stored in a user's calendar, noting the status of properties of appointments made available in an online calendar (e.g., Microsoft Outlook) and several additional computed properties. Logged data is employed to learn models that can predict attendance, interruptability, and location. For building models of attendance, Coordinate automatically accesses appointment properties from appointments from a commercially available server (e.g., Microsoft Exchange server). Coordinate creates a draft training set of appointments and their properties, and marks an attendance field for respective appointments with guesses made via the use of a set of heuristics about attendance. The attendance heuristics consider the extension of desktop activity into a significant portion of scheduled meeting as evidence that a meeting was not attended and considers the lack of activity during a meeting as evidence that a meeting was attended.

Heuristics for labeling data can vary in accuracy, depending on the task. As can be appreciated, the activity-based heuristics for annotating meeting attendance may be noisy. Thus, Coordinate's guesses are taken with respect to attendance as a draft data set and make available tools that allow users to refine the draft with hand labeling of attendance. Coordinate can generate a form that displays appointments in order of their occurrence, and displays an attendance field containing the guesses about attendance. Beyond editing the attendance field, users can also add assessments of the physical location of meetings, and how interruptible they are in different meetings, specifying whether meetings are low, medium, or high interruptability. The annotated calendar log is utilized to construct a model that can predict the likelihood that a user will attend a future meeting given appointment properties.

Beyond time of day, and day of week, meeting properties considered at training and prediction time include the meeting date and time, meeting duration, subject, location, organizer, number and nature of the invitees, role of the user (user was the organizer versus a required or optional invitee), response status of the user (responded yes, responded as tentative, did not respond, or no response request was made), whether the meeting is recurrent or not, and whether the time is marked as busy or free on the user's calendar. The Coordinate system accesses an active directory (e.g., Microsoft Active Directory) service to recognize and annotate organizational relationships among the user, the organizer, and the invitees, noting, for example, whether the organizer and attendees are organizational peers, direct reports, managers, or managers of the user's manager. Several experiments were performed as part of an evaluation of the accuracy of the predictive model for calendar attendance, interruptability, and location.

FIG. 8 displays a Bayesian network 800 learned from the data of a single user that shows the probabilistic dependencies among variables extracted from an online calendar and variables of interest represent. The model 800 was constructed by collecting data from a six-month period of meetings stored in a user's online calendar between October 2001 and March 2002. The data set includes appointments from 659 meetings. 559 of the appointments were used to train the model, leaving 100 cases as a holdout set for testing. The owner of the calendar was asked to annotate cases with information on whether meetings were attended, to note the location of the meetings, and also to indicate the interruptability of the meetings, discretized into low, medium, and high interruptability. For the data set, 0.64 of the appointments were attended. The user assigned 0.5 of the cases an interruptability property of low, 0.4 of the cases medium, and 0.1 of the cases high. The model performs well; the classification accuracy on holdout data was 0.92 for predicting attendance and 0.81 for assigning interruptability.

Decision trees 900 and 1000 for predicting meeting attendance and interruptibility are displayed in FIGS. 9 and 10, respectively. As displayed in FIG. 9, key influencing variables for predicting meeting attendance include whether the meeting was organized via an alias or an individual, the duration of the meeting, the response status, whether the meeting is recurrent or not, the number of attendees, whether direct reports have been invited, the information included in the location field, and whether the meeting is marked as busy time or not. The bar graphs at the leaves of the decision tree 900 display the probability of attendance versus non attendance, with the event p(not attend|meeting properties 1 ... n) at the top position, followed by p(attend|meeting properties 1 ... n).

As indicated in FIG. 10, the main influencing variables for predicting the interruptability of meetings is whether a user is invited via an alias versus a person, whether the user responded to the appointment, the number of attendees, whether direct reports are invited, and the subject of the meeting. The probability distributions over interruptability are displayed as bar graphs at the leaves of the decision tree 1000 where the states from top to bottom are low, medium, and high interruptability.

Figure 11:
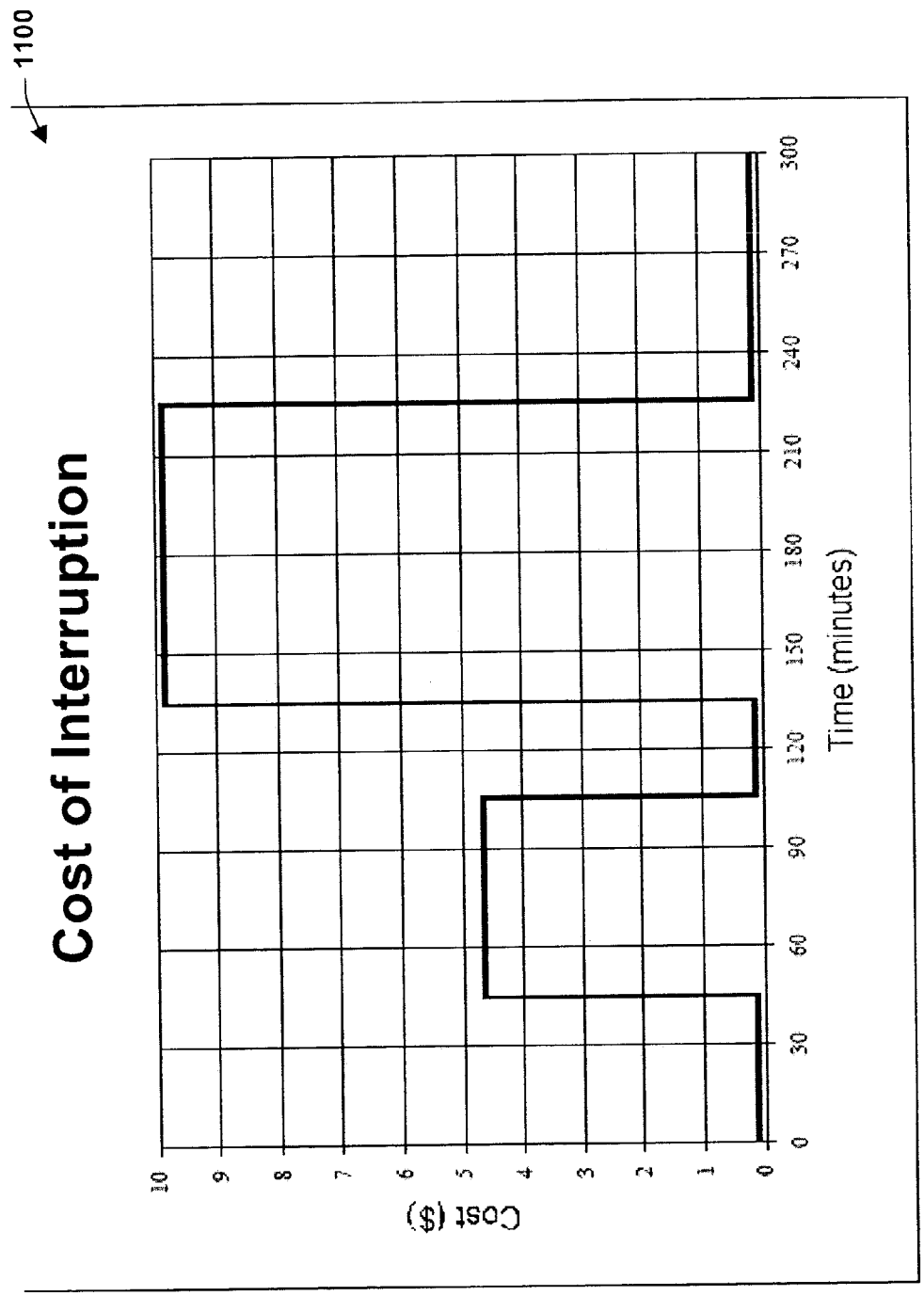
FIG. 11 is a diagram illustrating cost of interruption in accordance with an aspect of the present invention.

The Coordinate system employs models of attendance and interruption in several ways. The system allows direct queries about the likelihood that a user is attending or will attend a meeting. Coordinate also can share information about the expected cost of interruption (ECI) for a user at the present or future times. Users are provided with a facility to associate a dollar-value cost of interruption for each interruptability level. They also assess default costs of interruption for free periods for prototypical times of day and days of week. FIG. 11 is a diagram 1100 depicting the cost of interruption on the vertical axis versus the time of interruption on the horizontal axis.

The Coordinate system computes an expectation cost of interruption (ECI) as follows:

$$ECI = p(A^m \mid E, \xi) \sum_i p(c_i^m \mid E, \xi) c_i^m + (1 - p(A^m \mid E, \xi)) c^d$$

where $A^m$ is the event of attending a meeting, $c_i^m$ is the cost of interruption associated with interruptability value i, $c^d$ is the default cost for the time period under consideration, and E represents observations about calendar attributes, the proximal context, day of week, and time of day.

The Coordinate system also integrates inference about the nature and timing of meetings into its predictions about absence and presence. The system performs an approximate meeting analysis to forego the complexity of considering multiple patterns of meetings. In the approximation, the present invention makes the assumption of meeting independence, and considers meetings separately. A subset of meetings on the user's calendar are considered to be active for the query based on their proximity to the times and transitions dictated in the query. For active meetings, a distinct Bayesian network model, and associated cumulative distribution, is computed for return or absence over the course of a meeting scope, that extends the meeting by periods of time before and after the meeting. In constructing the model for a respective meeting, the case-acquisition component of Coordinate identifies cases that are consistent with the proximal context defined by the query. Generally, only meetings that were marked as attended are considered. Finally, the cumulative distributions for time until return or absence for a respective meeting horizon are combined with the cumulative distribution for the no-meeting situation.

The system performs the above combination by constructing a cumulative distribution for a presence transition for the no-meeting situation. This cumulative distribution is computed in the manner described above, employing cases consistent with the query where no meetings were scheduled or where the user indicated that a meeting was not attended. Then, for the span of time represented by a respective meeting's scope, the cumulative distributions for the noattend and attend cases are summed together, weighted by the inferred likelihood that the user is attending or will attend the meeting.

Figure 12:
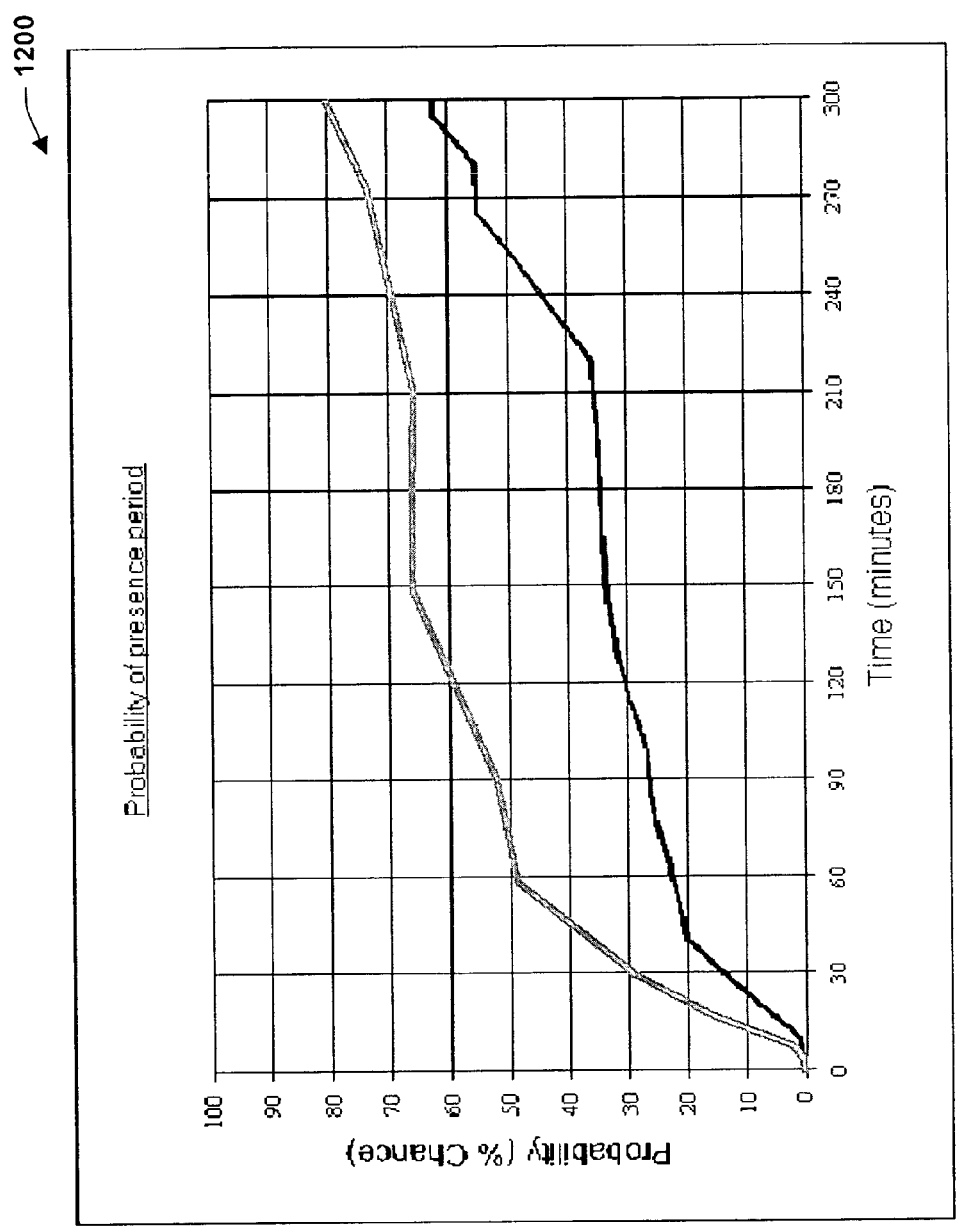
FIG. 12 is a diagram illustrating influence of meeting analysis on a presence forecast in accordance with an aspect of the present invention.

FIG. 12 depicts a diagram 1200 that relays the influence of the integration of the likelihood of attending meetings on the forecast of a user's availability. A query has been at 1:20 pm on a weekday about when a user is expected to return to their desktop machine when they have already been absent for 15 minutes. The uppermost curve shows the cumulative distribution of a user returning for the no-meeting situation. The lower curve shows the result of folding in a consideration of active meetings, considering the likelihood that the user will attend a respective meeting. In this case, three meetings were under consideration, including meeting from 1–2 pm, 2:30–3:30 pm, and 4–5 pm.

Figure 13:
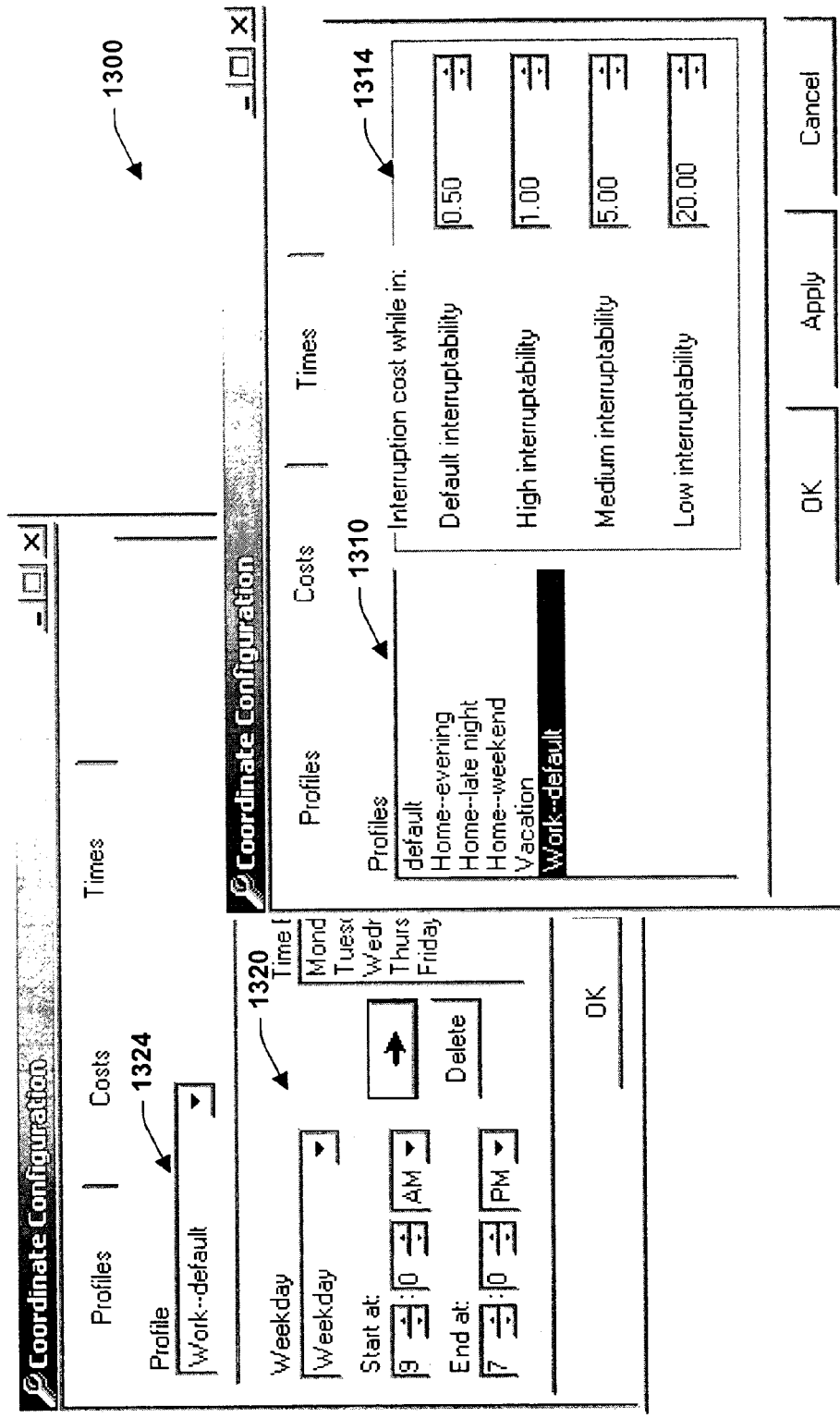
FIG. 13 is a Graphical User Interface illustrating Coordinate system configuration in accordance with an aspect of the present invention.

FIG. 13 illustrates a Coordinate system 1300 in accordance with an aspect of the present invention. In this aspect, one or more profiles may be set-up for a user that associates cost of interruption with the selected profile, wherein various time periods can be set for a selected profile. At 1310, various profiles can be selected such as default, home-evening, home-late night, home-weekend, vacation, work-default, and so forth. An interruption cost can then be associated with a selected profile at 1314 such as default interruptability, high interruptability, medium interruptability, low interruptability, and so forth. As can be appreciated, more finer-grained categories of interruptability can be provided. At 1320, various starting and ending times, days, and calendar periods can be selected for a given profile selected at 1324.

Referring to FIG. 14, an event-logging screen 1400 is illustrated in accordance with an aspect of the present invention. The event-logging screen 1400 illustrates some sample events that may be captured and stored in an event-logging database described above. Such events can then be employed to construct and train one or more learning models in accordance with the present invention. For example, some of the events recorded in the screen 1400 include system presence events including time and dates, background noise audio events, speech audio events, and so forth. As can be appreciated a plurality of such events may be recorded that indicate the comings and goings of users. Also, various inputs from desktop machines, handheld machines, mobile machines, and/or other components may be employed to capture respective events.

Figure 28:
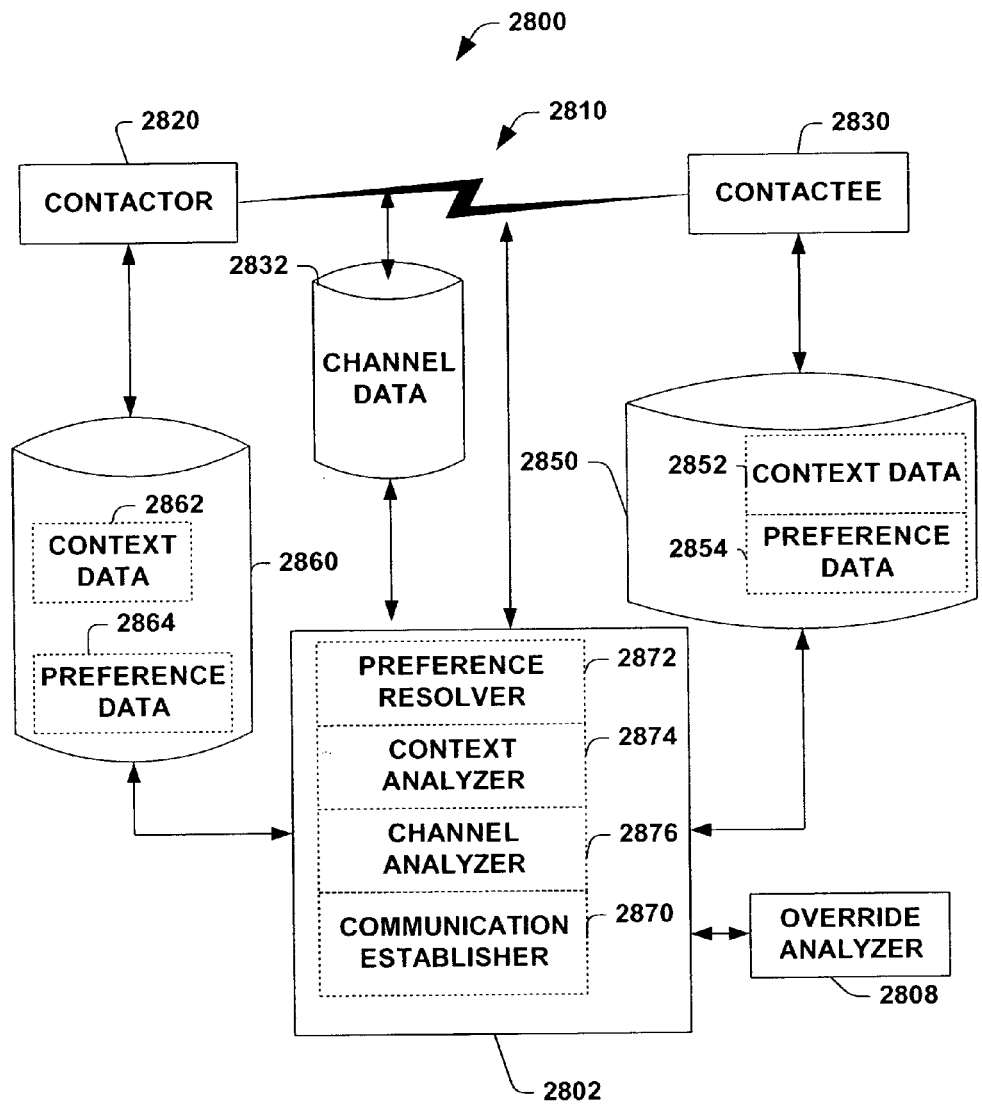
FIG. 28 is a schematic block diagram of a communications system in accordance with an aspect of the present invention.
Figure 29:
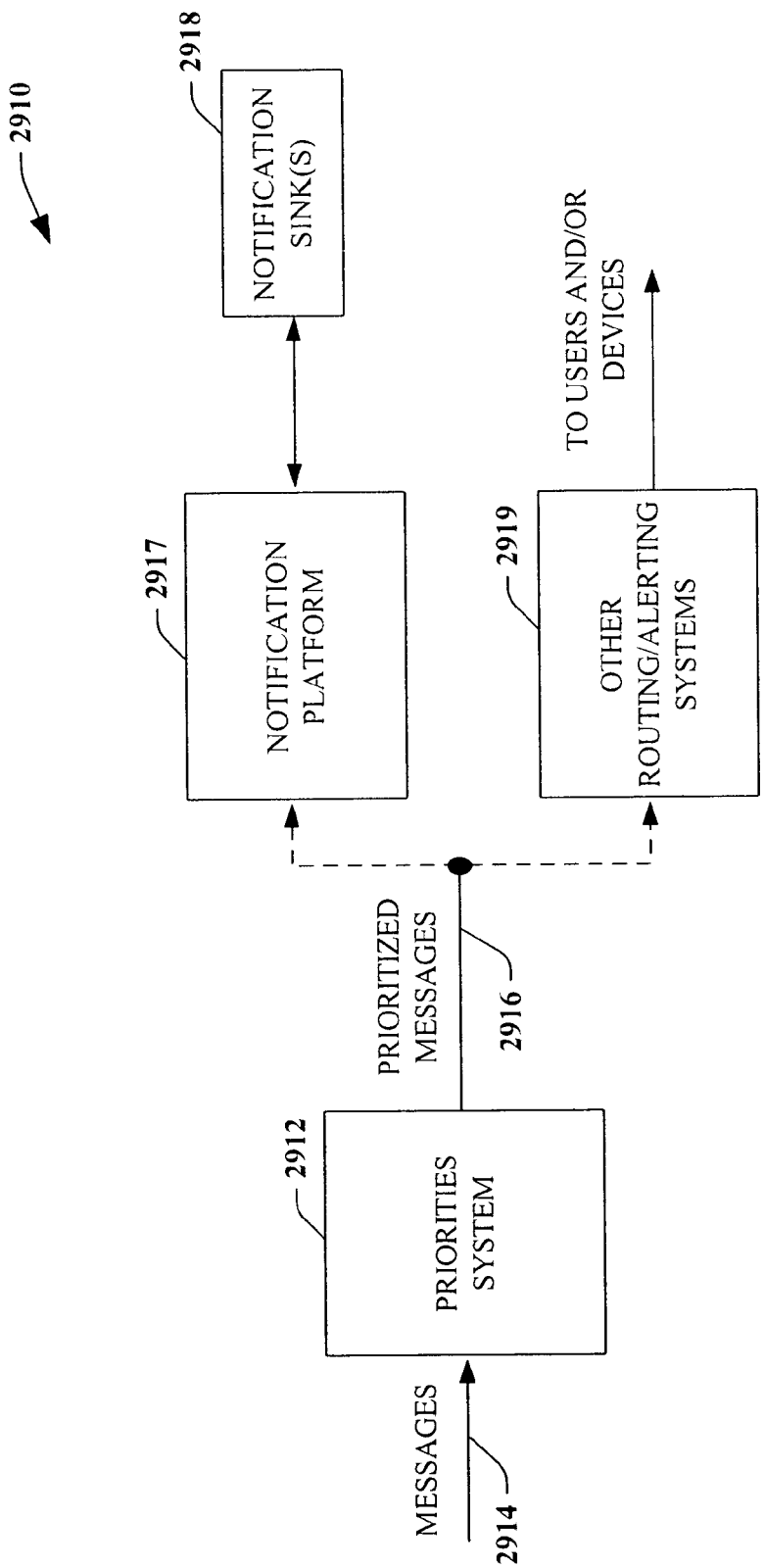
FIG. 29 is a schematic block diagram of a priorities system in accordance with an aspect of the present invention.
Figure 30:
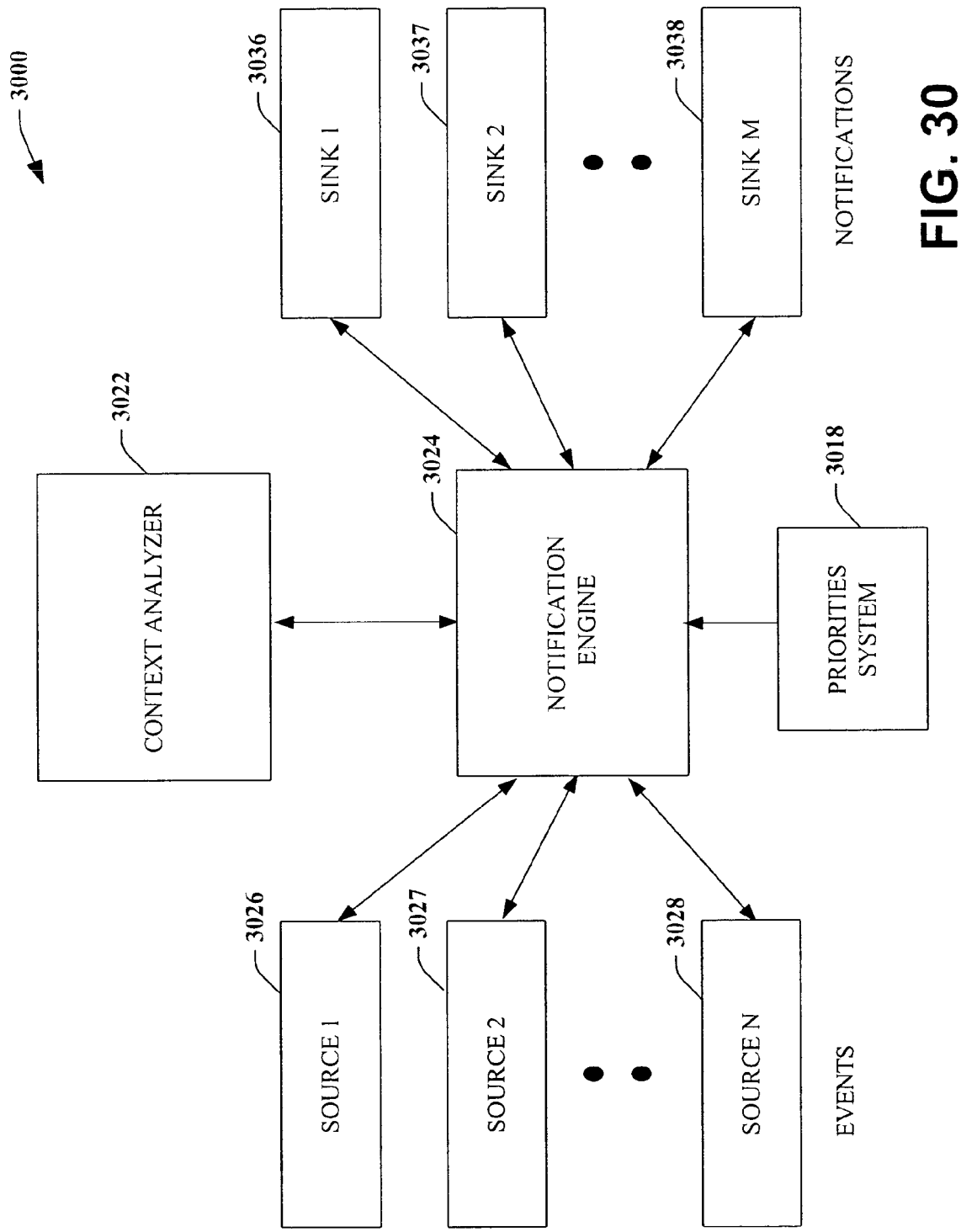
FIG. 30 is a schematic block diagram illustrating systematic cooperation between a notification engine and a context analyzer according to an aspect of the present invention.

Before proceeding, it is noted that the Coordinate system can be applied to various communication, messaging, priorities, notification, and coordination applications that are described in more detail with respect to FIGS. 28–30. In one example, a "Bestcom" system (described with respect to FIG. 28) can be employed that centers on creating a service that provides people with best-effort communications based on a consideration of context, available channels and preferences about communications. In Bestcom, an agent acts as a proxy, and considers the goals and context of a contactor and contactee. Although preferences of both participants of a communication may be considered, many aspects of Bestcom put strong weight on the communication preferences of the contactee, as it is the contactor who typically seeks attentional resources from the contactee. Bestcom considers preferences of about how to handle incoming communications, based on the identity of the contactor, the initial channel selected (e.g., telephone, instant messaging, email), and the computed or sensed context of the contactee.

In situations where the explicit Bestcom service is explicitly invoked by the contactor, annotations about the nature of the communication may be shared as part of a Bestcom metadata schema. For example, a contactee may wish to invoke Bestcom to speak with a coauthor about an edit she wishes to make to a shared document by invoking the service within a particular location in a word-processing application. A Bestcom service can share the goals of the communication and the available channels with the contactee's agent. The spirit of Bestcom is to maintain privacy about a contactee's state. Although contextual information about this state is used in communications decision making, the contactor is usually privy only to summary decisions about whether and how to handle the communication.

Actions include establishing a real-time connection on the same channel, shifting the channel, taking a message, or providing the contactor with a better time and scheduling a future communication. Bestcom efforts have included the development of basic preference-assessment tools for such tasks as establishing and editing groups of people assigned different communication priorities, and to assess the cost of interruption in different contexts. Although basic versions of Bestcom center on simple assessments and the direct sensing of a user's state, the present invention employs the value of richer contextual inference about presence and availability provided by the Coordinate system.

Figure 15:
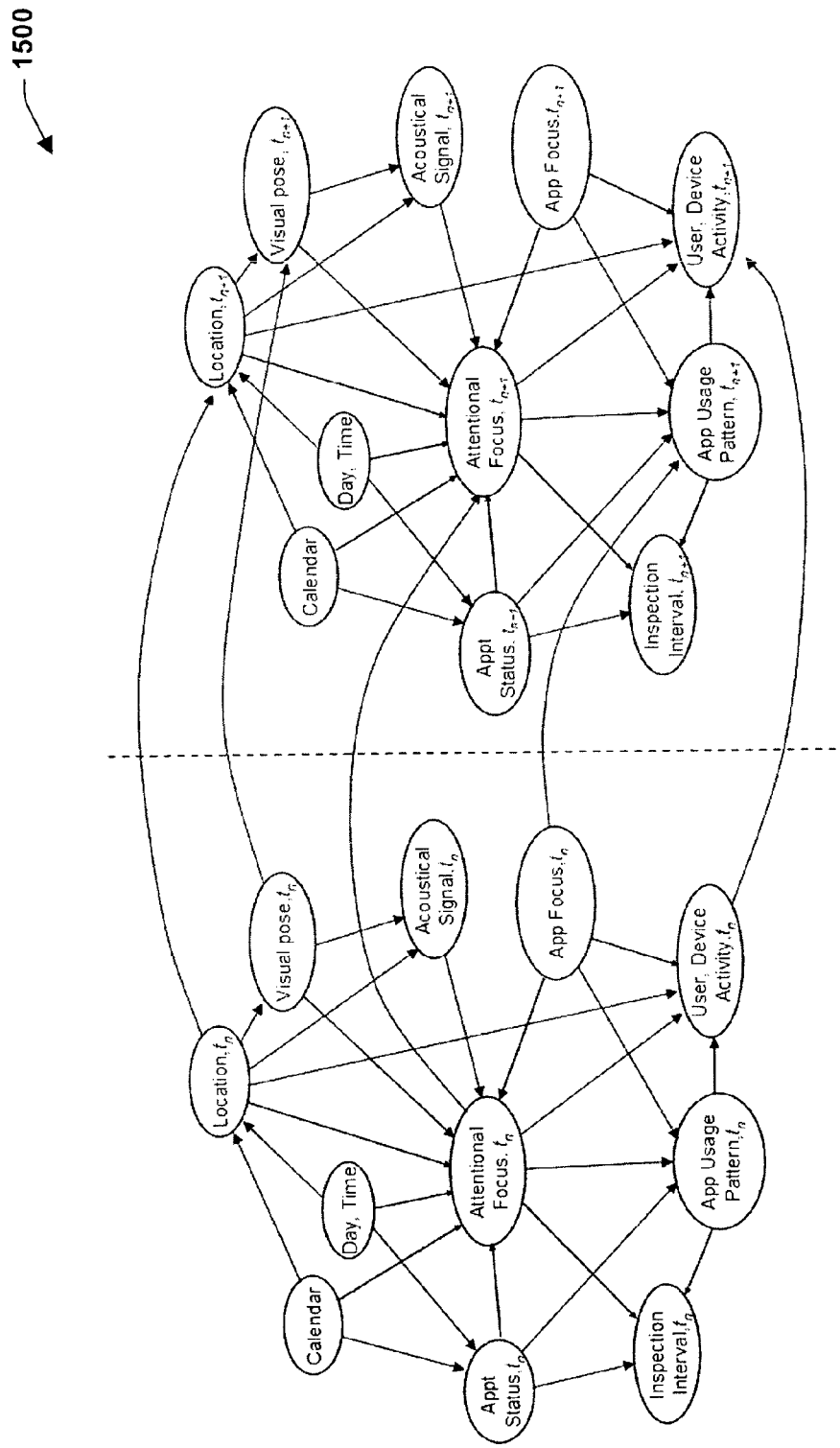
FIG. 15 is a diagram illustrating a dynamic Bayesian model in accordance with an aspect of the present invention.

FIG. 15 is a diagram 1500 illustrating a dynamic Bayesian model for reasoning about a user's attentional focus capturing key variables and dependencies in accordance with an aspect of the present invention. Initial versions of an alerting mediation system employed handcrafted dynamic Bayesian network models as illustrated in the diagram 1500. A critical variable considered in the Bayesian network is attentional focus. The states of this variable were structured into approximately fifteen mutually exclusive states of attention, capturing a spectrum of user situations, that segmented contexts by workload. The states include such distinctions as high-focus solo activity, medium focus solo activity, low focus solo activity, conversation in office, presentation, driving, private personal time, and sleeping, for example.

A goal of the models of attention is to infer the cost of different types of interruption given that a user is of a particular attentional state. To achieve this, the present invention considers the utility, $u(D_i, A_j)$, capturing the cost of a user in attentional state $A_j$ being disrupted by task or communication event $D_i$. This cost can be assessed as the willingness to pay to avoid a disruption in dollars for each combination. Given a set of dollar values to avoid disruptions, and a probability distribution being inferred over the attentional state of a user, an expected cost of interruption (ECI) can be computed by summing over the utilities, weighted by the likelihood of each state of attention, conditioned on the stream of incoming sensory information. That is, the ECI is $$ECI = \sum_j p(A_i \mid E) u(D_i, A_j)$$

wherein $p(A_j|E)$ is the probability of the attentional state, conditioned on an evidence stream E.

Figure 16:
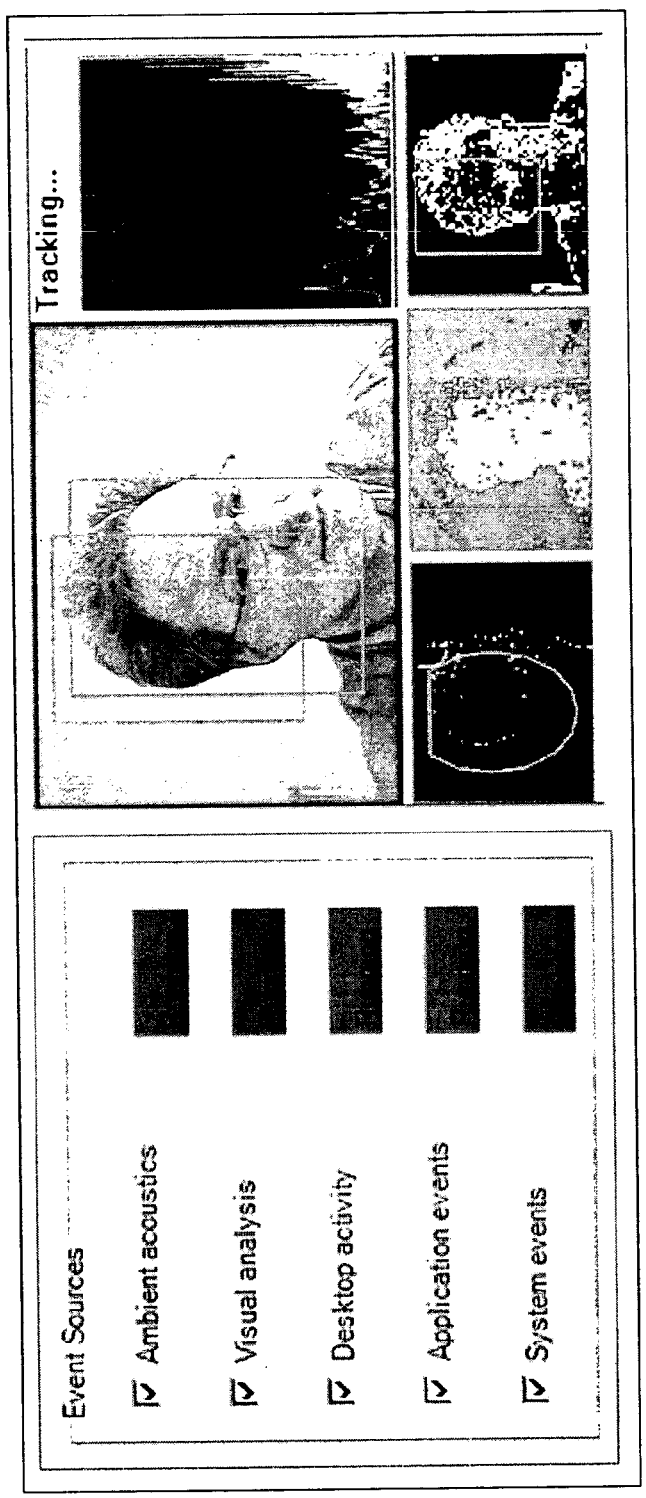
FIG. 16 is a diagram illustrating a control panel for an event system in accordance with an aspect of the present invention.

FIG. 16 is a diagram 1600 illustrating a control panel for an event system showing event classes and graphical display of processing acoustical and visual information in accordance with an aspect of the present invention. The interface depicted at 1600 considers additional details of a real-world implementation of a system that can provide the cost of interruption from a stream of sensory information. In this example, the activity of a user monitored interacting with a client device with an event sensing and abstraction system that senses computer events from an operating system and applications executed on the client. In addition a visual pose is processed with a Bayesian head tracking system and ambient acoustical activity with a audio signal processing analysis. Finally, a user's calendar is automatically examined via an interface to an electronic calendar application (e.g., Outlook) to determine if a meeting is scheduled. FIG. 16 displays an event monitoring and control system named Infloflow which is described in more detail below.

A client event system provides an abstraction tool for coalescing patterns of low-level system events into higher-level events. The present models of attention both low- and high-level events. For example, low-level states can be captured as the application being used, whether the user is typing, clicking with the mouse, as well as a set of higher-level events such as the pattern of switching among applications (e.g., single application focus versus switching among applications), indications of task completion (e.g., a message being sent, a file being closed, an application being closed, etc.).

For the calendar events, whether a meeting is in progress can be considered, the length of time until the meeting is over, and the location of the meeting. For the acoustical and visual analysis, it can be determined whether conversation or other signal is identified, and whether a user is present near a desktop system, and if so, if the user is gazing at or away from the computer.

Figure 17:
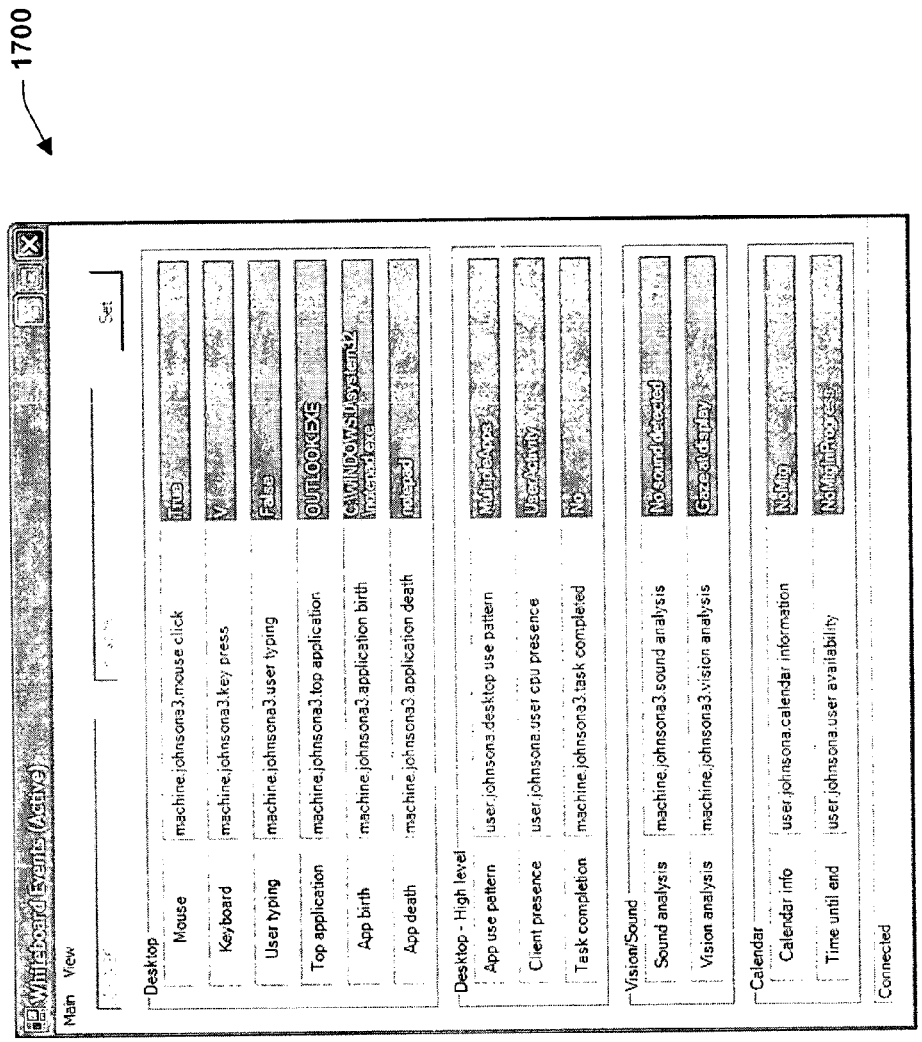
FIG. 17 is a diagram illustrating an event whiteboard in accordance with an aspect of the present invention.

FIG. 17 is a diagram illustrating an event whiteboard 1700 in accordance with an aspect of the present invention. The event whiteboard 1700 is employed to capture and share out the state of low-level and higher-level events considered by the system. As indicated in the diagram, events include details about the birth and death of applications, the application currently "on top" and being interacted with, and events that capture usage patterns such as the desktop usage pattern, in this case, showing that a user is switching between different applications within a preset time horizon (of 15 seconds in this case).

Figure 18:
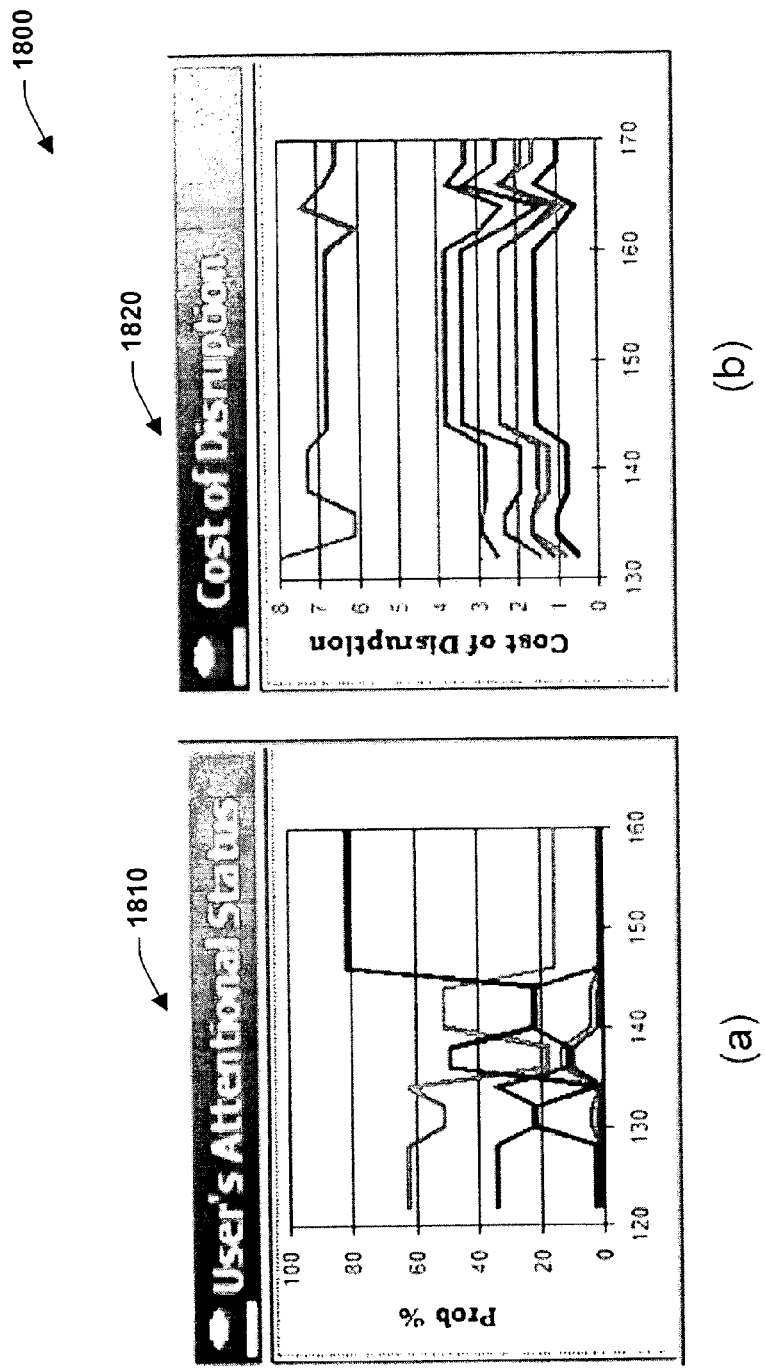
FIG. 18 is a diagram illustrating inferences about attentional states and expected cost of interruption over time in accordance with an aspect of the present invention.

FIG. 18 is a diagram 1800 illustrating inferences about attentional states and expected cost of interruption over time in accordance with an aspect of the present invention. The Inflow system described above considers various events and employs a dynamic Bayesian network to infer a probability distribution over attentional states. An output at 1810 depicts the output of a model that considers eight states of attention, including, High-Focus Solo Activity, Low-Focus Solo Activity, Conversation in Office, Presentation or Meeting, Driving, Private Personal Time, Sleeping, and Now Available. The output 1810 illustrates that the initial high likelihood of Conversation in Office has at the most recent time become dominated by High-Focus Solo Activity.

An output 1820 depicts inferences about the expected cost of interruption over time for different disruptions $D_i$. In this case, it can be computed, from the inferred probability distribution over the coarse user attentional states the expected dollars a user would be willing to pay to avoid different communication events. The curves in the diagram 1820 represent, from top to bottom, the expected costs associated with six different interruptions, including a telephone call, a pager, a full visual alert with audio chime herald, a thumbnail display with audio chime, a full visual alert without the chime, and a thumbnail display without chime.

Figure 19:
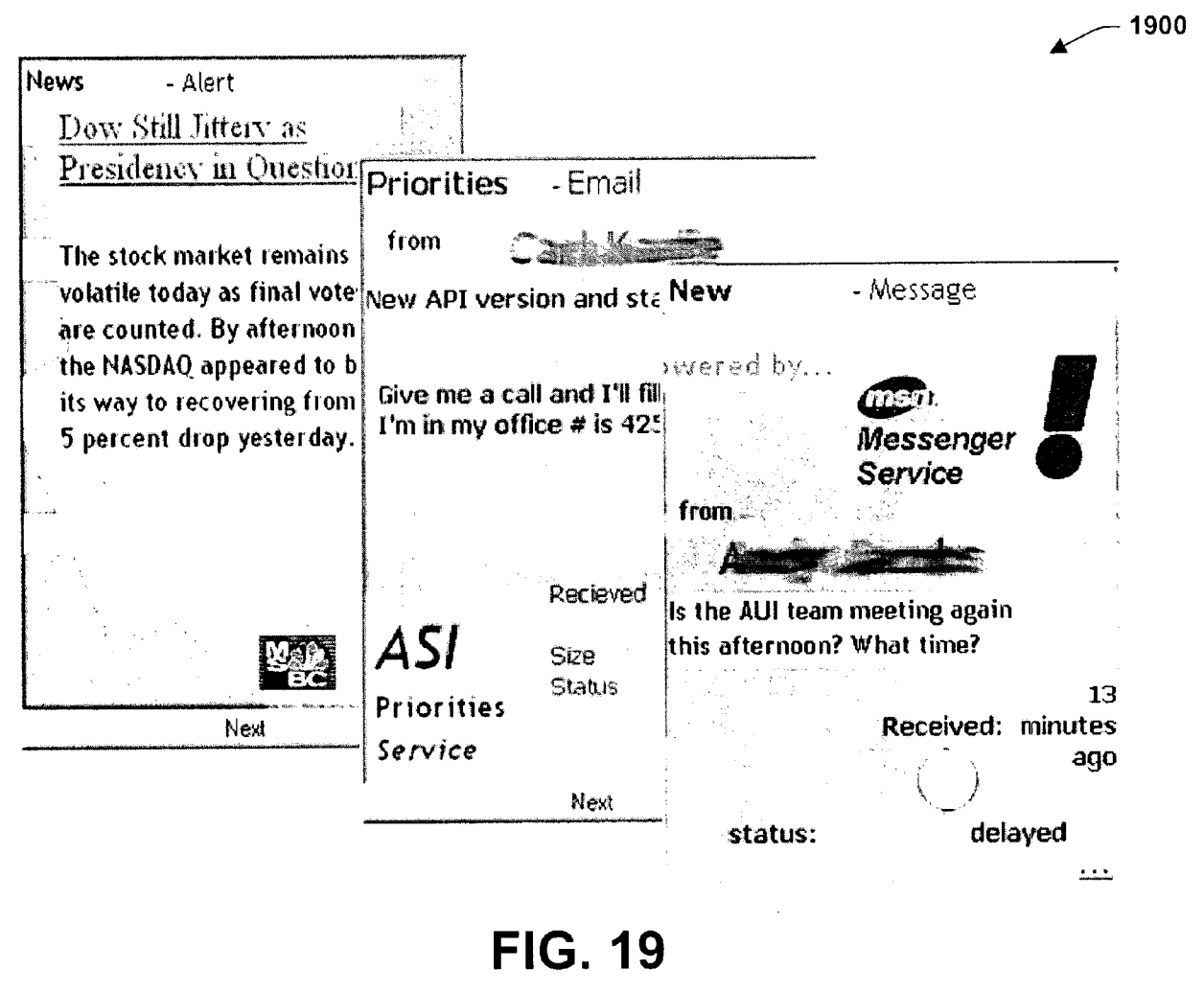

FIG. 19 is a diagram 1900 illustrating alerting displays in accordance with an aspect of the present invention. The diagram 1900 displays an example of the visual display of a full visual alert in a notification system employing models of expected cost of interruption (e.g., notifications regarding news, financial, e-mail, instant messages, and so forth). The alert may be coupled with an audio herald. The present invention can balance such an inferred expected cost for different messaging actions with the expected value of different communications, as assessed in a separate analysis of the value of information.

Figure 20:
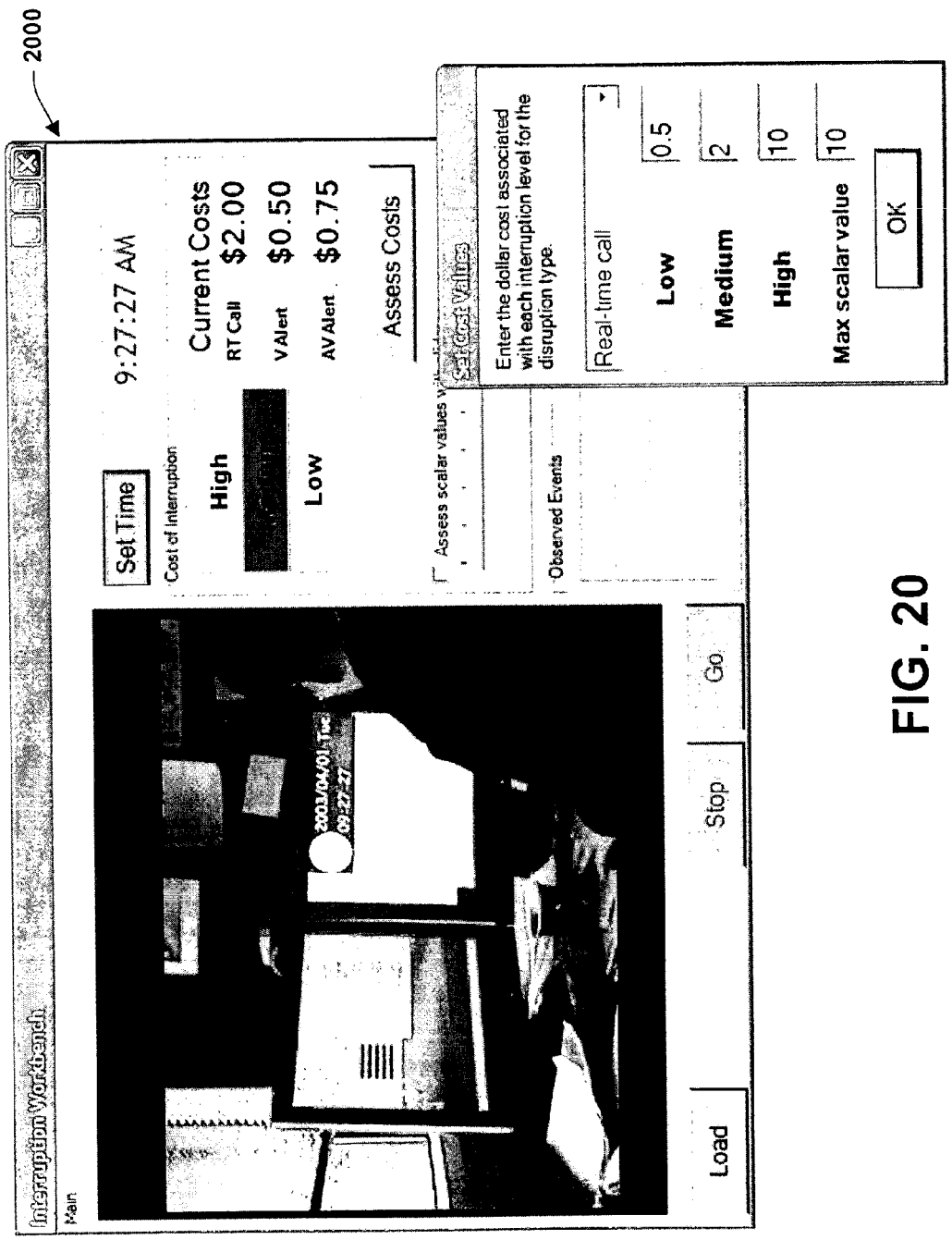
FIG. 20 is a diagram illustrating an interruption workbench in accordance with an aspect of the present invention.

FIG. 20 is a system illustrating an "interruption workbench" 2000 in accordance with an aspect of the present invention, that provides models of the cost of different kinds of interruptions associated with different activities based on the current context of a user, who may be interacting with a computational device. Learning of models are employed that can predict the state of interruptability of users in office settings, based on a logging of events from perceptual sensors and desktop activity as described above. These learning models predict the state of interruptability of users, whereby the detailed state of a user's attentional focus or workload remains implicit. That is, explicit modeling of the state of a user's attention can be bypassed allowing models to be pursued directly that characterize the interruptability of users. FIG. 20 illustrates a tool 2000 named the Interruption Modeling Workbench, that provides for event capture, annotation of segments of time, and building and testing statistical models of interruptability. A screenshot of the tagging tool 2000 being used during a session annotation phase is displayed in FIG. 20.

In a training session, the tool 2000 captures streams of desktop, calendar, and audiovisual events. At labeling time, the tool 2000 displays a time-synched video encoding of a subject's office, that had been captured during the training session with a digital video camera. The workbench event logging system synchronizes events monitored with the training session with scenes from the digital videotape, facilitating the labeling of segments of time and associating them with events.

Generally, the first phase of model building is event and context capture. During this phase, a video camera is employed to record a subjects's activities and overall office context. The videotape with audio track is shot over the shoulder of subjects, revealing the content displayed on the user's screen in addition to a portion of the user's office environment.

The second phase of the construction of models of interruptability is tagging and assessment. The tool 2000 provides for reviewing the video captured of their screen and room during the training session and for labeling their state of interruption at different times. The labeling effort is minimized by allowing users to specify transitions among states of interruptability; rather than requiring users to label each small segment of time, all times between transitions inherit the label of interruptability associated with the transition that defines the start of each distinct segment. The tools 2000 provides a manner for specifying the way that the variables representing the cost of interruptability are discretized and how cost is represented. Subjects can encode their assessments about their interruptability at different times in at least two ways.

With a first approach, subjects tag periods of time viewed on the videotape as high, medium, and low interruptability. As displayed in the foreground of FIG. 20, users are asked to separately map dollar values to each of the high-level states, for different kinds of interruptions, reflecting the willingness to pay to avoid an interruption during the states labeled as high, medium, and low cost of interruption. A dollar value is sought for low, medium, and high for each distinct type of interruption. In a second approach to labeling time segments of a training session, subjects can define a scale and build models that reason directly about the probability distribution over real-valued values, representing the costs of interruption.

In a generation and testing phase, a Bayesian network (or other statistical modeling methodology such as statistical regression, Support Vector Machine (SVM), etc.) can be constructed from the tagged case library of case generated in the first two approaches described above. The task of tagging one or more sessions of office activity creates a database of two-second periods of time tagged with an interruptability label and containing a vector of logged event states. The system then performs a Bayesian learning procedure, employing graph structure search, and builds a Bayesian network model that can be used for real-time predictions about the state of interruptability of users, given a live stream of sensed events.

At run time, the probability distribution over the states of interruptability inferred by the model is used to compute the expected costs of interruption of different classes of interruption. For each disruption under consideration, an expected cost of interruptability is computed by invoking an expectation similar to the expected value calculation defined above, substituting the likelihood of different states of interruptability, $p(I_i|E)$, for the explicit states of attention as follows:

$$ECI = \sum_j p(I_i | E) u(D_i, I_j) \quad (2)$$

Beyond reasoning about the current state of interruptability, the present invention can also generate several variables representing attentional forecasts about future state of interruptability. These include variables that capture inferences about the probability distributions over times until a low, medium, or high state of interruptability will be reached, and more specialized variables representing the times until states of interruptability will be achieved that will persist for different amounts of time. As an example, a variable in this family represents the time until a user will remain in a state of low cost of interruption for at least 15 minutes. Such predictions are generally important for deliberating about if, when, and how to mediate communications. For testing the predictions of the generated models, the workbench 2000 allows users to hold out a portion of data from training, so as to use the hold out cases for testing the model. For experiments, models are trained with 85 percent of the data and held out 15 percent for testing.

Figure 21:
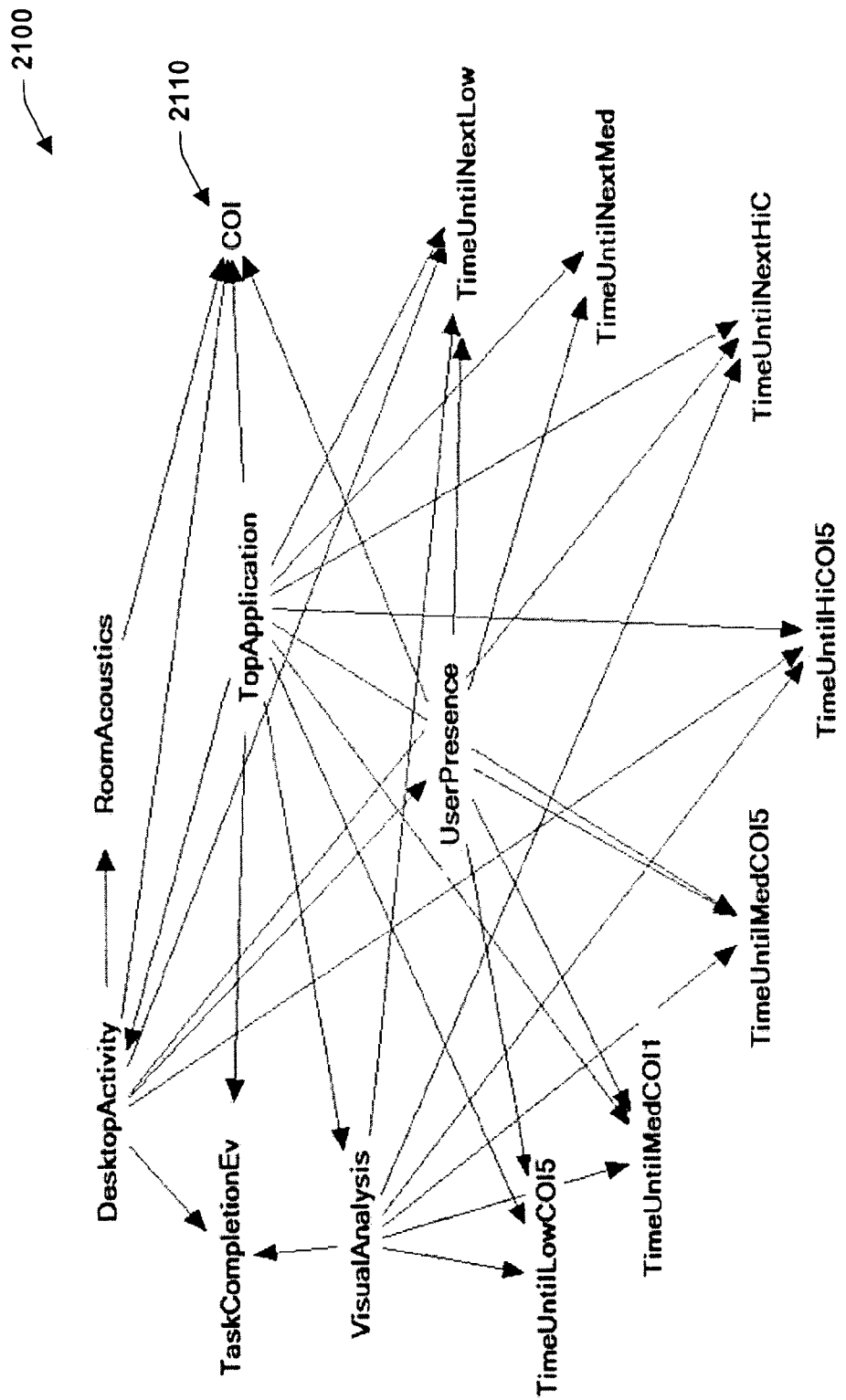
FIG. 21 is a diagram illustrating a Bayesian network model in accordance with an aspect of the present invention.

FIG. 21 is a diagram 2100 illustrating a Bayesian network model in accordance with an aspect of the present invention. The diagram 2100 depicts a Bayesian network model, output by the workbench described above. The model was built from a log of a subject's activities tagged by cost of interruptability. In this case, the database of cases represents activities in the subject's office and with the subject's computer during a one-hour period. The database includes 1800 two-second cases, representing 43 state transitions among interruptability levels. 85 percent of the cases were used to build the model. The other 15 percent was held out for training.

The variable representing the current state of interruptability (with states low, medium, and high) is labeled COI at 2110. Other variables include forecasts Time Until Next Low, Time Until Next Medium, Time Until Next High, and variants of these variables representing the time until low, medium, and high costs of interruption will persist for different periods of time. Forecasting variables were discretized into five time states, including Less than one minute, 1–5 minutes, 5–10 minutes, 10–15 minutes, and greater than 15 minutes.

Figure 22:
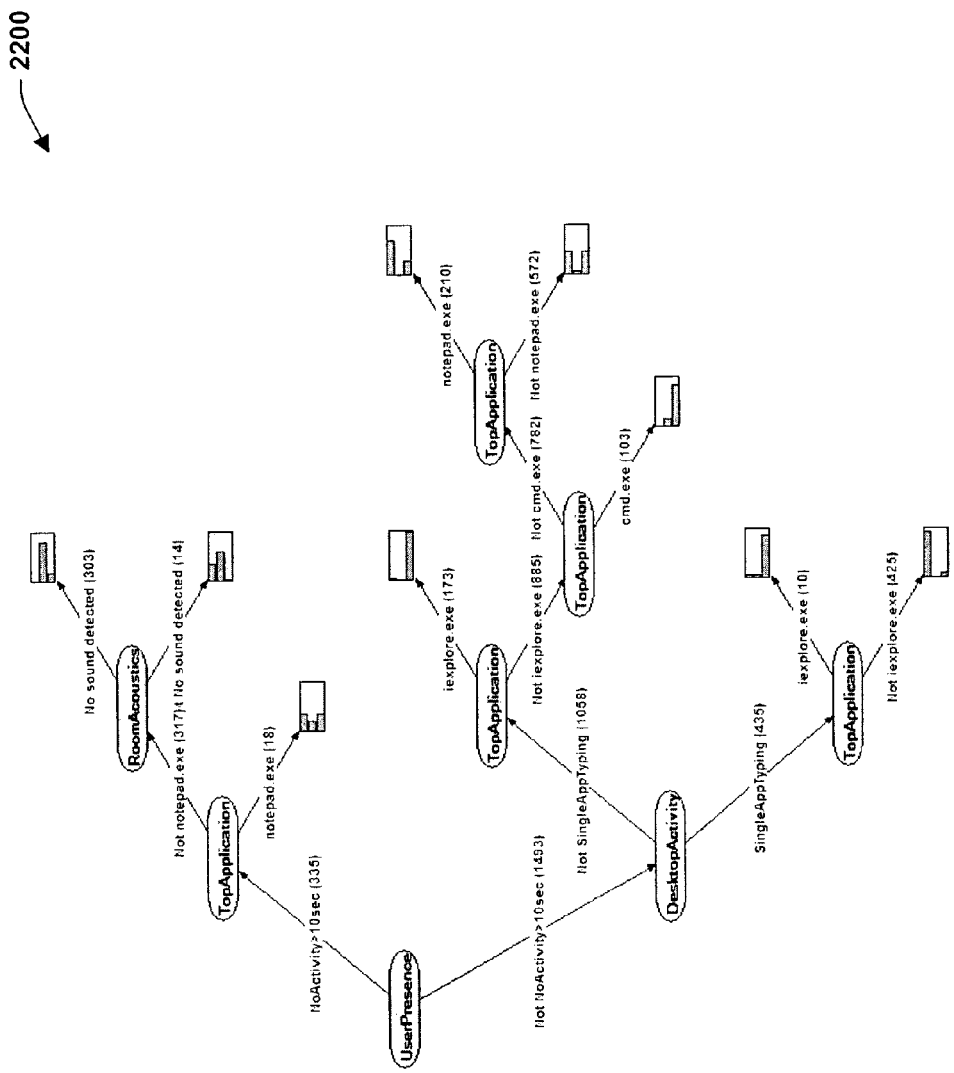
FIGS. 22–26 illustrate various decision trees in accordance with an aspect of the present invention.

FIGS. 22–26 illustrate various decision trees in accordance with an aspect of the present invention. FIG. 22 displays a decision tree representing a compact encoding of the probability distribution underlying the COI variable of the Bayesian network described above. Bar graphs at the leaves of the tree represent probability distributions over high, medium, and low cost of interruptability (ordered from high to low) for sets of observations represented by the paths leading to the leaves. The paths represent a mix of presence, application usage, and perceptual events.

The model displayed in FIG. 21 provides valuable inferences about the current state as well as about future states of interruptability. When tested on the 15 percent of held out cases, the Bayesian network showed a classification accuracy of 0.73 in correctly assigning the state of interruptability of the subject. The model also provided useful predictions about multiple variables representing future states. As an example, the model predicted the time until a user would next transition to a low cost of interruption with a 0.56 classification accuracy and the time until a user would next be in a state of high cost of interruption with a 0.78 accuracy.

Beyond testing the performance of models with all available features, other aspects include performing "model ablation" studies. This can include analyzing losses associated with removing perceptual features from learning and inference. As many computers in the field may not have acoustical and visual sensing capabilities, the present invention can also employ the discriminatory power in predicting the state of a user's interruptability from calendar information and the rich patterns of desktop activity, for situations where users are at or near a client device.

Figure 23:
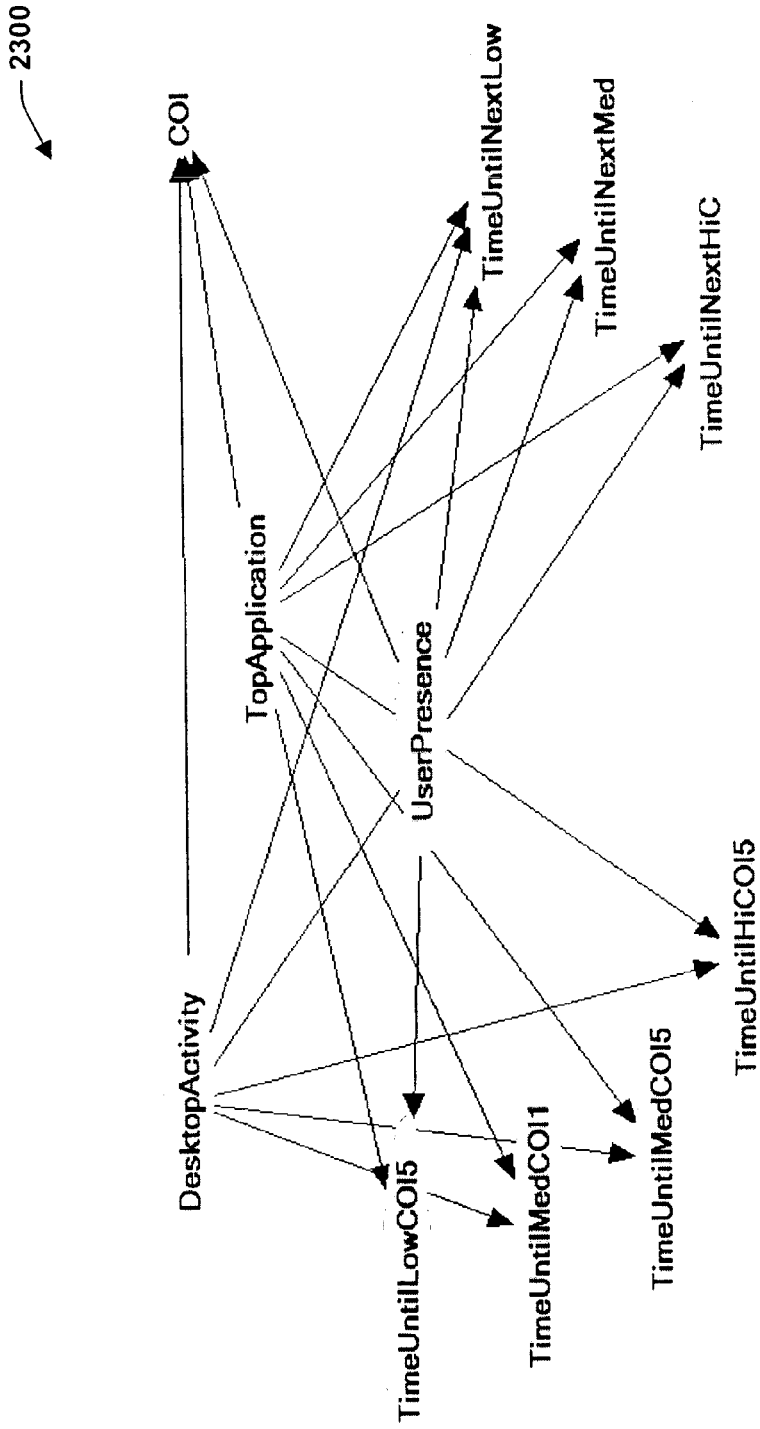

FIG. 23 displays a Bayesian network model created in a similar manner as the model displayed in FIG. 22. However, no acoustical or visual events were considered in the training and testing of the model. The decision tree for the variable representing the cost of interruption for the subject is displayed in FIG. 24.

Figure 24:
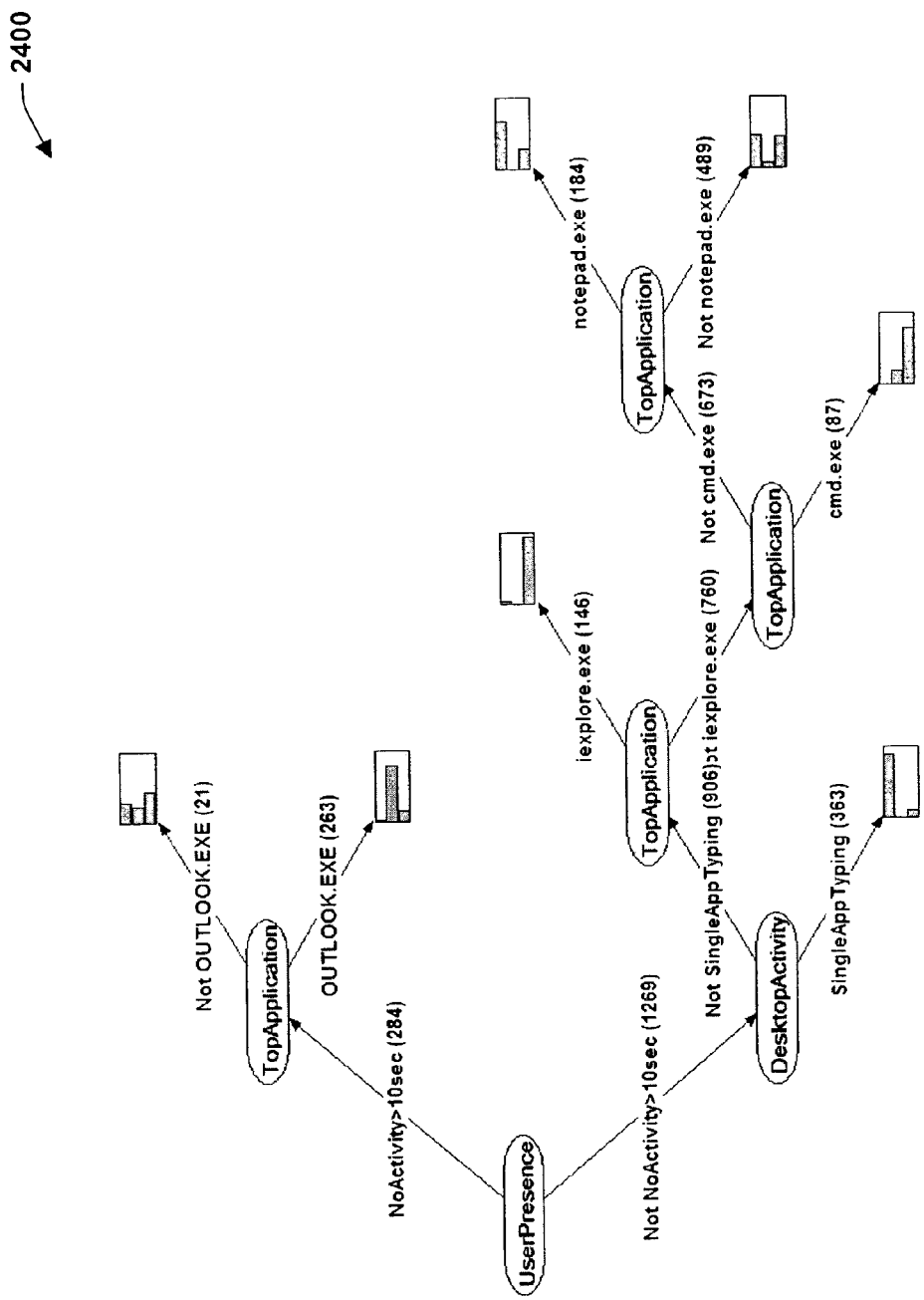

A comparison of the structure, paths and distributions represented in the decision tree of FIG. 24 with these features in the decision tree in FIG. 22 provides some insights into the differences in the models. Bypassing the perceptual sensing information, leads to a deletion of the acoustical events considered in the decision tree displayed in FIG. 22. In the absence of the perceptual information, additional events become valuable discriminators. As displayed in the decision tree in FIG. 24, new application states (whether the subject is engaged with email and calendaring applications) are introduced.

The present invention also can exploit the sensitivity of the classification accuracy for key variables to the loss of perceptual information. Table 1. below shows that, for the data from the subject under consideration, there was no loss in the classification accuracy for the cost of interruption. However, the same assessment for all variables of interest could not be found. It is noted that a mix of sensitivities for variables representing forecasts of future interruptability. For example, for the subject at the focus of attention, the classification accuracy of time until next high-cost state only diminished slightly with the loss of perceptual information. On the other hand, the prediction of the time until the next low-cost state was quite sensitive to the loss of perceptual sensing, moving from a classification accuracy of 0.56 to 0.48 with the loss of perceptual events.

TABLE 1

Classification accuracies for current and future states of user interruptability

| Events | Consider all events | No perceptual sensing |
|---|---|---|
| Current interruption state | 0.73 | 0.73 |
| Time until low cost state | 0.56 | 0.48 |
| Time until high cost state | 0.78 | 0.77 |

Figure 25:
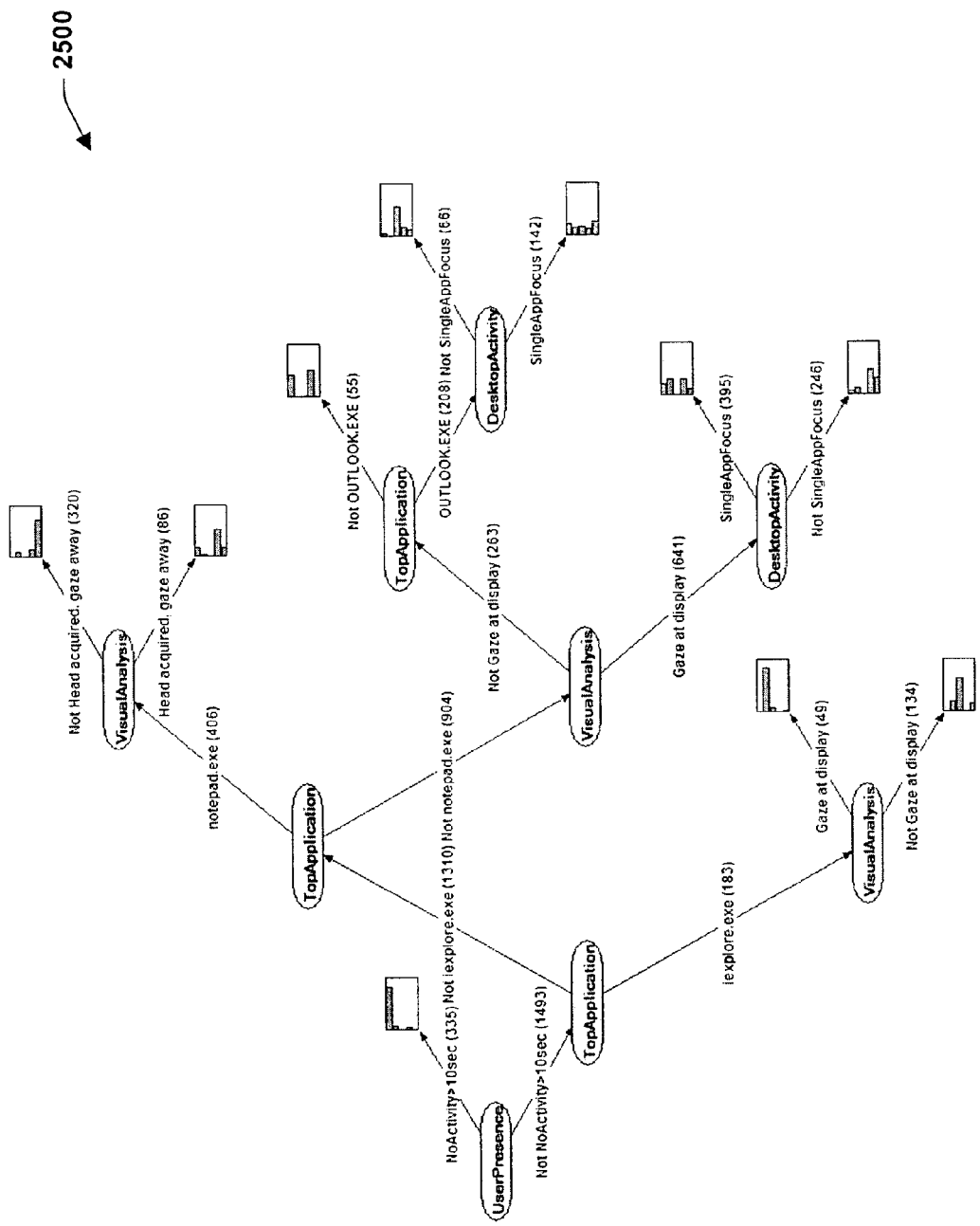

A decision tree 2500 in FIG. 25, derived from a Bayesian-network learning procedure, provides some insight into the use of visual pose information in predicting the time until the start of the next low cost of interruption period. The tree 2500 shows that features derived by a head tracking system about presence and pose is informative for predicting time until next low cost of interruption.

Figure 26:
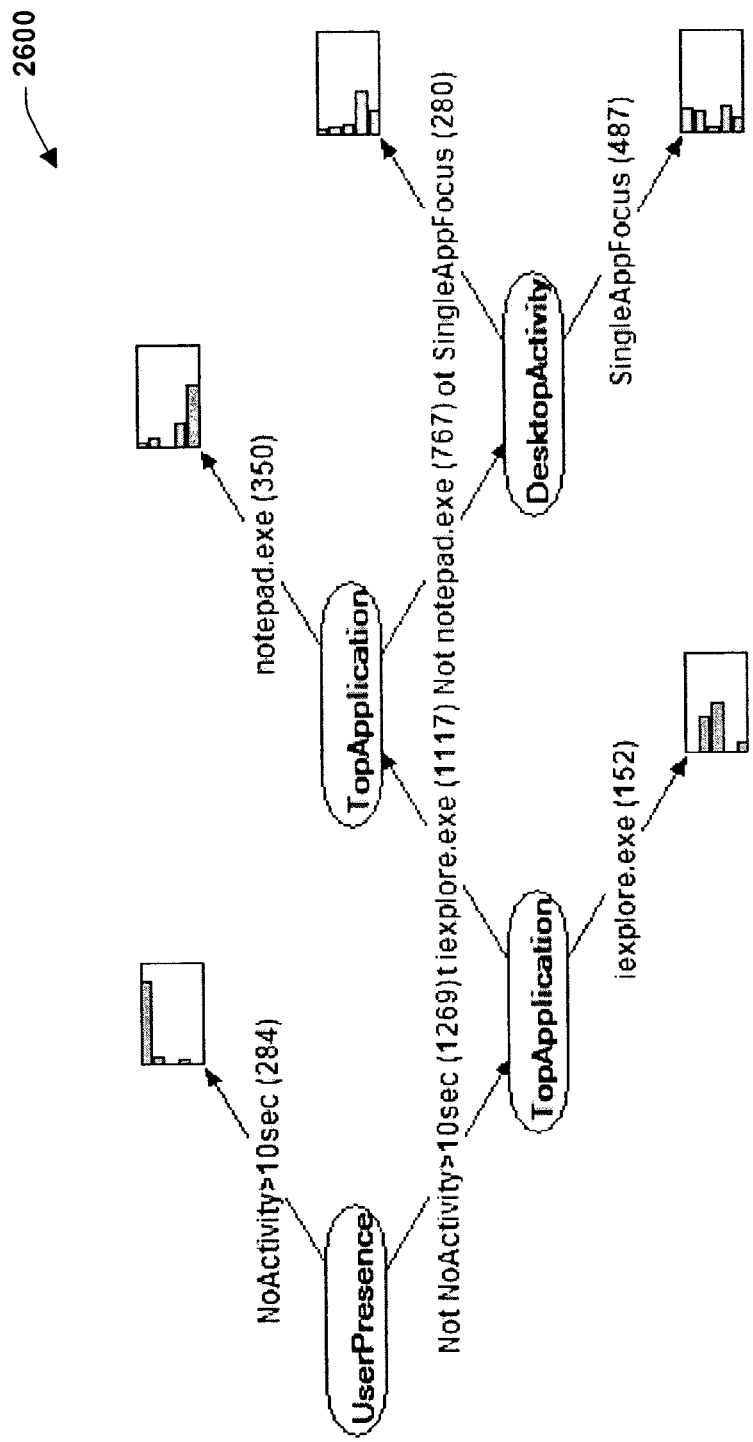

FIG. 26 shows a tree 2600 for the same prediction for the case where there is removed consideration of visual and acoustical information. The system is forced to rely on desktop activity and presence for making the forecast of time until low cost of interruption, and, for the subject and variable at hand, this reliance typically leads to a diminishment of the quality of the predictions.

Figure 27:
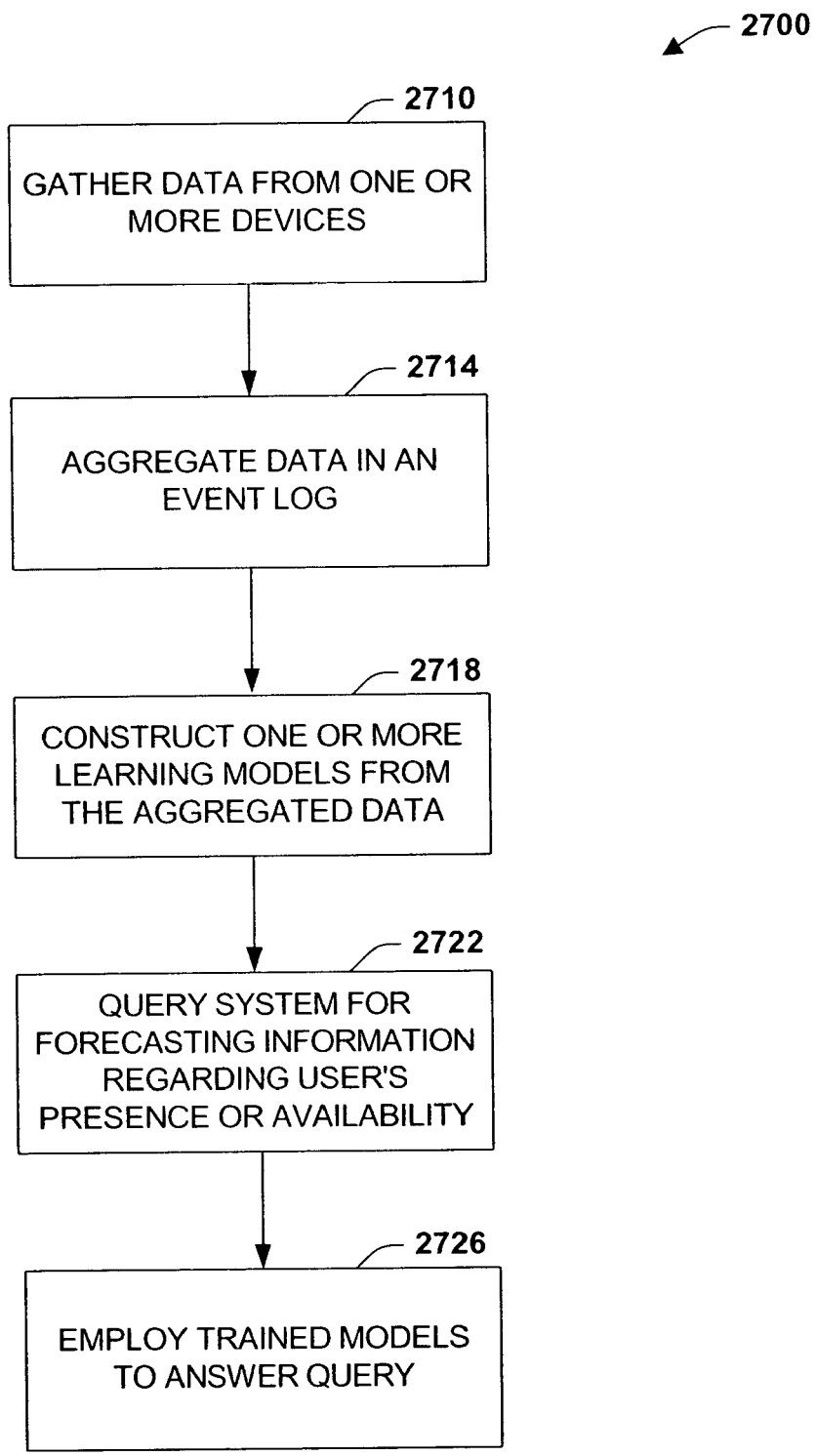
FIG. 27 is a flow diagram depicting a process for presence and availability forecasting in accordance with an aspect of the present invention.

FIG. 27 illustrates a methodology for presence and availability forecasting in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 27, a process 2700 is illustrated for presence and availability forecasting in accordance with the present invention. Proceeding to 2710, data is gathered from one or more devices relating to periods of presence and absence of users. As noted above, data can be derived from a plurality of sources such as hand held devices, mobile deices, and desktop devices or activities. At 2714, the data from various deices is aggregated or collected in an event log or database. This data can be stored with corresponding annotations indicating where the data was derived from, what type of device and device capabilities the data was derived from, and the times and dates the data was recorded. At 2718, one or more learning models are constructed from the data that has been logged in the event database. At 2722, a query is received that requests presence or availability information for a user. As noted above, the query can also be directed to obtain complementary information such as a lack of presence or availability. At 2726, the learning models described at 2718 are trained according to the data stored in the event database relating to one or more user's periods of presence and absence associated with various devices and/or locations. The trained models are employed to return forecasts of user state information (e.g., expected presence or absence) in response to the received query.

The forecasts can be relayed directly to users that are granted privileges to view different aspects or levels of detail about a user's current presence at a location, interruptability, or a user's access of one or more communication channels, or about forecasts of future presence and availability. For example, FIG. 4 above shows a visualization that includes details about a user's presence and availability to colleagues with appropriate privileges. In this case, currently available communication channels are indicated, and bar graphs indicate the time in minutes until different channels will become available, at a specific level of confidence (e.g., when the cumulative probability reaches 90 percent chance in this case) of the transition to available.

As can be appreciated other visualizations are possible for "selectively revealing" different kinds of forecasts or current status, (e.g., only showing certain kinds of things to different types of people, named in name or by abstraction to group types, by relationship, etc.) Selective revelation includes abstraction of the information to less precise information in the time domain, (not being precise about the forecast, e.g., in the next 3 hours versus precise, in 90 minutes) or less precise information in the spatial domain, e.g., "in Seattle," versus "at home."

Different people having different privileges can also be accommodated (e.g., by relationships in org chart, or by such information as dynamics, such as people who I will be meeting with today . . . ) to view different aspects. Such controls can include precision control, e.g., my colleagues can check when I will likely next be back in Seattle, or whether I am now in Seattle. My direct reports can see that I am working at home this morning, etc . . . or that I will be returning to the office in about 30 minutes.)

In other cases, the information may be used to inform a communication agent about the best actions to take. Such an application may not involve sharing details of a user's current or future presence or availability to other users, thus maintaining the privacy of a user's situation. Current availability or future forecasts can be shared with selected user's including a user's interruptability over time, whereby interruptability can be represented as a cost or expected cost of interruption for different kinds of interruptions. This can also include selectively sharing information relating to a user having access to one or more communication channels.

Referring now to FIG. 28, a system 2800 is illustrated that can be employed in conjunction with various aspects of the present invention as previously described. A channel manager 2802 identifies communication channels that facilitate optimizing the utility of a communication 2810 between a contactor 2820 and a contactee 2830. While one contactor 2820 and one contactee 2830 are illustrated, it is to be appreciated that the system 2800 facilitates identifying optimal communication channels between two or more communicating parties (e.g., communication groups). It is to be further appreciated that the parties to the communication 2810 may include human parties, apparatus and/or electronic processes. Thus, as employed herein, the terms contactee and contactor include groups of contactors and groups of contactees.

The communication 2810 may be carried over a variety of channels including, but not limited to, telephone channels, computer channels, fax channels, paging channels and personal channels. The telephone channels include, but are not limited to POTS telephony, cellular telephony, satellite telephony and Internet telephony. The computer channels can include, but are not limited to email, collaborative editing, instant messaging, network meetings, calendaring and devices employed in home processing and/or networking. The personal channels include, but are not limited to videoconferencing, messengering and face-to-face meeting. Data concerning a current channel (e.g., a phone that is busy) can be analyzed, as can data concerning the likelihood that the channel may become available (e.g., phone will no longer be busy).

Identifying the optimal communication channel can include considering the benefits of establishing the communication 2810 at a first point in time, with the communication channels available at that point in time, and considering the costs of delaying establishing the communication 2810 to a second point in time when other communication channels may be available.

The channel manager 2802 has access to a channel data store 2835, a contactor data store 2860 and a contactee data store 2850. The contactor data store 2860, the channel data store 2835 and the contactee data store 2850 can store data in data structures including, but not limited to one or more lists, arrays, tables, databases, stacks, heaps, linked lists and data cubes and can reside on one physical device and/or can be distributed between two or more physical devices (e.g., disk drives, tape drives, memory units). Furthermore, the contactor data store 2860, the channel data store 2835 and the contactee data store 2850 can reside in one logical device and/or data structure.

The channel manager 2802 can be a computer component, as that term is defined herein, and thus the channel manager 2802 can be distributed between two or more cooperating processes and/or reside in one physical or logical device (e.g., computer, process).

In a general formulation of the problem addressed by the channel manager 2802, the present invention considers a "communications value function", $f$, that returns a value for each communication channel or subset of channels under consideration or an ordering over communication channels in terms of acceptability of the channel or subset of channels.

Value(Channel)=$f$(preferences(contactee, contactor, organization), context(contactee, contactor))

where the context of contactee and contactor include group membership, group context, the devices that are available, the time of day, tasks and situation at hand for the contactor and contactee, and the like. It is to be appreciated that the context of the contactee and contactor may be stored in one or more formats, including, but not limited to, an XML schema. In one example of the present invention, the channel manager 2802 initially orders the channels by assigned value and attempts to create a connection or to advise the contactor 2820 and/or contactee 2830 concerning the best possible connection.

In general, there may be uncertainty concerning preferences and one or more parameters employed to model a context. In this situation, a probability distribution over the different states of variables can be inferred and expected values for channels can be computed. For example, if there is uncertainty concerning aspects of the context of the contactee, the probability distribution (here represented abstractly), given evidence E observed about the context, and sum over the uncertainties can be represented:

Expected value (Channel) =

$$\sum_i f(\text{preferences(contactee, contactor, organization)},$$

$p$ (context $i$ of contactee | $E$), context of contactor)

While this expected value can be employed to initially identify the channel that is predicted to optimize the utility of the communication 2810, in one example of the present invention the contactee 2830 will be presented with options concerning the communication. The contactee 2830 reaction to the options will then determine the channel that is selected for the communication 2810. The reactions to the options can be employed in machine learning that facilitates adapting the channel manager 2802.

Considering now more specific examples of the use of expected utility, a particular basic formulation of decision-making under uncertainty in the context of the preferences of the contactee 2830 is captured by Equation 1.

$$A^* = \operatorname*{argmax}_j \sum_i p(\text{context}^R i \mid E) \times \quad \text{(Equation 1)}$$

$$u(A_j, A_k^C, C, \text{context}^R i, \text{context}^C)$$

where $A^*$ is the ideal communication actions, which include the channels employed by the contactor ($A^{C*}$) and contactee (Recipient) ($A^{R*}$) computed by optimizing Equation 1. In equation 1, $A_j$ is the communication channel being considered, $A^C_k$ is the communication channel employed by the contactor, $\text{context}^R_i$ is the context of the contactee (Recipient) of the intended communication, $\text{context}^C$ is the context of the contactor, and C is the identity of the contactor, typically linked to a class of person (e.g., critical associate, previously replied to, family, unknown).

Thus, in an example aspect of the present invention, the conditional probability $p(\text{context}^R_i|E)$ that the contactee 2830 has a certain context given the evidence E is employed in conjunction with the utility function u to determine the ideal communication actions that can be taken to maximize the utility of the communication 2810 between the contactor 2820 and the contactee 2830.

The basic formulation for identifying optimal communication channels can be extended by introducing uncertainty about the context of the contactor 2820, which adds the summing noted in equation 2 to the uncertainty calculations of equation 1. The particular communication action and/or channel selected for the initial contact by the contactor 2820 is represented as $A^C_{init}$.

$$A^* = \operatorname*{argmax}_j \sum_i \sum_k p(\text{context}^R i \mid E) p(\text{context}^C k \mid E) \times \quad \text{(Equation 2)}$$

$$u(A_j, A_{init}^C, C, \text{context}^R i, \text{context}^C k)$$

The contactor 2820 and contactee 2830 contexts represent rich sets of deterministic or uncertain variables. Data associated with automated assessments and/or directly marked indications of urgency or importance in the communications can also be evaluated in identifying optimal communication channels. The contextual variables can be treated as explicit deterministic or probabilistic factors in the optimization. For example, $m^c_k$ can represent the channels available to the contactor 2820 and thus equation 3 considers combinations of channels available to the contactor 2820.

$$A^* = \underset{l,n}{\operatorname{argmax}} \sum_i \sum_k p(\text{context}^R i \mid E) p(\text{context}^C k \mid E) \times$$
$$u(A(m_l^R, m_n^C), A_{init}^C, C, \text{context}^R i, \text{context}^C k)$$

(Equation 3)

The present invention can also compare the best communication option available now with the best communication option that will be available later, and update the value of the communication for the losses based in delays in communication, and potential gains or losses based on changes in disruptiveness if the communication should come at the later time t when the contactee is in a different state (e.g. more available or less available). Such comparison can be captured by equation four:

$$\text{Value } A^*(t_+) - \text{Value} A^*(t_0) =$$ (4)
$$\underset{l,n}{\max} \sum_i \sum_k p(\text{context}^R i \mid E, t_+) p(\text{context}^C k \mid E, t_+) \times$$
$$u(A(m_l^R(t_+), m_n^C(t_+)), A_{init}^C, C, \text{context}^R i(t_+), \text{context}^C k(t_+))$$
$$\underset{l,n}{\max} \sum_i \sum_k p(\text{context}^R i \mid E, t_0)$$
$$p(\text{context}^C k \mid E, t_0) \times u(A(m_l^R(t_0), m_n^C(t_0)),$$
$$A_{init}^C, C, \text{context}^R i(t_0), \text{context}^C k(t_0))$$

Thus, decision-theoretic formulae like those described in equations 1 through 4 are employed to produce one or more expected utilities for one or more sets of contactors and/or contactees that are established into one or more groups that are subsequently managed. In one example aspect of the present invention, a communication is automatically initiated, scheduled and/or calendared based on such information. But in another aspect of the present invention, information concerning those expected utilities is presented to one or more parties. By way of illustration, a contactor 2820 is presented with a list of communications with high utilities determined in accordance with the preferences of the contactee. The contactor 2820 then selects from the list.

While one communication 2810 between one contactor 2820 and one contactee 2830 is illustrated, it is to be appreciated that a greater number of communications between a similar or greater number of contactors 2810 and/or contactees 2820 can be identified by the present invention. By way of illustration, communications 2810 to facilitate group meetings can be identified by the system 2800, as can multiple communications 2810 between two communicating parties (e.g., duplicate messages sent simultaneously by email and pager).

The communication 2810 that is identified by the channel manager 2802 may depend, at least in part, on one or more sets of data concerning communication channels, contactors and/or contactees, for example. One possible data set, the communication channel data set 2835 concerns the available communication channels. The available communication channels can include, but are not limited to email (of various priorities), telephone (POTS, cellular, satellite, Internet), paging, runners/couriers, video conferencing, face-to-face meeting, instantaneous collaborative editing, delayed posting collaborative editing, picture in picture television, home device activation (e.g., turning on lights in the study, ringing the telephone with a distinctive pattern) and so on. A communication channel may not be a static entity, and thus information concerning the state, capacity, availability, cost etc., of the communication channels can change. Thus, the communication channel data set 2835 can contain current state information and/or data to facilitate making predictions concerning future state, capacity, availability, cost etc. associated with one or more communication channels.

The channel manager 2802 can also have available the contactee data 2850 that includes information related to hardware, software, contactee task being performed, contactee attention status, contactee context data 2852 and contactee preference data 2854, for example. By way of illustration, the hardware data can include information related to what hardware is available to the contactee, what hardware is being employed by the contactee (e.g., desktop, laptop, PDA), the capabilities of that hardware (e.g., enough memory and communication bandwidth for videoconferencing), the cost of employing that hardware and the state(s) in which that hardware is currently functioning (e.g., online, offline). The hardware data can also include information concerning usage patterns that facilitate determining the likelihood that an unavailable piece of hardware will become available. The software data can include information related to what software is available to the contactee, what software is currently being employed by the contactee (e.g., word processor in use), the capabilities of that software (e.g., allows collaborative editing) and the state(s) in which that software is currently functioning (e.g., running and active, running but inactive). The software data can also include information concerning usage patterns that facilitate determining the likelihood that an unavailable piece of software will become available.

The contactee data 2850 can also contain preference data 2854 concerning the preferences of the contactee 2830. The preference data 2854 can include data concerning how the contactee 2850 prefers to be contacted, with those preferences varying over time with respect to, for example, various contactors 2820, various times, various channels and various topics of communication. The contactee preference data 2854 can include data concerning, but not limited to, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), preferred software (e.g., email, word processing, calendaring ) and preferred interruptability (e.g., do not interrupt while focused on work, only interrupt while not focused), for example. While six preferences are identified in the preceding sentence, it is to be appreciated that a greater or lesser number of preferences can be employed in accordance with the present invention.

The contactee data 2850 can also include a context data 2852. The context data 2852 is generally related to observations about the contactee 2830. For example, observations concerning the type of activity in which the contactee 2830 is involved (e.g., on task, not on task), location of the contactee 2830 (e.g., office, home, car, shower), calendar (e.g., appointment status, appointment availability), history of communications with other party (e.g., have replied to email in the past, have spoken to on the telephone recently, the utility of the interaction, the duration of the interaction), background ambient noise at current location, number of hours at work that day and attentional status (e.g., high focus, focus, light focus, conversation with another person, light activity) can be stored in the context data 2852.

On some occasions the context data 2852 may be incomplete (e.g., video analysis data unavailable because video camera broken). Thus, the channel manager 2802 reasons concerning the optimal communication while relying on such incomplete data. Thus, the contactee data 2850 can also include information to facilitate producing one or more probabilities associated with a missing data element. By way of illustration, the contactee data 2850 can contain information operable to predict the likelihood that the contactee 2830 is in a high attentional state even though gaze tracking information is unavailable.

The contactee data 2850 can further include information concerning the long-term and/or acute, dynamically changing communication needs of the contactee 2850. By way of illustration, the contactee 2850 may need to have no interruptions for the next hour (e.g., "hold everything unless high critical on this task or an hour from now"). By way of further illustration, to prevent a contactor 2820 from "ducking" the contactee 2830 by leaving an email or a voice mail when the contactee 2830 desires to speak with the contactor 2820, the contactee 2830 can require that contacts from the contactor 2820 be made in a certain way within X units of time of notification that the contactor 2820 desires communication.

Thus, returning to equation 1, $$A^* = \underset{j}{\operatorname{argmax}} \sum_i p(\text{context}^R i \mid E) \times u(A_j, A_k^C, C, \text{context}^R i, \text{context}^C)$$

(Equation 1)

the contactee data 2850 is seen to contribute to the utility function u through the $\text{context}^R_i$ component, which can include the contactee context data 2852 discussed above.

In addition to the contactee data 2850 employed in determining the optimal communication, data concerning the contactor 2820 may also be employed. The contactor data 2860 can include hardware, software, context, preference and communication needs data substantially similar to that available for the contactee 2830, but different in that it is prepared from the point of view of the contactor 2820.

Thus, returning again to equation 1, $$A^* = \underset{j}{\operatorname{argmax}} \sum_i p(\text{context}^R i \mid E) \times u(A_j, A_k^C, C, \text{context}^R i, \text{context}^C)$$

(Equation 1)

the contactor data 2860 is seen to contribute to the utility function u through the $\text{context}^C$ component.

The present invention is not limited to communications between two parties or to a single communication channel between two parties. It is to be appreciated that multiple channels and/or multiple communicating parties can be treated as increased sets of alternatives that complicate utility optimizing maximizing computations without changing the fundamental process of identifying and establishing one or more communication channels based on the preferences, contexts and capabilities of the communicating parties.

The channel manager 2802 can include several computer components responsible for implementing portions of the functionality of the channel manager 2802. For example, the channel manager 2802 can include a preference resolver 2872. The preference resolver 2872 examines the contactee preference data 2854 and the contactor preference data 2864 to find correlations between the two sets of data. In one example of the present invention, information concerning the correlations is stored in a resolved preference data. For group communications, the preference resolver 2872 examines multiple sets of preference data to find correlations between the preferences. By way of illustration, for a communication between two parties, the preference resolver 2872 can determine that both parties would prefer to communicate by high priority email for communications associated with a first task. Similarly, the preference resolver 2872 can determine that the contactee 2830 would prefer to communicate by collaborative editing and phone for communications concerning a particular document, while the contactor 2820 would prefer to communicate only by telephone. Thus, the preference resolver 2872 produces data (e.g., resolved preference data) or initiates processing that assigns values to the correlations between the contactee 2830 preferences and the contactor preferences 2820. In one example aspect of the present invention, the preferences of the contactee 2830 are given more weight, and thus, if the contactor 2820 attempted a phone conversation concerning the document for which the contactee 2830 preferred both phone and collaborative editing, then the preference resolver 2872 produces data or initiates processing that makes it more likely that the contactor 2820 communicates by both phone and collaborative editing. In another example aspect of the present invention, the preferences of the contactor 2820 are given priority over the preferences of the contactee. By way of illustration, when a human contactor 2820 is attempting to communicate with an electronic contactee 2830, the preferences of the contactor 2820 are considered more important, and thus the preference resolver 2872 produces values or initiates processing that makes it more likely that the preferences of the contactor 2820 are observed. In another example aspect of the present invention, the preference resolver 2872 produces a list of potential communication channels ranked on their responsiveness to the preferences.

The channel manager 2802 can also include a context analyzer 2874. The context analyzer 2874 examines the contactee context data 2852 and the contactor context data 2862 to find correlations between the two sets of data. In one example of the present invention, information concerning the correlations is stored in an analyzed context data. For group communications, the context analyzer 2874 may examine multiple sets of context data to extract information concerning the contexts. By way of illustration, for a communication between two parties, the context analyzer 2874 may determine that the contactee context is such that real-time communications are not immediately available but there is an $X_1$% likelihood that such communications will be available at a point of time $T_1$ in the future, and an $X_2$% likelihood that such communications will be available at a point of time $T_2$ in the future. Further, the context analyzer 2874 may determine that although the contactor 2820 has requested real-time telephony that the context of the contactor 2820 is such that email communication may optimize utility. For example, the context of the contactor 2820 may include information concerning the ambient noise at the location of the contactor 2820. The context analyzer 2874 may determine that the noise level is not conducive to optimizing utility by real-time telephony and thus may produce values and/or initiate processing that will make it more likely that the contactor 2820 will communicate with the contactee 2830 via email. Similar to processing performed by the preference resolver 2872, the context analyzer 2874 may, in different examples of the system 2800, weight the context of the contactee 2830 more than the context of the contactor 2820 or vice versa.

Returning again to equation 1, $$A^* = \arg\max_j \sum_i p(\text{context}^R i | E) \times u(A_j, A_k^C, C, \text{context}^R i, \text{context}^C)$$ (Equation 1)

the context analyzer 2874 performs processing associated with the utility function u and its analysis of the $\text{context}^R_i$ and the $\text{context}^C$.

The channel manager 2802 can also include a channel analyzer 2876. The channel analyzer 2876 analyzes the communication channel data set 2835. The channel analyzer 2876 produces data concerning the current availability of a communication channel and/or the likelihood of the channel becoming available. In one example of the present invention, such data is stored in a communication channel data. The channel analyzer 2876 also examines one or more channels that the contactor 2820 specified for the communication, and/or one or more channels that the contactee 2830 listed as preferences in the contactee preference data 2854, for example. The channel analyzer 2876 also examines currently available channels as determined by location information associated with the contactee 2830 and channels that may become available based on the activity of the contactee 2830. For example, if the contactee 2830 is currently driving home (as determined by GPS and schedule, for example), then the channel analyzer 2876 examines current cellular channels and additionally examines the channels available at the home of the contactee 2830. Thus, the channel analyzer 2876 facilitates producing data and/or initiating processing that makes it more likely that a desired channel is employed when determining the optimal communication channel(s) for the communication 2810 between the contactor 2820 and the contactee 2830. Thus, examining equation 1, $$A^* = \arg\max_j \sum_i p(\text{context}^R i | E) \times u(A_j, A_k^C, C, \text{context}^R i, \text{context}^C)$$ (Equation 1)

the channel analyzer 2876 performs processing associated with the utility function u and its analysis of the contactor channels $A_j$ and the contactee channels $A^C_k$.

The channel manager 2802 can also include a communication establisher 2878. Once the ideal communication actions A* have been identified, the communication establisher 2878 undertakes processing to connect the contactor 2820 and the contactee 2830 through the identified optimal communication channel. Such connection can be based, at least in part, on the resolved preference data, the analyzed context data and the communication channel data. For example, if the optimal communication 2810 is identified as being email, then the communication establisher can initiate an email composing process for the contactor 2820 (e.g., email screen on computer, voice to email converter on cell phone, email composer on two-way digital pager), and forward the composed email to the most appropriate email application for the contactee 2830 based on the identified optimal communication 2810. For example, the communication establisher 2878 can forward the email to the pager of the contactee 2830 based on GPS data associated with the location of the contactee 2830. In an alternative example of the present invention, the system 2800 does not include a communication establisher 2878, relying instead on contactor 2820 and/or contactee 2830 actions, for example, to establish the communication. It is to be appreciated that the preference resolver 2872, the context analyzer 2874, the channel analyzer 2876 and the communication establisher 2878 are computer components as that term is defined herein.

Referring to FIG. 29, a system 2910 illustrates a priorities system 2912 and notification architecture in accordance with an aspect of the present invention. The priorities system 2912 receives one or more messages or notifications 2914, generates a priority or measure of importance (e.g., probability value that the message is of a high or low importance) for the associated message, and provides the one or more messages with an associated priority value at an output 2916. As will be described in more detail below, classifiers can be constructed and trained to automatically assign measures of priorities to the messages 2914. For example, the output 2916 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 2917 can be employed in conjunction with the priorities system 2912 to direct prioritized messages to one or more notification sinks accessible to users. As will be described in more detail below, the notification platform 2917 can be adapted to receive the prioritized messages 2916 and make decisions regarding when, where, and how to notify the user, for example. As an example, the notification platform 2917 can determine a communications modality (e.g., current notification sink 2918 of the user such as a cell phone, or Personal Digital Assistant (PDA)) and likely location and/or likely focus of attention of the user. If a high importance e-mail were received, for example, the notification platform 2917 can determine the users location/focus and direct/reformat the message to the notification sink 2918 associated with the user. If a lower priority message 2916 were received, the notification platform 2917 can be configured to leave the e-mail in the user's in-box for later review as desired, for example. As will be described in more detail below, other routing and/or alerting systems 2919 may be utilized to direct prioritized messages 2916 to users and/or other systems.

Turning now to FIG. 30, a system 3000 illustrates how the notification engine and context analyzer function together according to an aspect of the present invention. The system 3000 includes a context analyzer 3022, a notification engine 3024, one or more notification sources 1 through N, 3026, 3027, 3028, a priorities system 3030, which can operate as a notification source, and one or more notification sinks, 1 through M, 3036, 3037, 3038, wherein N an M are integers, respectively. The sources are also referred to as event publishers, while the sinks are also referred to as event subscribers. There can be any number of sinks and sources. In general, the notification engine 3024 conveys notifications, which are also referred to as events or alerts, from the sources 3026–3028 to the sinks 3036–3038, based in part on parametric information stored in and/or accessed by the context analyzer 3022.

The context analyzer 3022 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 3024, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 3022, according to one aspect of the present invention is inclusive of contextual information determined by the analyzer. The contextual information is determined by the analyzer 3022 by discerning the user's location and attentional status based on one or more contextual information sources (not shown), as is described in more detail in a later section of the description. The context analyzer 3022, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 3026–3028, 3030 generate notifications intended for the user and/of other entity. For example, the sources 3026–3028 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 3030 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 3026–3028 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and/or,
information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 3036–3038 are able to provide notifications to the user. For example, such notification sinks 3036–3038 can include computers, such as desktop and/or laptop computers, handheld computers, cell phones, landline phones, pagers, automotive-based computers, as well as other systems/applications as can be appreciated. It is noted that some of the sinks 3036–3038 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 3024 accesses the information stored and/or determined by the context analyzer, and determines which of the notifications received from the sources 3026–3028 to convey to which of the sinks 3036–3038. Furthermore, the notification engine 3024 can determine how the notification is to be conveyed, depending on which of the sinks 3036–3038 has been selected to send the information to. For example, it may be determined that notifications should be summarized before being provided to a selected sinks 3036–3038.

The invention is not limited to how the engine 3024 makes its decisions as to which of the notifications to convey to which of the notification sinks, and in what manner the notifications are conveyed. In accordance with one aspect, a decision-theoretic analysis can be utilized. For example, the notification engine 3024 can be adapted to infer important uncertainties about variables including a user's location, attention, device availability, and amount of time until the user will access the information if there were no alert. The notification engine 3024 can then make notification decisions about whether to alert a user to a notification, and if so, the nature of the summarization and the suitable device or devices to employ for relaying the notification. In general, the notification engine 3024 determines the net expected value of a notification. In doing so, it can consider the following:
the fidelity and transmission reliability of each available notification sink;
the attentional cost of disturbing the user;
the novelty of the information to the user;
the time until the user will review the information on his or her own;
the potentially context-sensitive value of the information; and/or,
the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 3024 can make decisions as to one or more of the following:
what the user is currently attending to and doing (based on, for example, contextual information);
where the user currently is;
how important the information is;
what is the cost of deferring the notification;
how distracting would a notification be;
what is the likelihood of getting through to the user; and,
what is the fidelity loss associated with the use of a specific mode of a given notification sink.

Therefore, the notification engine 3024 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 3024 can access information stored in a user profile by the context analyzer 3022 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 3024 determines how and whether to notify the user.

According to one aspect of the present invention, the notification platform architecture 3000 can be configured as a layer that resides over an eventing or messaging infrastructure. However, the invention is not limited to any particular eventing infrastructure. Such eventing and messaging systems and protocols can include:
HyperText Transport Protocol (HTTP), or HTTP extensions as known within the art;
Simple Object Access Protocol (SOAP), as known within the art;
Windows Management Instrumentation (WMI), as known within the art;
Jini, as known within the art; and,
substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 31:
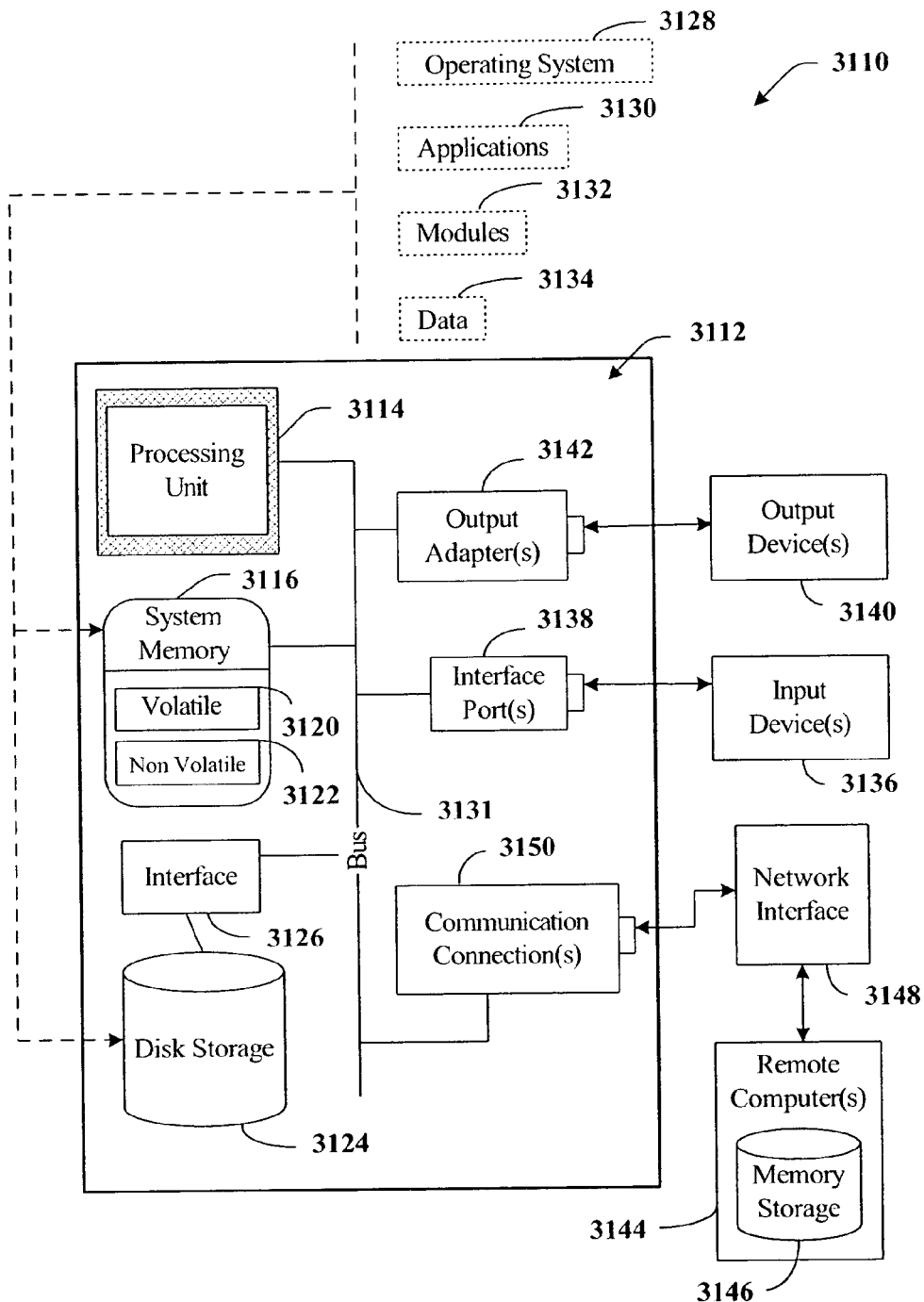
FIG. 31 is a schematic block diagram illustrating a suitable operating environment in accordance with an aspect of the present invention.

With reference to FIG. 31, an exemplary environment 3110 for implementing various aspects of the invention includes a computer 3112. The computer 3112 includes a processing unit 3114, a system memory 3116, and a system bus 3118. The system bus 3118 couples system components including, but not limited to, the system memory 3116 to the processing unit 3114. The processing unit 3114 can be any of various available processors. Dual microprocessors and other multiprocessor architectures also can be employed as the processing unit 3114.

The system bus 3118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3116 includes volatile memory 3120 and nonvolatile memory 3122. The basic input/output system (BIOS), containing the basic routines to transfer information between elements within the computer 3112, such as during start-up, is stored in nonvolatile memory 3122. By way of illustration, and not limitation, nonvolatile memory 3122 can include read only memory (ROM), programmable ROM (PROM), electrically programmable ROM (EPROM), electrically erasable ROM (EEPROM), or flash memory. Volatile memory 3120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3112 also includes removable/non-removable, volatile/non-volatile computer storage media. FIG. 31 illustrates, for example a disk storage 3124. Disk storage 3124 includes, but is not limited to, devices like a magnetic disk drive, floppy disk drive, tape drive, Jaz drive, Zip drive, LS-100 drive, flash memory card, or memory stick. In addition, disk storage 3124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3124 to the system bus 3118, a removable or non-removable interface is typically used such as interface 3126.

It is to be appreciated that FIG. 31 describes software that acts as an intermediary between users and the basic computer resources described in suitable operating environment 3110. Such software includes an operating system 3128. Operating system 3128, which can be stored on disk storage 3124, acts to control and allocate resources of the computer system 3112. System applications 3130 take advantage of the management of resources by operating system 3128 through program modules 3132 and program data 3134 stored either in system memory 3116 or on disk storage 3124. It is to be appreciated that the present invention can be implemented with various operating systems or combinations of operating systems.

A user enters commands or information into the computer 3112 through input device(s) 3136. Input devices 3136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3114 through the system bus 3118 via interface port(s) 3138. Interface port(s) 3138 include, for example, a serial port, a parallel port, a game port, and a universal serial bus (USB). Output device(s) 3140 use some of the same type of ports as input device(s) 3136. Thus, for example, a USB port may be used to provide input to computer 3112, and to output information from computer 3112 to an output device 3140. Output adapter 3142 is provided to illustrate that there are some output devices 3140 like monitors, speakers, and printers, among other output devices 3140, that require special adapters. The output adapters 3142 include, by way of illustration and not limitation, video and sound cards that provide a means of connection between the output device 3140 and the system bus 3118. It should be noted that other devices and/or systems of devices provide both input and output capabilities such as remote computer(s) 3144.

Computer 3112 can operate in a networked environment using logical connections to one or more remote computers, such as remote computer(s) 3144. The remote computer(s) 3144 can be a personal computer, a server, a router, a network PC, a workstation, a microprocessor based appliance, a peer device or other common network node and the like, and typically includes many or all of the elements described relative to computer 3112. For purposes of brevity, only a memory storage device 3146 is illustrated with remote computer(s) 3144. Remote computer(s) 3144 is logically connected to computer 3112 through a network interface 3148 and then physically connected via communication connection 3150. Network interface 3148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3150 refers to the hardware/software employed to connect the network interface 3148 to the bus 3118. While communication connection 3150 is shown for illustrative clarity inside computer 3112, it can also be external to computer 3112. The hardware/software necessary for connection to the network interface 3148 includes, for exemplary purposes only, internal and external technologies such as, modems including regular telephone grade modems, cable modems and DSL modems, ISDN adapters, and Ethernet cards.

Figure 32:
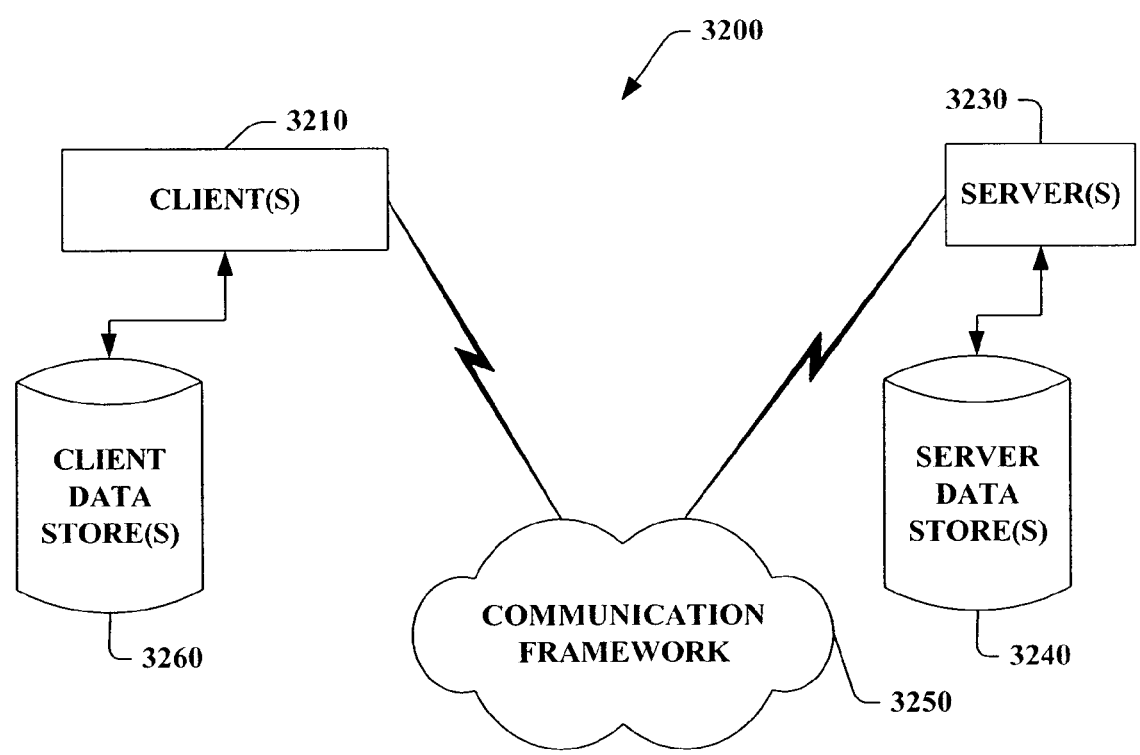
FIG. 32 is a schematic block diagram of a sample-computing environment with which the present invention can interact.

FIG. 32 is a schematic block diagram of a sample-computing environment 3200 with which the present invention can interact. The system 3200 includes one or more client(s) 3210. The client(s) 3210 can be hardware and/or software (e.g., threads, processes, computing devices). The system 3200 also includes one or more server(s) 3230. The server(s) 3230 can also be hardware and/or software (e.g., threads, processes, computing devices). The servers 3230 can house threads to perform transformations by employing the present invention, for example. One possible communication between a client 3210 and a server 3230 may be in the form of a data packet adapted to be transmitted between two or more computer processes. The system 3200 includes a communication framework 3250 that can be employed to facilitate communications between the client(s) 3210 and the server(s) 3230. The client(s) 3210 are operably connected to one or more client data store(s) 3260 that can be employed to store information local to the client(s) 3210. Similarly, the server(s) 3230 are operably connected to one or more server data store(s) 3240 that can be employed to store information local to the servers 3230.

Figure 33:
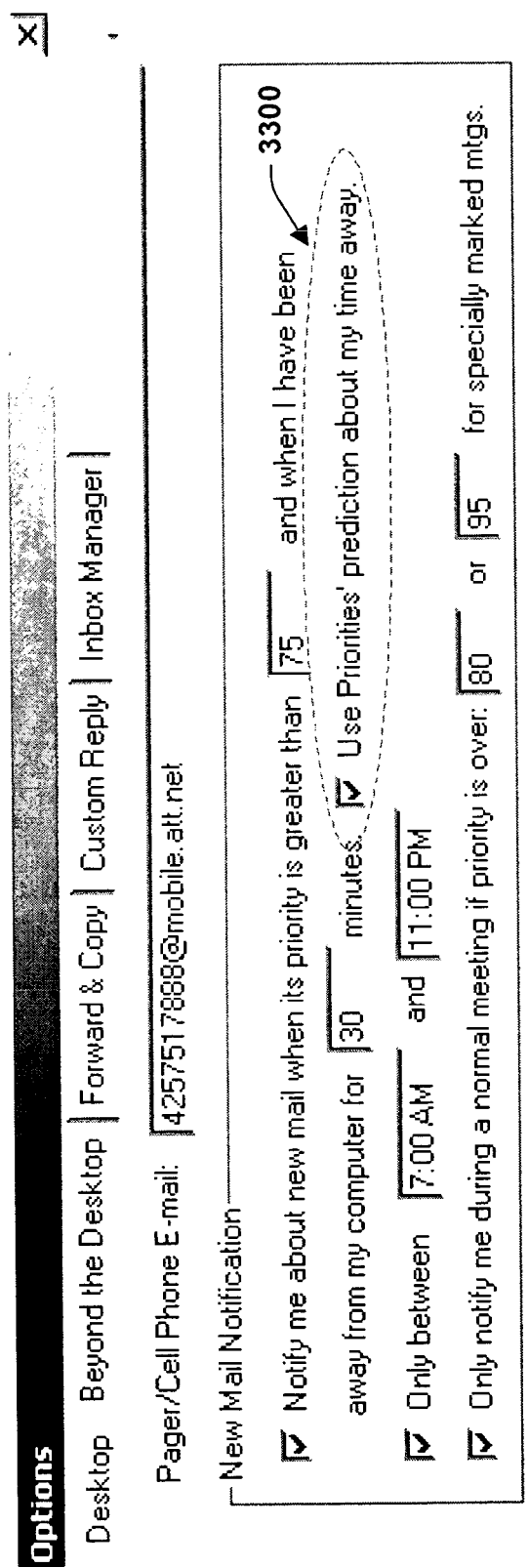
FIGS. 33–37 illustrate example applications in accordance with an aspect of the present invention.
Figure 34:
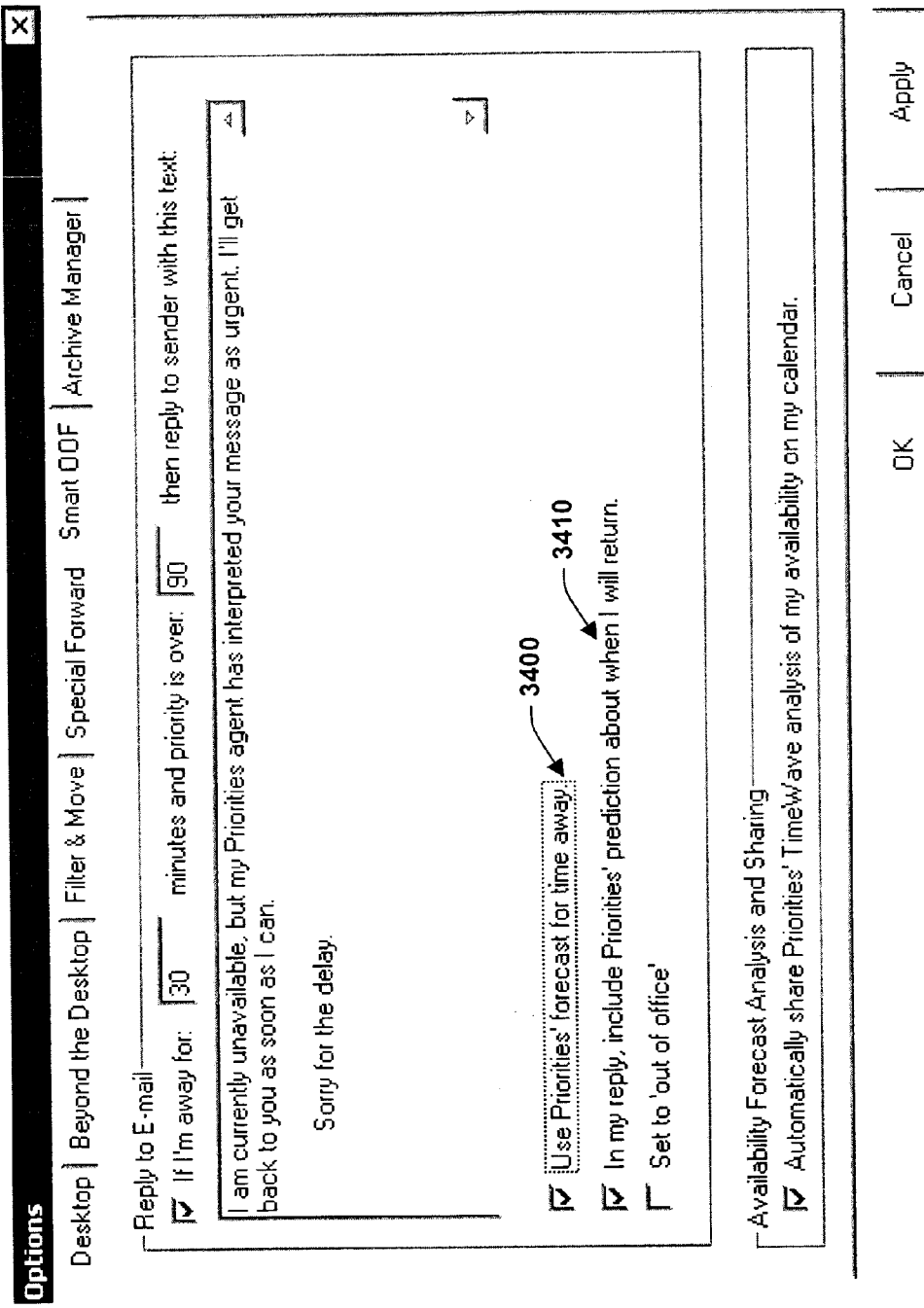
Figure 35:
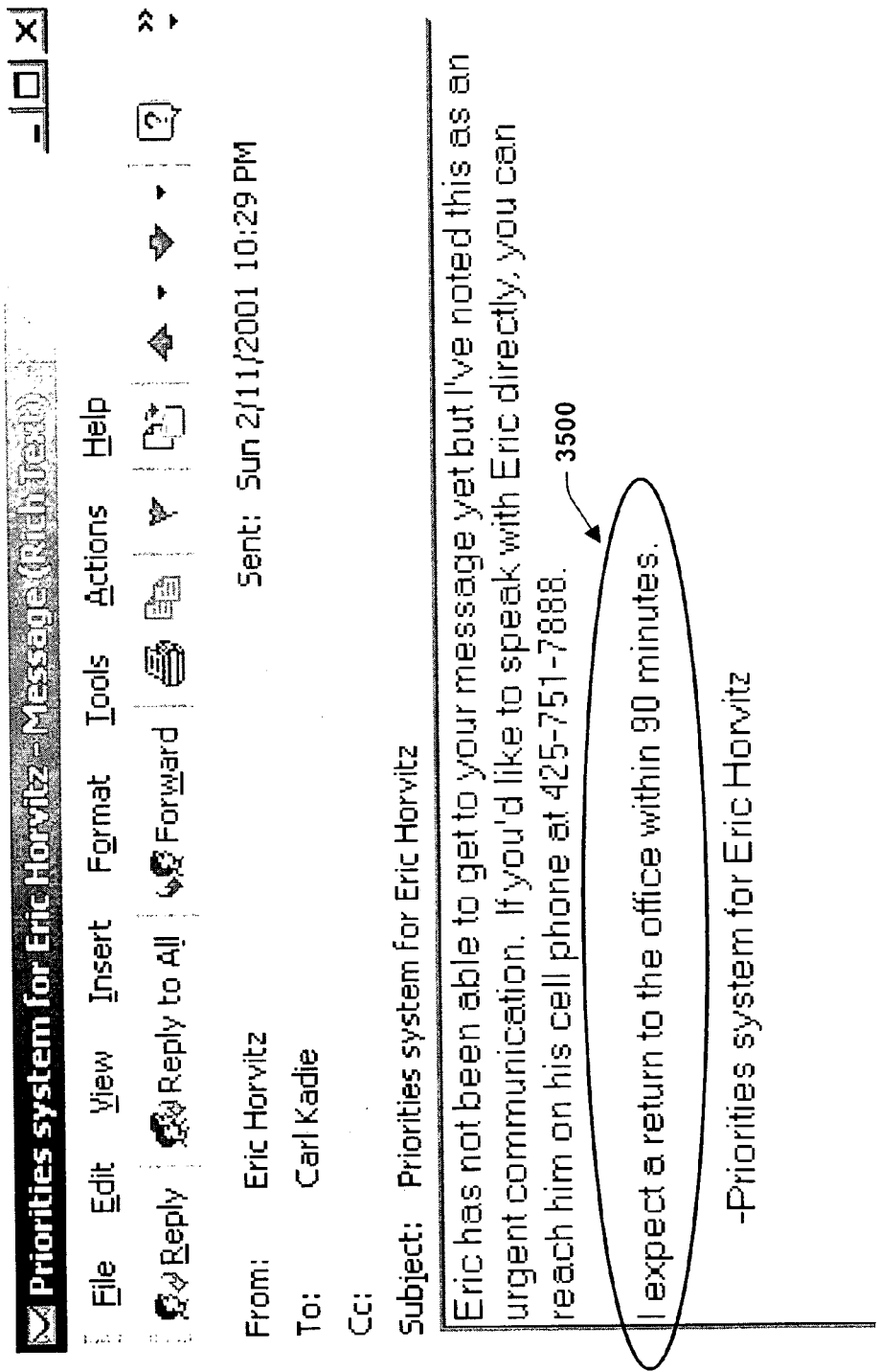
Figure 36:
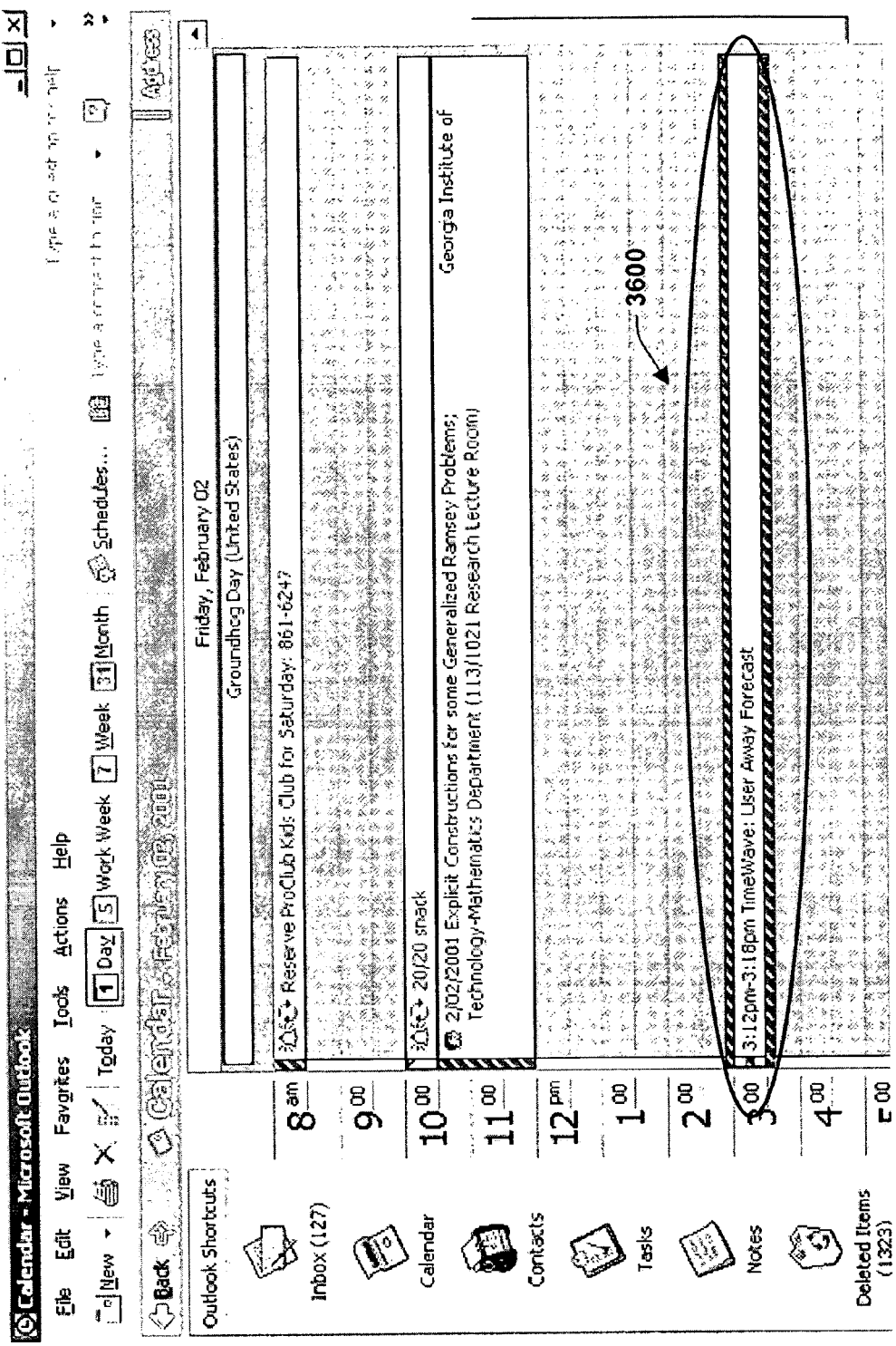
Figure 37:
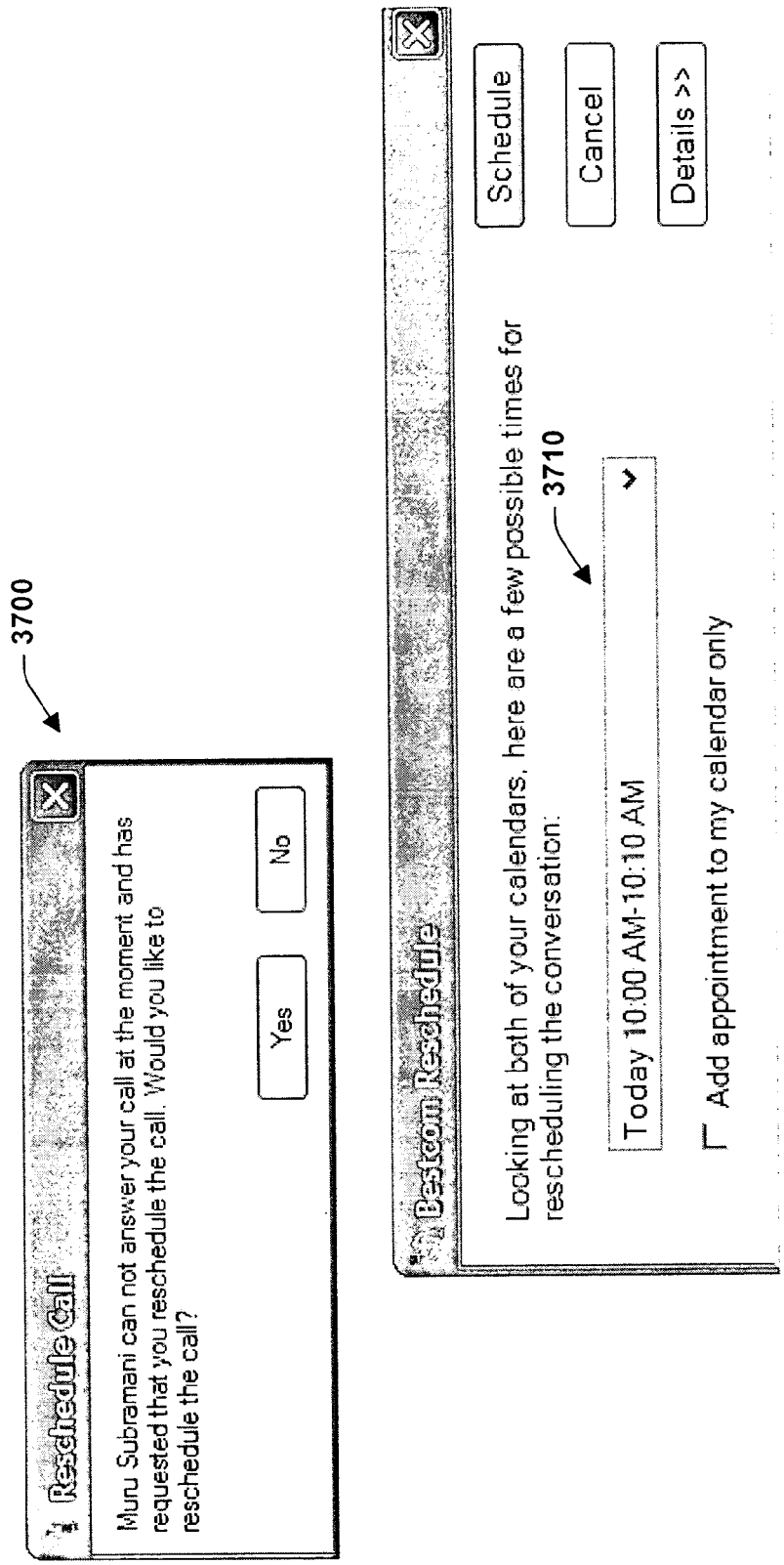

FIGS. 33–37 illustrate example applications in accordance with an aspect of the present invention. FIG. 33 illustrates use of predictions about time away from email in decisions about when to send urgent messages to a portable device such as illustrated at reference numeral 3300. FIG. 34 illustrates use of predictions about time away from email in a decision about sending of personalized out of office message to colleagues at 3400, and optionally including a forecast of the time away from email in an out of the office message at 3410. FIG. 35 illustrates the forecast of time away in an out of office message at 3500. FIG. 36 illustrates use of predictions about time away from the office in an application (e.g., electronic calendar) that shares predictions about time away with others at 3600. FIG. 37 illustrates a rescheduling application employing forecasting in accordance with the present invention. At 3700, an interface is provided giving a caller an option to reschedule a call for a user who is currently away. At 3710, via employment of time away forecasting, a suggested time for re-scheduling the call is provided.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system to facilitate communications and collaboration between entities, comprising the following computer executable components:
    a learning component that is trained and constructs models according to activity patterns of one or more users, the models are adjusted on an interruption workbench operable on a computer;
    a video camera that is employed to record a subject's activities and overall office context;
    a component providing a first phase of model building relating to event and context capture; and
    a forecasting component that employs the learning component and models to generate predictions relating to states of the one or more users.

2. The system of claim 1, the forecasting component receives one or more queries regarding an identified user's states of presence or availability and generates one or more predictions relating to current or future states of the identified user.

3. The system of claim 2, the queries and one or more returned states are generated and received by one or more automated applications or authorized people.

4. The system of claim 3, the queries are originated by the applications or the authorized people in order to obtain answers regarding at least one of presence, availability, location, communications capability, device availability of an identified user or users.

5. The system of claim 1, the forecasting component determines complementary information relating to how long a person is expected to be absent, or how long a person may be unavailable.

6. The system of claim 2, the presence states include at least one of a time until a user will arrive at or leave a location, a time until the user will be at a location for at least time t, a time until the user will have access to a device, a time until the user will review an e-mail or other message, a time until the user will finish a conversation in progress, a likelihood the user will attend a meeting, an expected cost of interruption over time.

7. The system of claim 2, the learning component includes one or more learning models for reasoning about the presence states, the learning models can include at least one of a statistical model, a mathematical model, a Bayesian dependency model, a naïve Bayesian classifier, a Support Vector Machine (SVMs), a neural network and a Hidden Markov Model.

8. The system of claim 1, the learning component is trained from a user event data store that aggregates data from a plurality of different data sources associated with the one or more users.

9. The system of claim 8, the data sources include data acquisition components that record or log user event data, the data sources include at least one of a cell phone, an accelerometer, an acoustical activity recorded by microphone, a Global Positioning System (GPS), an electronic calendar, time information, a vision monitoring device, a wireless device, and a computer desktop activity.

10. The system of claim 1, the forecasting component is implemented as at least one of a server, a server farm, a client application, a web service, and an automated application that provides answers to automated systems or authorized people.

11. The system of claim 9, the data acquisition components include a signal-processing layer that enables users to configure and define parameters of audio and video sources utilized to define a user's presence.

12. The system of claim 1, the forecasting component constructs a set of cases from an event database that is consistent with a query to enable custom-tailoring of a formulation and discretization of variables representing temporal relationships among landmarks as transitions between periods of absence and presence and appointment stan and end times, as defined by the query.

13. The system of claim 12, the event database logs periods of presence and absence as events in an event log.

14. The system of claim 13, the events are annotated by source devices that are defined by respective capabilities and locations.

15. The system of claim 14, further comprising tagging of events by specific devices, indexed by capabilities to enable a system to forecast a probability distribution over the time until the user will have access to different types of devices.

16. The system of claim 14, further comprising the source devices being assigned to fixed locations enabling a forecast of a user's location.

17. The system of claim 1, further comprising an event system to monitor histories of a user's interaction with computing systems, including applications that are running on a system, applications that are now in focus or that have just gone out of focus.

18. The system of claim 1, the forecasting component identifies when a user is checking email or reviewing a notification.

19. The system of claim 18, the forecasting component forecasts a time until a user will likely review a communication, given how much time has passed since the user last reviewed the communication.

20. The system of claim 1, the forecasting component determines a time until a user will engage an application or cease using the application.

21. The system of claim 1, the forecasting component predicts a time when a current conversation is likely to end.

22. A computer readable medium having computer readable instructions stored thereon for implementing the learning component and the forecasting component of claim 1.

23. The system of claim 1, at least one of the learning component and the forecasting component is associated with at least one of a communications system, a notification system, a messaging system, a priorities system, an automated meeting or interactive communications schedulers or re-schedulers, a smart caching system, an audio system, a calendaring system, a scheduling system, an automated maintenance system, an automated agent, a video system, a digital assistant, and a user tracking system in order to provide useful information to message senders or systems regarding the likelihood of establishing contact and making informed decisions based upon a user's expected presence and availability.

24. A computer implemented method to provide presence forecasts, comprising the following computer implemented acts:
determining a proximal activity context that represents one or more salient recent transitions among landmark states, based on a query; and
constructing a model to predict future states that are dependent on timing of a more recent landmark state and an Expected Cost of Interruption (ECI) for a user at present or future times.

25. The method of claim 23, further comprising providing forecasts according to the equation $p(t_e|E, \xi)$, where $t_e$ is a time until an event of interest occurs, and evidence E includes proximal activity context, a time of day, a day of week, and multiple attributes representing the nature of active calendar items under consideration.

26. The method of claim 24, further comprising predicting a time until the user who has been absent will return to their office, or return to their office and remain for at least some time t, the proximal activity context is the period of time since the user transitioned from present to absent.

27. The method of claim 23, further comprising forecasting about how long it will be before the user who is present will leave their office, or, will be away for at least some time t, the proximal activity context is taken as the time since the user transitioned from absent to present.

28. A method for building a forecasting model, comprising:
analyzing multiple distinctions associated with meetings and integrating observations into an analysis of presence and availability;
building models that relate multiple attributes of an appointment to the likelihood that the meetings will be attended, and
building models that determine an interruptability of the meetings.

29. The method of claim 28, further comprising inferring a location of meetings when locations are not clear from location strings listed with appointments.

30. The method of claim 28, further comprising building models of attendance by automatically accessing appointment properties from appointments from a commercially available server.

31. The method of claim 28, further comprising creating a draft training set of appointments and their properties, and marking an attendance field for respective appointments with guesses made via a set of heuristics about attendance.

32. The method of claim 31, further comprising employing attendance heuristics to consider an extension of desktop activity into a portion of a scheduled meeting as evidence that a meeting was not attended, and considering a lack of activity during a meeting as evidence that a meeting was attended.

33. The method of claim 31, further comprising providing forecasts that are taken with respect to attendance as a draft data set and making available tools that enable users to refine the draft data set with hand labeling of attendance.

34. The method of claim 28, further comprising generating a form that displays appointments in order of their occurrence, and displaying an attendance field containing forecasts about attendance.

35. The method of claim 34, further comprising adding assessments of a physical location of meetings, and adding how interruptible the meetings are by specifying whether meetings are low, medium, or high interruptability.

36. The method of claim 28, further comprising building models in view of a meeting date and time, a meeting duration, a subject a location, an organizer, a number and nature of the invitees, a role of the use, a response status of the user, whether the meeting is recurrent or not and whether the time is marked as busy or free on the user's calendar.

37. The method of claim 28, further comprising exchanging information relating to an Expected Cost of Interruption (ECI) for a user at present or future times.

38. The method of claim 37, further comprising providing users with a facility to associate a dollar-value cost of interruption for an associated interruptability level.

39. The method of claim 37, further comprising computing an Expected Cost of Interruption (ECI) according to the following equation;

$$ECI = p(A^m | E, \xi) \sum_i p(c_i^m | E, \xi) c_i^m + (1 - p(A^m | E, \xi)) c^d$$

where $A^m$ is an event of attending a meeting, $c_i^m$ is a cost of interruption associated with interruptability value i, $c^d$ is a default cost for the time period under consideration, and E represents observations about calendar attributes, a proximal context, day of week, and time of day.

40. A computer executable system to facilitate communications and collaboration between entities, comprising:
computer implemented means for learning activity patterns from one or more user events to build a model, the model is adjusted on an interruption workbench operable on a computer;
computer implemented means for employing a video camera to record a users activities and overall office context;
computer implemented means for providing a first phase of model building relating to event and context capture; and
computer implemented means for generating predictions relating to future user states based upon the model and a query from an automated application.

41. A graphical user interface for employment with a computer implemented communications and collaboration system, comprising the following computer implemented components:
one or more display objects associated with a graphical user interface that indicate predicted presences status of one or more users;

a form that displays appointments in order of their occurrence, and displaying an attendance field containing forecasts about attendance of the one or more users; and at least one input to query the predicted presence status.

42. The graphical user interface of claim 41, the input further comprising at least one of a real time selection, an offline selection, a forecast selection, an assumptions selection, and a time selection.

43. The graphical user interface of claim 42, the forecast selection further comprising an online selection, an e-mail review selection, a telephone call selection, an office presence selection, an online at home selection, a video conference capable selection, a full screen available selection, a multiple monitors available selection, a type of phone available selection, a net meeting available selection, and a cost of interruption selection.

44. The graphical user interface of claim 41, further comprising display objects that depict graphical or numerical results of a predicted amount of time until a user is able to communicate via a given communications medium.

45. The graphical user interface of claim 44, further comprising displaying clues as to possible whereabouts of a user.

46. The graphical user interface of claim 41, further comprising generating a graph depicting a probability of a user's presence.

47. The graphical user interface of claim 41, further comprising providing an interface to enable setting of one or more profiles for presence analysis.

48. The graphical user interface of claim 41, the interface enables setting an interruption cost associated with the one or more profiles.

49. The graphical user interface of claim 48, the interface enables setting different periods of time, days, and calendar periods for a respective profile.

50. A computer implemented system to facilitate communications and collaboration between entities, comprising the following computer executable components:
a tool that constructs models according to activity patterns of one or more users, the models are adjusted on an interruption workbench operable on a computer;
a video camera that is employed to record a subject's activities and overall office context;
a component providing a first phase of model building relating to event and context capture; and
a forecasting component that employs the models to generate predictions relating to states of the one or more users.

51. The system of claim 50, the models employ a dynamic Bayesian model for reasoning about a user's attentional focus.

52. The system of claim 50, the states include at least one of high-focus solo activity, medium focus solo activity, low focus solo activity, conversation in office, presentation, driving, private personal time, and sleeping.

53. The system of claim 50, the models infer a cost of different types of interruption given that a user is of a particular attentional state by processing a utility, $u(D_i, A_j)$, capturing the cost of a user in attentional state $A_j$ being disrupted by task or communication event $D_i$.

54. The system of claim 53, the cost is assessed as a willingness to pay to avoid a disruption in dollars.

55. The system of claim 53, the models compute an expected cost of interruption (ECI) by summing over the utilities, weighted by a likelihood of each state of attention, conditioned on a stream of incoming sensory information.

56. The system of claim 55, the ECI is computed as:

$$ECI = \sum_j p(A_i | E) u(D_i, A_j)$$

wherein $p(A_j|E)$ is the probability of an attentional state, conditioned on an evidence stream E.

57. The system of claim 50, further comprising a control panel for an event system having event classes and graphical display for processing acoustical and visual information.

58. The system of claim 57, further comprising a component to capture a visual pose that is processed with a Bayesian head tracking system and a component to process ambient acoustical activity.

59. The system of claim 57, further comprising a component to monitor a user's calendar that is automatically examined.

60. The system of claim 50, further comprising a client event system that provides an abstraction tool for coalescing patterns of low-level system events into higher-level events.

61. The system of claim 60, the low-level events are captured as an application being used, including whether a user is typing and clicking with a mouse, the higher-level events include pattern of switching among applications and indications of task completion.

62. The system of claim 59, monitoring the calendar further comprises whether a meeting is in progress, the length of time until the meeting is over, and the location of the meeting.

63. The system of claim 50, further comprising an event whiteboard to capture and share a state of low-level and higher-level events considered by a system.

64. The system of claim 63, the events include details about a birth and death of applications, an application currently "on top" and being interacted with, and events that capture usage patterns.

65. The system of claim 64, further comprising one or more alerting displays generated from a notification system employing models of expected cost of interruption.

66. The system of claim 65, the alerting displays are coupled with an audio herald.

67. The system of claim 50, further comprising learning of models that are employed to predict the state of interruptability of users in office settings, based on a logging of events from perceptual sensors and desktop activity.

68. The system of claim 50, the interruption workbench provides for event capture, annotation of segments of time, building models and testing statistical models of interruptability.

69. The system of claim 68, the interruption workbench includes an event logging system that synchronizes events monitored with a training session with scenes from a digital videotape, facilitating labeling of segments of time and associating them with events.

70. The system of claim 50, further comprising a component providing a second phase for model construction relating to tagging and assessment.

71. The system of claim 70, further comprising a component to allow subjects to tag periods of time viewed on a videotape as high, medium, and low interruptability.

72. The system of claim 70, further comprising a component to allow subjects to define a scale and build models that reason directly about a probability distribution over real-valued values, representing the costs of interruption.

73. The system of claim 56, further comprising computing the expected costs of interruption of different classes of interruption, for each disruption under consideration, an expected cost of interruptability is computed by substituting the likelihood of different states of interruptability, p(I$_i$|E), for explicit states of attention as follows:

$$ECI = \sum_j p(I_i | E)u(D_i, I_j).$$

74. The system of claim 50, the models operate on variables representing attentional forecasts about future states of interruptability.

75. The system of claim 74, future states of interruptability capture inferences about probability distributions over times until a low, medium, or high state of interruptability will be reached, and more specialized variables representing the times until states of interruptability will be achieved that will persist for different amounts of time.

76. The system of claim 75, the future states are employed for deliberating about if, when, and how to mediate communications.

77. A computer implemented system to facilitate communications and collaboration between entities, comprising the following computer executable components:
 a data collection component that collects information about a user's presence and absence at different locations and/or changes over time relating to a user's access to different devices and/or communication channels;
 a learning component that is trained and build models according to activity patterns of one or more users, the models are adjusted on an interruption workbench operable on a computer,
 a video camera that is employed to record a subject's activities and overall office context;
 a component providing a first phase of model building relating to event and context capture; and
 a forecasting component that employs the learning component and models to generate predictions relating to states of the one or more users for specific queries and/or situations about a user's current or future availability and presence.

78. The system of claim 77, the information is collected in a relational database.

79. The system of claim 77, the information includes multiple dimensions of a user's activities across multiple devices, and appointment status, as encoded in a calendar.

80. The system of claim 78, the information includes start and stop times of different interactions and appointment status that encoded as distinct dimensions in the database.

81. The system of claim 78, further comprising static and dynamically constructed predictive models that are determined by making queries for information across multiple dimensions of the database.

82. The system of claim 81, the queries are created dynamically, based on a current situation including at least one of a time of day, a day of a week, and a current transition status of a user for key transitions.

83. The system of claim 81, the models include determining a predictive goal associated with a desired forecast including a time until a communication channel will become available if not currently available.

84. The system of claim 81, the models include at least one of a time series model, an ARIMA model, a dynamic Bayesian network, and a Continuous Time Bayesian Network.

85. The system of claim 84, the Bayesian network is learned dynamically by acquiring a set of matching cases from a database, via appropriate querying of the database, and then employing a statistical analysis of the cases.

86. The system of claim 77, further comprising a component that determines specific types of sub-goals per a contacting user's interest in current status and in forecasts of presences and availabilities.

87. The system of claim 86, the sub-goals relate to at least one of a location, an interruptability, and an availability of communication channels.

88. The system of claim 87, the communications channels can be reasoned about directly or can be derived as information by linking channels with location.

89. The system of claim 88, the information about channels linked to locations is stored in a location and device schema.

90. The system of claim 89, the schema includes information relating to when a device is added, a device type, a channel, and a location.

91. The system of claim 90, further comprising a user interface that interacts with the schema for adding and removing devices, locations, and channels.

92. The system of claim 90, the location is automatically determined from at least one of an 802.11 signal and a GPS signal.

93. The system of claim 77, further comprising a component to generate forecasts that are relayed to users that are granted privileges to view different aspects or levels of detail about another user's current presence at a location, interruptability, a user's access of one or more communication channels, or about forecasts of future presence and availability.

94. The system of claim 93, further comprising a component for selectively revealing different types of forecasts or current status.

95. The system of claim 94, wherein selectively revealing includes an abstraction of information to less precise information in a time domain.

96. The system of claim 94, wherein selectively revealing includes different people having different privileges including relationship information in an org chart, or by dynamic information.

97. The system of claim 96, the information is provided to a communication agent regarding possible actions to take.

98. The system of claim 77, further comprising at least one of:
 a component to automatically reply to messages employing user forecasting information;
 a component to automatically share user forecasting information with others; and
 a component to automatically attempt to reschedule a communication based upon user forecasting information.

* * * * *